(12) United States Patent
Duan et al.

(10) Patent No.: US 12,395,902 B2
(45) Date of Patent: *Aug. 19, 2025

(54) INTER-NETWORK CHANGE METHOD AND APPARATUS, AND RELATED DEVICE

(71) Applicant: Huawei Technologies Co., Ltd., Shenzhen (CN)

(72) Inventors: Xiaoyan Duan, Shenzhen (CN); Hui Jin, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/486,491

(22) Filed: Oct. 13, 2023

(65) Prior Publication Data

US 2024/0049067 A1 Feb. 8, 2024

Related U.S. Application Data

(63) Continuation of application No. 16/403,135, filed on May 3, 2019, now Pat. No. 11,838,811, which is a
(Continued)

(30) Foreign Application Priority Data

Nov. 4, 2016 (CN) .......................... 201610979485.2

(51) Int. Cl.
*H04W 36/00* (2009.01)
*H04W 36/14* (2009.01)

(52) U.S. Cl.
CPC ... *H04W 36/0066* (2013.01); *H04W 36/0072* (2013.01); *H04W 36/13* (2023.05); *H04W 36/1443* (2023.05)

(58) Field of Classification Search
CPC ......... H04W 36/0066; H04W 36/0072; H04W 36/14; H04W 36/0016; H04W 36/0055; H04W 48/08; H04W 60/00
See application file for complete search history.

(56) References Cited

U.S. PATENT DOCUMENTS

2012/0134259 A1* 5/2012 Bonnier .............. H04L 41/0668
370/328
2014/0126469 A1 5/2014 Youtz et al.
(Continued)

FOREIGN PATENT DOCUMENTS

CN 103250398 A 8/2013
CN 105516312 A 4/2016
(Continued)

OTHER PUBLICATIONS

3GPP462 et al. (Huawei: "Support of Network Slice Discovery", 3GPP Draft; R3-162462, Oct. 6, 2016, IDS submitted Aug. 29, 2019).*
(Continued)

*Primary Examiner* — Lakeram Jangbahadur
(74) *Attorney, Agent, or Firm* — Conley Rose, P.C.

(57) ABSTRACT

An inter-network change method and apparatus, where a terminal determines second network slice information to which first network slice information is mapped. The first network slice information is information about a first network slice accessed by the terminal, the second network slice information is information about a second network slice, the first network slice is a network slice in a first network, and the second network slice is a network slice in a second network. The terminal sends a request message to the second network and receives an accept message returned by the second network, such that the terminal accesses a network slice identified by network slice information accepted by the second network. It can be learned that
(Continued)

embodiments of the present disclosure can implement a handover operation between network slices of different networks.

20 Claims, 26 Drawing Sheets

Related U.S. Application Data continuation of application No. PCT/CN2017/074015, filed on Feb. 17, 2017.

(56) References Cited

U.S. PATENT DOCUMENTS

| | | | |
|---|---|---|---|
| 2015/0043382 | A1 | 2/2015 | Arora et al. |
| 2015/0236898 | A1 | 8/2015 | Bonnier et al. |
| 2017/0208518 | A1 | 7/2017 | Shu et al. |
| 2017/0318450 | A1* | 11/2017 | Salkintzis ............ H04W 48/14 |
| 2018/0242161 | A1* | 8/2018 | Vulgarakis Feljan ...................... H04W 16/10 |
| 2018/0249530 | A1* | 8/2018 | Salkintzis ............ H04W 84/00 |
| 2018/0324576 | A1* | 11/2018 | Salkintzis ............ H04W 76/14 |
| 2018/0324632 | A1* | 11/2018 | Cho ................. H04W 28/0268 |
| 2019/0028943 | A1 | 1/2019 | Wang et al. |
| 2019/0082490 | A1 | 3/2019 | Zhang et al. |
| 2019/0159027 | A1* | 5/2019 | Kuge .................... H04W 12/06 |
| 2019/0239156 | A1* | 8/2019 | Wang ................... H04W 48/12 |
| 2021/0014663 | A1* | 1/2021 | Ianev ................... H04W 76/27 |

FOREIGN PATENT DOCUMENTS

| | | |
|---|---|---|
| CN | 105808894 A | 7/2016 |
| CN | 105898894 A | 8/2016 |
| CN | 105915642 A | 8/2016 |
| CN | 105993194 A | 10/2016 |
| CN | 106060900 A | 10/2016 |
| KR | 101268440 B1 | 6/2013 |
| WO | 2018038487 A1 | 3/2018 |

OTHER PUBLICATIONS

3GPP799 ("3rd Generation Partnership Project; Technical Specification Group Services and System Aspects; Study on Architecture for Next Generation System (Release 14)", 3GPP Standard; 3GPP TR 23.799, Oct. 31, 2016, IDS submitted Aug. 29, 2019).*
"3rd Generation Partnership Project; Technical Specification Group Services and System Aspects; General Packet Radio Service (GPRS) enhancements for Evolved Universal Terrestrial Radio Access Network (E-UTRAN) access (Release 14)," 3GPP TS 23.401, V14.1.0, Sep. 2016, 379 pages.
"3rd Generation Partnership Project; Technical Specification Group Core Network and Terminals; Non-Access-Stratum (NAS) protocol for Evolved Packet System (EPS); Stage 3 (Release 14)," 3GPP TS 24.301, V14.1.0, Sep. 2016, 460 pages.
"3rd Generation Partnership Project; Technical Specification Group Services and System Aspects; Study on Architecture for Next Generation System (Release 14)," 3GPP TR 23.799, V1.1.0, Part 1, Oct. 2016, 251 pages.
"3rd Generation Partnership Project; Technical Specification Group Services and System Aspects; Study on Architecture for Next Generation System (Release 14)," 3GPP TR 23.799, V1.1.0, Part 2, Oct. 2016, 125 pages.
"3rd Generation Partnership Project; Technical Specification Group Services and System Aspects; Study on Architecture for Next Generation System (Release 14)," 3GPP TR 23.799, V1.1.0, Part 3, Oct. 2016, 125 pages.
ZTE, "Consideration on RAN Side Network Slicing," R3-160821, 3GPP TSG RAN WG3 Meeting#91bis, Bangalore, India, Apr. 11-15, 2016, 9 pages.
Huawei, "Support of Network Slice Discovery," R3-162462, 3GPP TSG-RAN WG3 Meeting #93bis, Sophia Antipolis, France, Oct. 10-14, 2016, 4 pages.
Huawei, "Inter-RAT handover," R3-161140, 3GPP TSG-RAN3 Meeting #92, Nanjing, China, May 23-27, 2016, 4 pages.
"3rd Generation Partnership Project; Technical Specification Group Services and System Aspects; Study on Architecture for Next Generation System (Release 14)," 3GPP TR 23.799, V1.0.0, Sep. 2016, 423 pages.
"TR 23.799 'Study on Architecture for Next Generation System' for Information," TD SP-160667, 3GPP TSG SA Meeting #73, Sep. 21-23, 2016, 2 pages.
ITRI, "RAN Slicing in NR," 3GPP TSG RAN WG2 #96, R2-168065, Reno, USA, Nov. 14-18, 2016, 4 pages.
Nokia, et al., "Slice Availability and impact on Mobility," 3GPP TSG-RAN WG3 Meeting #94, R3-162944, Reno, USA, Nov. 14-18, 2016, 4 pages.
Qualcomm Incorporated, "Multi-RAT RAN and CN," 3GPP TSG-RAN WG3 Meeting #91bis, R3-160823, Bangalore, India, Apr. 11-15, 2016, 3 pages.
Huawei, "Solution for single radio based lightweight interworking and migration," SA WG2 Meeting #117, S2-165657, Oct. 17-21, Kaohsiung, Taiwan, 4 pages.
NTT DOCOMO, "Multimedia calls fallback from NextGen system to EPS," SA WG2 Meeting #117, S2-165848, Oct. 17-21, 2016, Kaohsiung city, Taiwan, 4 pages.
Nokia, et al., "Updates on interworking and migration solution 18.2: Call flows," SA WG2 Meeting #117, S2-165869, Oct. 17-21, Kaohsiung, Taiwan, 7 pages.

* cited by examiner

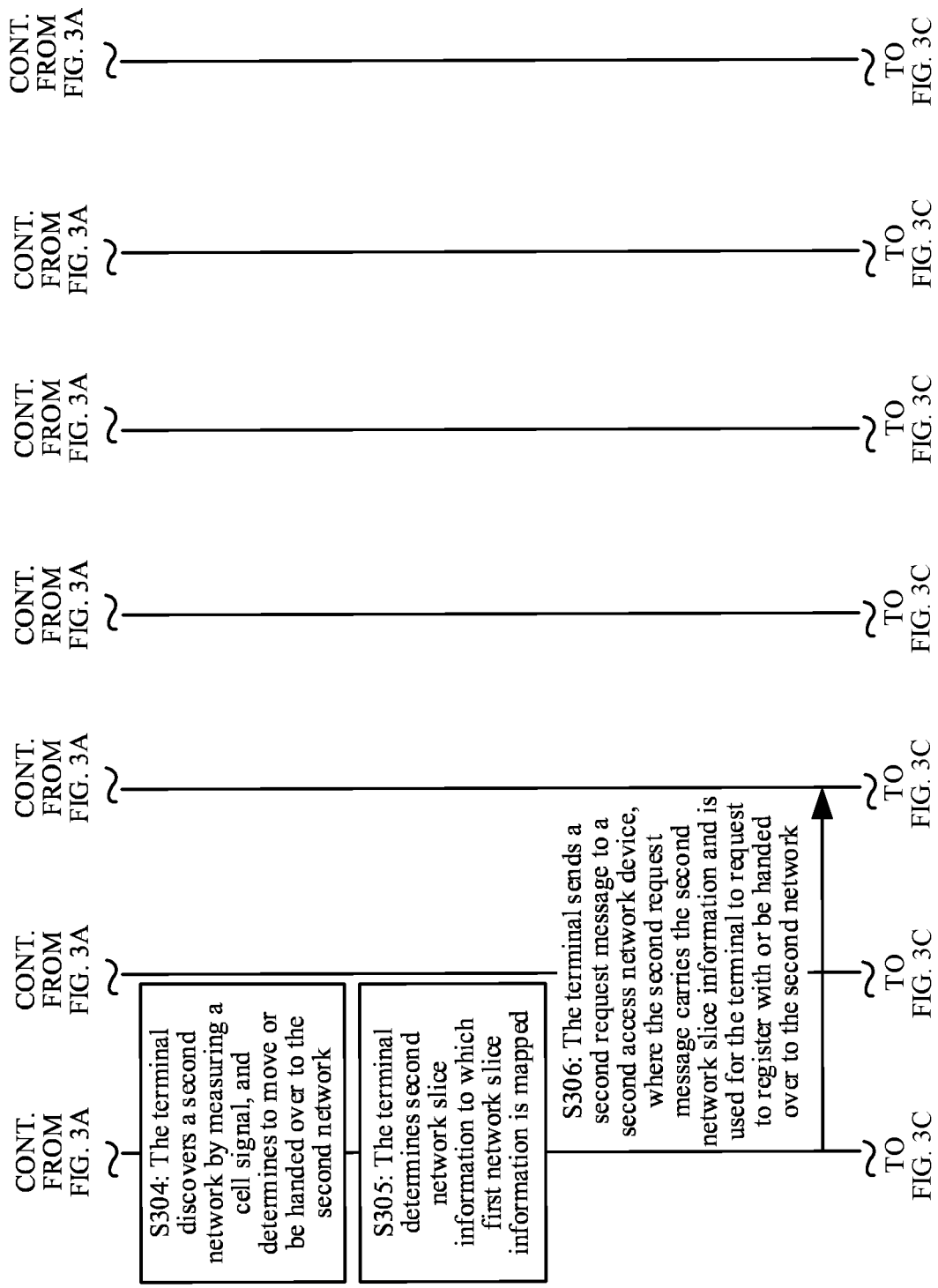

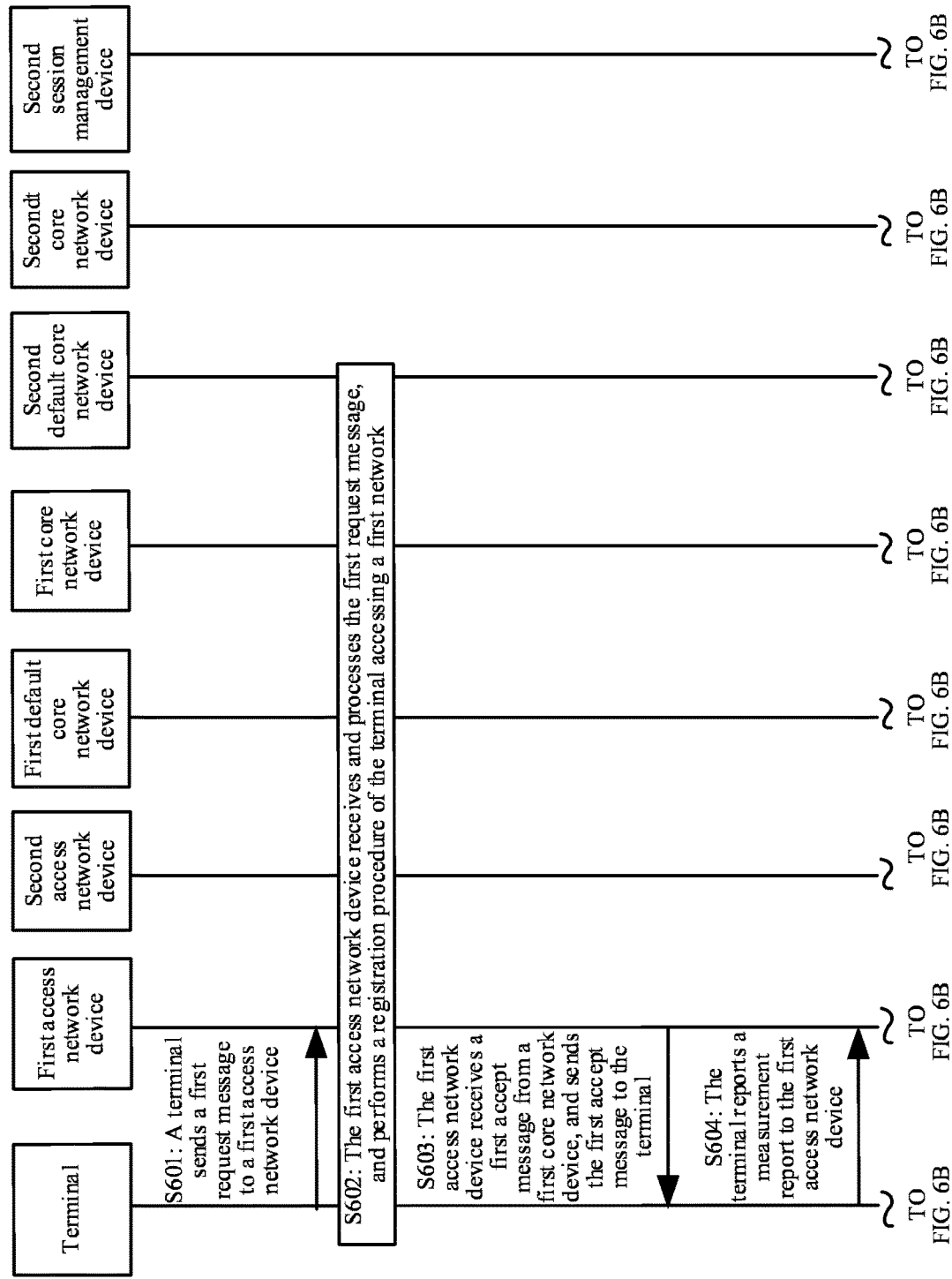

INTER-NETWORK CHANGE METHOD AND APPARATUS, AND RELATED DEVICE

CROSS-REFERENCE TO RELATED APPLICATIONS

This is a continuation of U.S. patent application Ser. No. 16/403,135 filed on May 3, 2019, which is a continuation of International Patent Application No. PCT/CN2017/074015 filed on Feb. 17, 2017, which claims priority to Chinese Patent Application No. 201610979485.2 filed on Nov. 4, 2016. All of the aforementioned applications are hereby incorporated by reference in their entireties.

TECHNICAL FIELD

This application relates to the field of communications technologies, and in particular, to an inter-network change method and apparatus, and a related device.

BACKGROUND

A rapidly developed mobile communications system needs to meet service requirements in a plurality of scenarios, for example, a mobile broadband service, large-amount machine-to-device communication, and high reliable mobile device communication. A method for dividing a network into different network slices may be used to meet service requirements in different scenarios. A network slice (NS) may also be referred to as a network slice instance (NSI).

For example, in a fifth generation (5G) communications system, a terminal (or referred to as user equipment (UE), a terminal, a mobile station, or the like) that supports 5G needs to be capable of accessing a plurality of different network slices. However, in an interworking and evolution process between 5G and fourth generation (4G) communications systems, when a terminal moves or is handed over between two networks, how to hand over the terminal between network slices of the two networks is a problem that needs to be resolved urgently.

SUMMARY

Embodiments of this application provide an inter-network change method and apparatus, and a related device, in order to implement a handover between network slices of different networks.

A first aspect of this application provides an inter-network change method. In the inter-network change method, a terminal may determine second network slice information to which first network slice information is mapped, where the first network slice information is information about a first network slice accessed by the terminal, the second network slice information is information about a second network slice, the first network slice is a network slice in a first network, and the second network slice is a network slice in a second network; the terminal sends a request message to the second network, where the request message carries the second network slice information, and the request message is used for the terminal to request to register with or be handed over to the second network slice. The terminal receives an accept message returned by the second network, where the accept message carries network slice information accepted by the second network, and the network slice information accepted by the second network includes a part or all of the second network slice information. Additionally, the first network and the second network have different access network devices and/or core network devices. It can be learned that in this implementation, when discovering the second network by measuring a cell signal, the terminal may perform the foregoing operations to be handed over to the second network slice in the second network or to a network slice accepted by the second network, to implement a handover between network slices of different networks.

The network slice information accepted by the second network may include a part or all of the second network slice information, or may be a different network slice.

In a possible implementation, mapping information between the first network slice information and the second network slice information may be pre-configured on the terminal.

In another possible implementation, that the terminal determines second network slice information to which first network slice information is mapped may comprise: obtaining, by the terminal in a procedure of registering or establishing a session with the first network, the second network slice information to which the first network slice information of the first network is mapped. For example, a registration response message returned by the first network carries the mapping information between the first network slice information and the second network slice information, or a session establishment accept message in the procedure of establishing a session with the first network carries the mapping information between the first network slice information and the second network slice information.

In still another possible implementation, that the terminal determines second network slice information to which first network slice information is mapped may comprise: obtaining, by the terminal from system information broadcast by the first network, the second network slice information to which the first network slice information is mapped. For example, the terminal reads mapping information between network slice information of a 4G network and network slice information of a 5G network from system information broadcast by a cell in the 4G network on which the terminal currently camps.

The accept message further carries third network slice information to which the network slice information accepted by the second network is mapped, the third network slice information is information about a third network slice, and the third network slice is a network slice in the first network. The terminal may update the stored mapping information between the first network slice information and the second network slice information using mapping information between the network slice information accepted by the second network and the third network slice information.

The first network slice is a network slice used by the terminal to establish a session in the first network, and the second network slice is a network slice used by the terminal to re-establish the session in the second network or a network slice used after the session is changed from the first network to the second network.

The request message further carries a session identifier that is used to identify a session, and the session is established in the first network slice and is re-established in the second network slice, or is changed from the first network slice to the second network slice.

A second aspect of the embodiments of this application further provides another inter-network change method. The inter-network change method is described from a perspective of a target network with which a terminal is to register or to which a terminal is to be handed over, that is, a second network side. In the inter-network change method, a second access network device receives a request message sent by the terminal, where the second access network device is an access network device in a second network, the request message carries second network slice information to which the first network slice information is mapped, the first network slice information is information about a first network slice accessed by the terminal, the second network slice information is information about a second network slice, the first network slice is a network slice in a first network, and the second network slice is a network slice in the second network. The second access network device determines a second core network device, where the second core network device is a core network device in the second network slice; the second access network device sends the request message to the second core network device for processing, in order to perform a procedure in which the terminal registers with or is handed over to the second network; and the second access network device receives an accept message returned by the second core network device, and sends the accept message to the terminal, where the accept message carries network slice information accepted by the second network, and the network slice information accepted by the second network includes a part or all of the second network slice information. In this implementation, after receiving the request message from the terminal, the second access network device may determine the second core network device in the second network slice, and send the request message to the second core network device for processing, such that the second core network device enables the terminal to access the second network slice.

In a possible implementation, that the second access network device determines a second core network device and the second access network device sends the request message to the second core network device for processing, in order to perform a procedure in which the terminal registers with or is handed over to the second network may include: forwarding, by the second access network device, the request message to a second default core network device in the second network, such that the second default core network device selects the second core network device and sends the request message to the second core network device for processing, in order to perform the procedure in which the terminal registers with or is handed over to the second network. This implementation is applicable to a case in which the second access network device cannot determine the second core network device, in other words, the second default core network device selects the second core network device, and then the second core network device processes the request message, such that the terminal registers with or is handed over to the second network.

The accept message further carries third network slice information to which the network slice information accepted by the second network is mapped, the third network slice information is information about a third network slice, and the third network slice is a network slice in the first network.

The first network slice is a network slice used by the terminal to establish a session in the first network, and the second network slice is a network slice used by the terminal to re-establish the session in the second network or a network slice used after the session is changed from the first network to the second network.

The request message further carries a session identifier that is used to identify a session, and the session is established in the first network slice and is re-established in the second network slice, or is changed from the first network slice to the second network slice.

The request message further carries a handover indication, and the handover indication is used to instruct the second network to assign, to the terminal, a session address that is the same as a session address assigned by the first network to the terminal.

A third aspect of the embodiments of this application further provides an inter-network change method. In the inter-network change method, a first core network device in a first network receives a first request message sent by a first access network device, where the first request message is used for a terminal to request to be handed over to a second network. The first core network device determines second network slice information to which first network slice information is mapped, where the first network slice information is information about a first network slice accessed by the terminal, the second network slice information is information about a second network slice, the first network slice is a network slice in a first network, and the second network slice is a network slice in the second network. The first core network device determines a second core network device, where the second core network device is a core network device in the second network slice. The first core network device sends a second request message to the second core network device, where the second request message carries the second network slice information; and the first core network device receives a response message returned by the second core network device, and sends a handover command to the terminal, such that the terminal is handed over to the second network slice.

In the inter-network change method, the terminal may report a measurement report to the first access network device, and the first access network device determines that the terminal needs to be handed over to the second network. The first access network device sends the second request message to the first core network device, such that the first core network device performs the foregoing operation to hand over the terminal to the second network slice.

In a possible implementation, the first network slice is a network slice used by the terminal to establish a session in the first network, and the second network slice is a network slice used by the terminal to re-establish the session in the second network or a network slice used after the session is changed from the first network to the second network.

In a possible implementation, the request message further carries a session identifier that is used to identify a session, and the session is established in the first network slice and is re-established in the second network slice, or is changed from the first network slice to the second network slice.

In a possible implementation, the request message further carries a handover indication, and the handover indication is used to instruct the second network to assign, to the terminal, a session address that is the same as a session address assigned by the first network to the terminal.

A fourth aspect of the embodiments of this application further provides an inter-network change method. A difference between the inter-network change method and the inter-network change method in the third aspect is that the inter-network change method may be implemented without modifying a mobility management entity (MME) in a 4G network, in other words, a second network with which a terminal is to register with or to which a terminal is to be handed over determines second network slice information and a second core network service entity.

In the inter-network change method, a second default core network device receives a first request message sent by a first core network device in a first network, where the first request message is used for the terminal to request to register with or be handed over to the second network, and the second default core network device is a core network device in the second network. The second default core network device determines the second network slice information to which first network slice information is mapped, where the first network slice information is information about a first network slice accessed by the terminal, the second network slice information is information about a second network slice, the first network slice is a network slice in the first network, and the second network slice is a network slice in the second network. The second default core network device determines a second core network device, where the second core network device is a core network device in the second network slice. Further, the second default core network device sends a second request message to the second core network device, where the second request message carries the second network slice information, and the request message is used for the terminal to request to register with or be handed over to the second network slice.

In this implementation, after the terminal reports a measurement report to a first access network device, the first access network device may determine, based on the measurement report, that the terminal needs to register with or be handed over to the second network. The first access network device sends the first request message to the first core network device, where the first request message is used for the terminal to register with or be handed over to the second network. When receiving the first request message sent by the first access network device, the first core network device may perform the foregoing operation to register or hand over the terminal with or to the second network slice.

The first request message carries the first network slice information.

In a possible implementation, the first network slice is a network slice used by the terminal to establish a session in the first network, and the second network slice is a network slice used by the terminal to re-establish the session in the second network or a network slice used after the session is changed from the first network to the second network.

In a possible implementation, the second request message further carries a session identifier that is used to identify a session, and the session is established in the first network slice and is re-established in the second network slice, or is changed from the first network slice to the second network slice.

In a possible implementation, the second request message further carries a handover indication, and the handover indication is used to instruct the second network to assign, to the terminal, a session address that is the same as a session address assigned by the first network to the terminal.

A fifth aspect of the embodiments of this application further provides an inter-network change apparatus. The inter-network change apparatus has a function of implementing the terminal in the inter-network change method according to the first aspect. The function may be implemented by hardware, or may be implemented by hardware that executes corresponding software. The hardware or software includes one or more modules corresponding to the foregoing functions. For example, the inter-network change apparatus may include a sending module, a receiving module, and a determining module.

A sixth aspect of the embodiments of this application further provides an inter-network change apparatus. The inter-network change apparatus has a function of implementing the first access network device in the inter-network change method according to the second aspect. The function may be implemented by hardware, or may be implemented by hardware that executes corresponding software. The hardware or software includes one or more modules corresponding to the foregoing functions. For example, the inter-network change apparatus may include a sending module, a receiving module, and a determining module.

A seventh aspect of the embodiments of this application further provides an inter-network change apparatus. The inter-network change apparatus has a function of implementing the first core network device in the inter-network change method according to the third aspect. The function may be implemented by hardware, or may be implemented by hardware that executes corresponding software. The hardware or software includes one or more modules corresponding to the foregoing functions. For example, the inter-network change apparatus may include a sending module, a receiving module, and a determining module.

An eighth aspect of the embodiments of this application further provides an inter-network change apparatus. The inter-network change apparatus has a function of implementing the second default core network device in the inter-network change method according to the fourth aspect. The function may be implemented by hardware, or may be implemented by hardware that executes corresponding software. The hardware or software includes one or more modules corresponding to the foregoing functions. For example, the inter-network change apparatus may include a sending module, a receiving module, and a determining module.

A ninth aspect of the embodiments of this application provides a terminal. The terminal may include a processor, a memory, and a communications interface. The processor is connected to both the communications interface and the memory. The memory is configured to store a program instruction. The processor is configured to invoke the program instruction in the memory to execute the inter-network change method according to the first aspect of the embodiments of this application.

A tenth aspect of the embodiments of this application provides an inter-network change device. The access network device may include a processor, a memory, and a communications interface. The processor is connected to both the communications interface and the memory. The memory is configured to store a program instruction. The processor is configured to invoke the program instruction in the memory to execute the inter-network change method according to the second aspect of the embodiments of this application.

An eleventh aspect of the embodiments of this application provides an inter-network change device. The core network device may include a processor, a memory, and a communications interface. The processor is connected to both the communications interface and the memory. The memory is configured to store a program instruction. The processor is configured to invoke the program instruction in the memory to execute the inter-network change method according to the third aspect of the embodiments of this application.

A twelfth aspect of the embodiments of this application provides an inter-network change device. The core network device may include a processor, a memory, and a communications interface. The processor is connected to both the communications interface and the memory. The memory is configured to store a program instruction. The processor is configured to invoke the program instruction in the memory to execute the inter-network change method according to the fourth aspect of the embodiments of this application.

A thirteenth aspect of the embodiments of this application provides a computer storage medium, configured to store a computer software instruction used by the terminal in the fifth aspect. The computer software instruction includes a program designed for executing the first aspect.

A fourteenth aspect of the embodiments of this application provides a computer storage medium, configured to store a computer software instruction used by the inter-network change device in the sixth aspect. The computer software instruction includes a program designed for executing the second aspect.

A fifteenth aspect of the embodiments of this application provides a computer storage medium, configured to store a computer software instruction used by the inter-network change device in the seventh aspect. The computer software instruction includes a program designed for executing the third aspect.

A sixteenth aspect of the embodiments of this application provides a computer storage medium, configured to store a computer software instruction used by the inter-network change device in the eighth aspect. The computer software instruction includes a program designed for executing the fourth aspect.

BRIEF DESCRIPTION OF DRAWINGS

FIG. 3A, FIG. 3B, and FIG. 3C are schematic flowcharts of still another inter-network change method according to an embodiment of the present disclosure;

FIG. 6A, FIG. 6B, and FIG. 6C are schematic flowcharts of still another inter-network change method according to an embodiment of the present disclosure;

DESCRIPTION OF EMBODIMENTS

Figure 1:
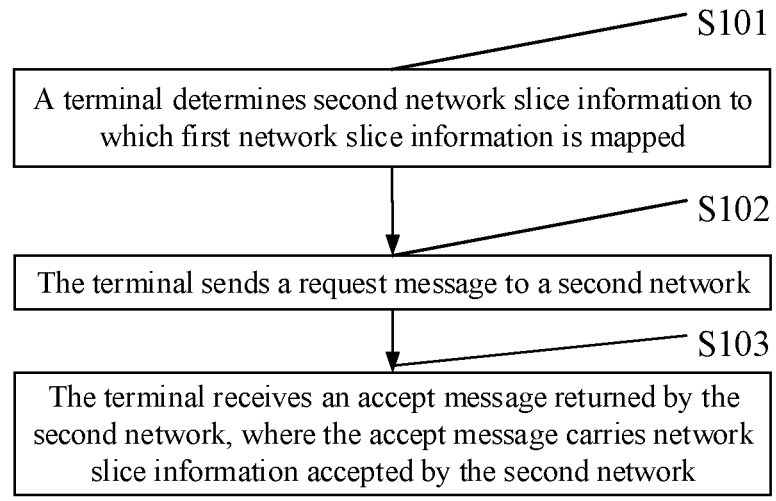
FIG. 1 is a schematic flowchart of an inter-network change method according to an embodiment of the present disclosure.

A rapidly developed mobile communications system needs to meet service requirements in a plurality of scenarios, for example, a mobile broadband service, a large-amount machine-to-device communication service, and a high reliable mobile device communication service. A network slice or a network slicing (NS) method may be used to meet service requirements in different scenarios, for example, a network slice supporting a large-amount machine-to-device communication (e.g., massive Internet of Things (mIoT)) service, a network slice supporting an evolved Mobile Broadband (eMBB) service, or a network slice supporting a Critical Communication (CriC) service. The network slice may be defined as a set of logical network function entities that support a communication service requirement in a specific scenario.

In embodiments of the present disclosure, the network slice may also be referred to as a Network Slice Instance (NSI). In other words, in a general sense, the NSI may refer to a network slice (NS), or in a specific sense, may refer to one or more network slices. For example, in a specific sense, the NSI may refer to one or more network slices that support a specific service type or provide a specific network capability, or may refer to one or more network slices of a specific type that belong to a specific network slice tenant (such as an enterprise, an administrative organization, or an operator).

In the embodiments of the present disclosure, network slice information is information used to identify (or describe) a network slice. Contents included in the network slice information may vary with different communications systems.

For example, in 5G, network slice information may include at least one of a Slice/Service Type, a network slice identifier (ID) or a Network Slice Instance Identifier (NSI ID), Single-Network Slice Selection Assistance Information (S-NSSAI), and network slice selection assistance information (NSSAI). The network slice selection assistance information (NSSAI) is a set of one or more pieces of S-NSSAI. The S-NSSAI is used to describe a specific network slice, and may include a slice/service type and slice differentiation information (e.g., Slice Differentiator). The slice/service type is used to describe a service or a feature of a network slice. When there are a plurality of network slices with a same slice/service type, the slice differentiation information is used to further differentiate supplementary information of the network slices. For example, the slice differentiation information may be a tenant identifier (Tenant ID) used to identify a specific user, a specific company, or a specific application that leases a network slice. Alternatively, the slice differentiation information may be a slice identifier (Slice ID) or other slice description supplementary information. This is not limited in the embodiments of the present disclosure.

In 4G, there is also a concept similar to a network slice, namely, a dedicated core network (DCN). Each DCN serves a specific type of users/terminals, for example, machine-to-machine (M2M) communication users/terminals, and users/terminals belonging to a specific enterprise. Network slice information may include a DCN Type, and/or a dedicated core network identifier (DCN ID), and the like.

In an interworking and evolution process between 5G and 4G, how to hand over a terminal between network slices of 5G and 4G is a problem that needs to be resolved urgently. The embodiments of this application provide an inter-network change method and a related device, in order to implement a handover between network slices of different communications systems.

It should be understood that "first" and "second" in this application are used to differentiate different objects rather than describe a specific sequence. In addition, the terms "including" and any other variant thereof, are intended to cover a non-exclusive inclusion. For example, a process, a method, a system, a product, or a device that includes a series of steps or modules is not limited to the listed steps or modules, but optionally further includes an unlisted step or module, or optionally further includes another inherent step or unit of the process, the method, the product, or the device.

For example, a first network may be a fourth generation mobile communications system, which is referred to as 4G. A second network is a fifth generation mobile communications system, which is referred to as 5G. Alternatively, the first network may be 5G, and the second network may be 4G. A terminal may be a terminal device, such as a mobile phone, a tablet computer, or a wearable device, that can access a network. The first network is used to identify a network currently accessed by the terminal. The second network is used to identify a network to which the terminal is handed over. The first network and the second network have different access network devices and/or core network devices.

First network slice information is information about a first network slice accessed by the terminal, and second network slice information is information about a second network slice. The first network slice is a network slice in the first network, and the second network slice is a network slice in the second network. The first network may include a first access network device. The first network slice may include a first core network device. Optionally, the first network may further include a first default core network device. Correspondingly, the second network is a network with which the terminal is to register or a network to which the terminal is to be handed over. The second network may include a second access network device, and the second network slice may include a second core network device. The second network may further include a second default core network device. The second network slice information is network slice information to which the first network slice information is mapped. Optionally, network slice information of the second network with which the terminal finally registers or the second network to which the terminal is handed over may be the same as or different from the second network slice information, or may be a part or all of the second network slice information.

In an optional implementation, when the terminal discovers the second network by measuring a cell signal and determines to move or be handed over to the second network, the terminal sends, to the second network, a request message used to request to register with or be handed over to the second network. The request message may be a Registration Request message. For example, the registration request message may be an Initial Registration Request message, an (Initial) Attach Request message, a Mobility Registration Request, or a Tracking Area Update (TAU) Request message. The request message may carry a fixed identifier of the terminal, for example, an International Mobile Subscriber Identity (IMSI), or carry a temporary identity (for example, a Globally Unique Temporary Identity (GUTI) of the terminal in the first network. The request message may further carry the second network slice information to which the first network slice information is mapped.

Correspondingly, when the terminal registers with or is handed over to the second network, an accept message returned by the second network to the terminal may be a Registration Accept message. For example, the registration accept message may be an Initial Registration Accept message, an (initial) Attach Accept message, a Mobility Registration Accept message, or a TAU Accept message. The accept message may carry network slice information accepted by the second network, and may further carry network slice information to which the network slice information accepted by the second network is mapped, such that the terminal updates or stores a mapping relationship between the network slice information of the first network and the network slice information of the second network.

Optionally, the request message may further carry a handover identifier (or Handover indication). The second core network device may not provide, based on the handover identifier, network slice information to which information about a network slice that the second network allows the terminal to access is mapped, in other words, the accept message does not carry third network slice information to which the network slice information accepted by the second network is mapped. The handover identifier may be further used to instruct the second network to assign, to the terminal, a session address that is the same as a session address assigned by the first network to the terminal.

In another optional implementation, when the terminal reports a measurement report (the measurement report may include signal measurement information of a serving cell and/or a neighboring cell, or the like) to the first access network device, and the first access network device determines, based on the measurement report, that the terminal needs to register with or be handed over to the second network, the first access network device sends a handover request message to the first core network device. The first core network device determines the second network slice information to which the first network slice information is mapped and determines the second core network device, and sends the request message to the determined second core network device.

Optionally, when the first core network device is an MME in the 4G network, the first access network sends the handover request message to the first core network device, the first core network device sends a second request message to the second default core network device, and the second default core network device (namely, a default core network device in 5G) determines the second network slice information to which the first network slice information is mapped and the second core network device supporting the second network slice. It can be learned that, in this implementation, the second default core network device rather than the first core network device performs an operation of determining a target network slice during an inter-network change. This avoids modifying the MME in the 4G network and facilitates promotion of the inter-network change method.

The request message sent by the first access network device or the first core network device is used to request a handover or request a handover preparation. For example, the request message may be a handover request message or a forwarding relocation request message. Correspondingly, a response message returned by a second core network service entity may be used to respond to the handover request or a handover preparation request. For example, the response message may be a handover command message or a forwarding relocation response message.

In the embodiments of the present disclosure, the first network slice may be a network slice used by the terminal to establish a session in the first network, and the second network slice is a network slice used by the terminal to re-establish the session in the second network or a network slice used after the session is changed from the first network to the second network. The request message may further carry a session identifier that is used to identify a session. The session may be established in the first network slice and be re-established in the second network slice, or be changed from the first network slice to the second network slice.

The following describes in detail an inter-network change method, a related apparatus, and a device that are provided in the embodiments of the present disclosure.

FIG. 1 is a schematic flowchart of an inter-network change method according to an embodiment of the present disclosure. The inter-network change method shown in FIG. 1 is that a terminal discovers a second network by measuring a cell signal, and determines to register with or be handed over to the second network. The inter-network change method may include or include at least the following steps.

S101: The terminal determines second network slice information to which first network slice information is mapped.

In an optional implementation, the second network slice information to which the first network slice information is mapped may be pre-configured on the terminal.

In another optional implementation, that the terminal determines second network slice information to which first network slice information is mapped in the step S101 may include: obtaining, by the terminal in a procedure of registering or establishing a session with a first network, the second network slice information to which the first network slice information is mapped. For example, the terminal obtains the second network slice information to which the first network slice information is mapped from a registration accept message or a session establishment accept message sent by the first network to the terminal.

For example, obtaining, by the terminal in a procedure of registering with a first network, the second network slice information may include or include at least the following steps: sending, by the terminal, a registration request message to the first network, where the registration request message carries parameters, such as an identifier of the terminal (for example, an international mobile subscriber identity (IMSI) of the terminal or a temporary identity of the terminal in the first network), and information about a first network slice that the terminal requests to access.

The first network continues to perform the terminal registration procedure according to the registration request message of the terminal. The registration procedure includes: A core network device in the first network performs authentication on the terminal, negotiates a security/encryption parameter, and the like; selects a corresponding first network slice and a first core network device in the first network slice for the terminal based on the first network slice information carried in the registration request message and based on subscription information determined based on the identifier of the terminal; and returns a registration accept message to the terminal through a first access network device.

The registration accept message may further carry the second network slice information to which the first network slice information is mapped.

For example, obtaining, by the terminal in a procedure of establishing a session with a first network, the second network slice information may include or include at least the following steps: sending, by the terminal, a session establishment request message to the first network; where the session establishment request message carries parameters, such as an identifier of the terminal (for example, an IMSI of the terminal or a temporary identity of the terminal in the first network), and the first network slice information of the first network. Herein, the first network slice information of the first network is used to identify the first network slice and indicate that the terminal requests to establish a session in the network slice.

The first core network device in the first network slice allocates a user plane function entity to the terminal in the first network slice based on the session establishment request message.

The first core network device further sends a session establishment accept message to the terminal through the first access network device.

The session establishment accept message may carry the corresponding second network slice information, to which the first network slice information of the first network is mapped, of the second network.

In still another optional implementation, in step S101, that the terminal determines the corresponding second network slice information, to which the first network slice information of the first network accessed by the terminal is mapped, of the second network may include: obtaining, by the terminal from system information broadcast by the first network, the corresponding second network slice information, to which the first network slice information of the first network is mapped, of the second network.

For example, the terminal reads, from system information broadcast by a cell in a 4G network on which the terminal currently camps, network slice information, to which network slice information of the 4G network is mapped, of a 5G network, for the terminal to use when the terminal subsequently registers with or is handed over to the 5G network. Alternatively, the terminal reads, from system information broadcast by a cell in a 5G network on which the terminal currently camps, network slice information, to which network slice information of the 5G network is mapped, of a 4G network, for the terminal to use when the terminal subsequently registers with or is handed over to the 4G network.

S102: The terminal sends a request message to the second network.

The request message carries the second network slice information. The request message is used for the terminal to request to register with or be handed over to a second network slice.

In this embodiment of the present disclosure, that the terminal sends a request message to the second network may include: sending, by the terminal, the request message to a second access network device in the second network, determining, by the second access network device, a second core network device based on the second network slice information carried in the request message, and performing, by the second core network device, a registration operation or a handover operation to register or hand over the terminal with or to the second network.

Optionally, if the second access network device cannot determine, based on the second network slice information carried in the request message, the second core network device that can serve the terminal, the second access network device may forward the request message to a second default core network device in the second network. The second default core network device determines, based on the second network slice information and the subscription information of the terminal, whether the second default core network device is capable of serving the terminal. If the second default core network device is capable of serving the terminal, the second default core network device performs the registration operation, and registers the terminal with the second network. If the second default core network device is incapable of serving the terminal, the second default core network device selects a second core network device for the terminal, and sends information (for example, an identifier or a group identifier of a second core network service entity) about the selected second core network device to the second access network device. The second access network device selects, based on the information about the second core network device, the second core network device serving the terminal.

Optionally, the request message further carries a handover indication, and the handover indication is used to instruct the second network to assign, to the terminal, a session address that is the same as a session address assigned by the first network to the terminal. The session address herein may be a packet data session (Packet Data Unit or Protocol Data Unit (PDU) session), or an address of a packet data network connection (Packet Data Network (PDN) Connection), for example, an Internet Protocol (IP) address of the PDU session or the PDN connection.

The request message may further carry a session identifier that is used to identify a session. The session is established in the first network slice and is re-established in the second network slice, or is changed from the first network slice to the second network slice.

S103: The terminal receives an accept message returned by the second network, where the accept message carries network slice information accepted by the second network.

In this embodiment of the present disclosure, that the terminal receives an accept message returned by the second network may include the following steps: receiving, by the second access network device, the accept message from the second core network device, and forwarding, by the second access network device, the accept message to the terminal. The accept message may be a registration accept message corresponding to the registration request message. The accept message may carry the network slice information accepted by the second network (or allowed by the second network for the terminal to access, or selected by the second network for the terminal). Herein, the network slice information accepted by the second network may be the same as or different from the second network slice information, or may be a part or all of the second network slice information.

Optionally, the accept message may further carry third network slice information to which the network slice information accepted by the second network is mapped. The third network slice information is information about a third network slice and the third network slice is a network slice in the first network. The third network slice information is used to update a mapping relationship between the first network slice information and the second network slice information on the terminal, or store the mapping relationship carried in the accept message.

If the request message carries the handover indication, the accept message may not carry the third network slice information to which the network slice information accepted by the second network is mapped.

It can be learned that in this implementation, the terminal may determine the second network slice information to which the first network slice information is mapped, and send the request message to the second network, where the request message carries the second network slice information and is used for the terminal to request to register with or be handed over to the second network slice. Correspondingly, the terminal may receive the accept message returned by the second network, where the accept message carries the network slice information accepted by the second network. This implements a handover of the terminal between network slices of different networks.

Figure 2:
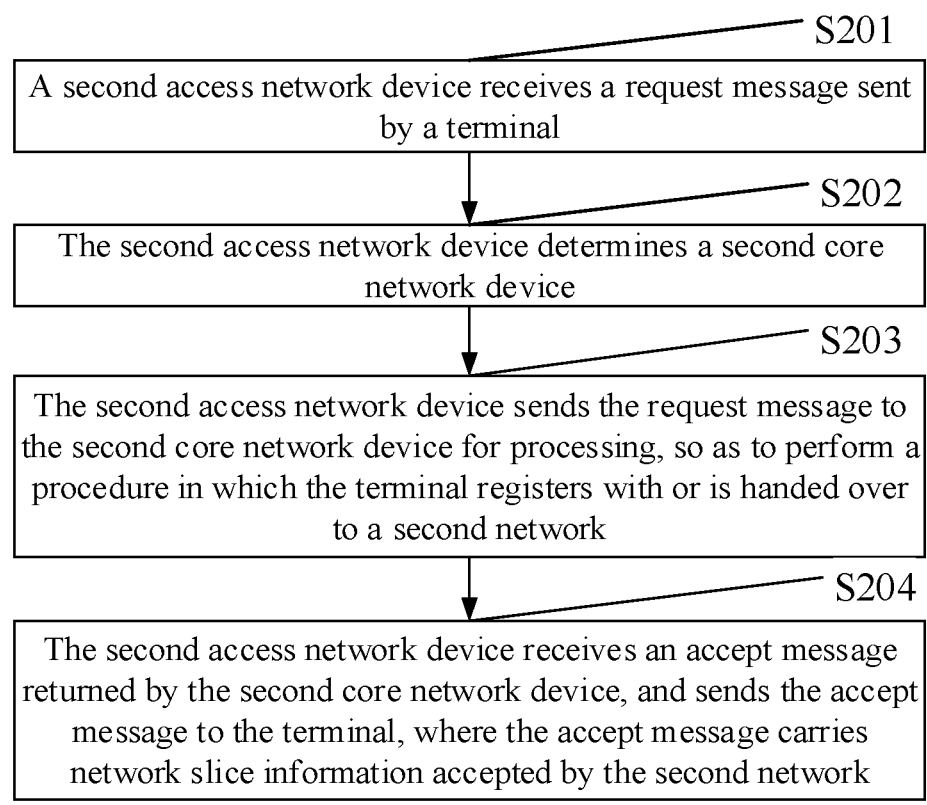
FIG. 2 is a schematic flowchart of another inter-network change method according to an embodiment of the present disclosure.

FIG. 2 is a schematic flowchart of another inter-network change method disclosed in an embodiment of the present disclosure. The inter-network change method in FIG. 2 is described from a perspective of a target network with which a terminal is to register or to which a terminal is to be handed over, that is, a second network side. As shown in FIG. 2, the inter-network change method may include the following steps.

S201: A second access network device receives a request message sent by the terminal.

The request message carries second network slice information to which first network slice information is mapped. The first network slice information is information about a first network slice accessed by the terminal, and the second network slice information is information about a second network slice. The first network slice is a network slice in a first network, and the second network slice is a network slice in a second network.

The request message may further carry a handover indication, and the handover indication is used to instruct the second network to assign, to the terminal, a session address that is the same as a session address assigned by the first network to the terminal. The session address herein may be a packet data session (Packet Data Unit or PDU session), or an address of a PDN Connection, for example, an IP address of the PDU session or the PDN connection.

The request message may further carry a session identifier that is used to identify a session. The session is established in the first network slice and is re-established in the second network slice, or is changed from the first network slice to the second network slice.

S202: The second access network device determines a second core network device.

The second core network device is a core network device in the second network slice.

S203: The second access network device sends the request message to the second core network device for processing, in order to perform a procedure in which the terminal registers with or is handed over to the second network.

S204: The second access network device receives an accept message returned by the second core network device, and sends the accept message to the terminal, where the accept message carries network slice information accepted by the second network.

In this embodiment of the present disclosure, when the second access network device cannot determine a second core network device that supports the second network slice, the second access network device forwards the request message to a second default core network device in the second network, such that the second default core network device selects, based on the second network slice information and subscription information of the terminal, the second core network device that supports the second network slice, and sends the request message to the second core network device for processing, in order to perform the procedure in which the terminal registers with or is handed over to the second network.

For example, if the first network is a 5G network and the second network is a 4G network, when the terminal is handed over from the 5G network to the 4G network, an access network (e.g., Radio Access Network (RAN)) device in the 4G network may select a second core network device that supports a second network slice that is identified (or described) using a DCN type and/or a DCN ID. The second core network device may be an MME in a DCN. The MME processes the request message to complete a registration or handover procedure of the terminal in the 4G network.

If the RAN device in the 4G network cannot identify the second network slice information (for example, the DCN type and/or the DCN ID) or does not support an enhanced Dedicated Core Network (eDecor) mechanism, the RAN device may send the request message to a default core network device, namely, a default mobility management entity (MME). By default, the MME determines whether the MME is capable of serving the terminal. If the MME is capable of serving the terminal, the MME processes the request message and completes a registration procedure of the terminal in the 4G network. If the MME is incapable of serving the terminal, by default the MME selects a new MME based on the second network slice information and the subscription information of the terminal, and sends a group identifier or an identifier of the new MME to the RAN device. The RAN device sends the request message to the new MME, to complete the registration or handover procedure of the terminal in the 4G network.

For another example, if the first network is a 4G network and the second network is a 5G network, when the terminal is to register with the 5G network or is to be handed over from the 4G network to the 5G network, an Access Network (AN) in the 5G network may select a second core network device that supports a second network slice identified by the second network slice information. The second core network device may be a Serving Common Control Network Function (S-CCNF) entity or an Access and Mobility Management Function (AMF) entity in an S-CCNF entity. The AN forwards the request message to the S-CCNF (or AMF) entity, processes the request message, and completes a registration or handover procedure of the terminal in the 5G network.

Optionally, if the AN in the 5G network cannot select an S-CCNF entity that supports the second network slice identified by the second network slice information, the AN sends the request message to a default core network service entity (e.g., a default Common Control Network Function (CCNF) entity) or a Network Slice Selection Function (NSSF) entity or an AMF in a default CCNF entity. The default CCNF (or AMF/NSSF) entity selects, based on the request message, the S-CCNF entity in the second network slice identified by the second network slice information, and forwards the request message to the S-CCNF entity, or forwards the request message to the S-CCNF entity through the AN in the 5G network, and the S-CCNF entity processes the request message, to complete a registration procedure of the terminal in the 5G network.

It can be learned that in this embodiment of the present disclosure, the second access network device may receive the request message sent by the terminal, where the request message carries the second network slice information to which the first network slice information is mapped. The second access network device determines the second core network device and sends the request message to the second core network device for processing, in order to perform a procedure in which the terminal registers with or is handed over to the second network. Further, the second access network device receives the accept message returned by the second core network device and sends the accept message to the terminal, where the accept message carries the network slice information accepted by the second network. This implements a handover of the terminal between network slices of different networks.

Figure 3A:
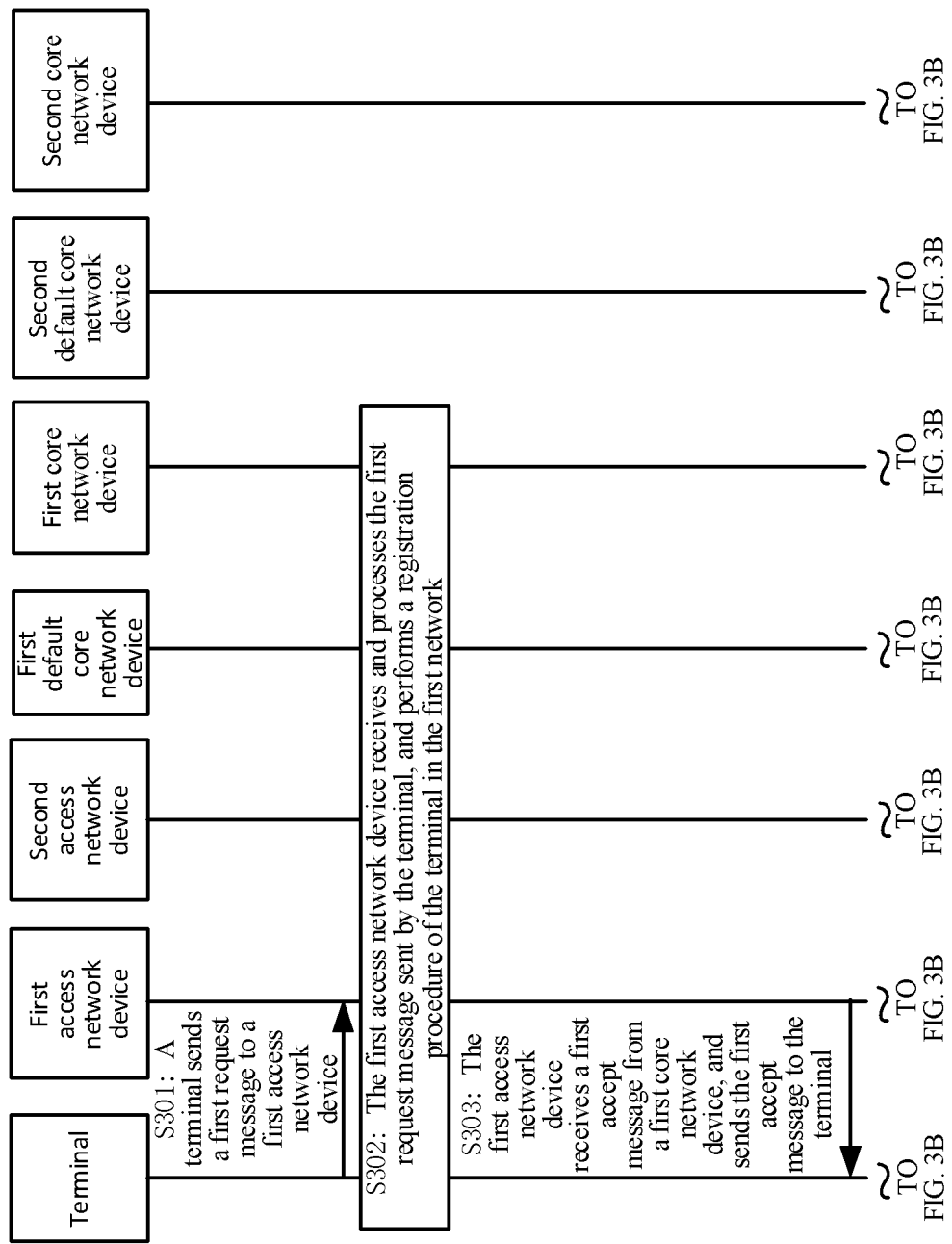
Figure 3C:
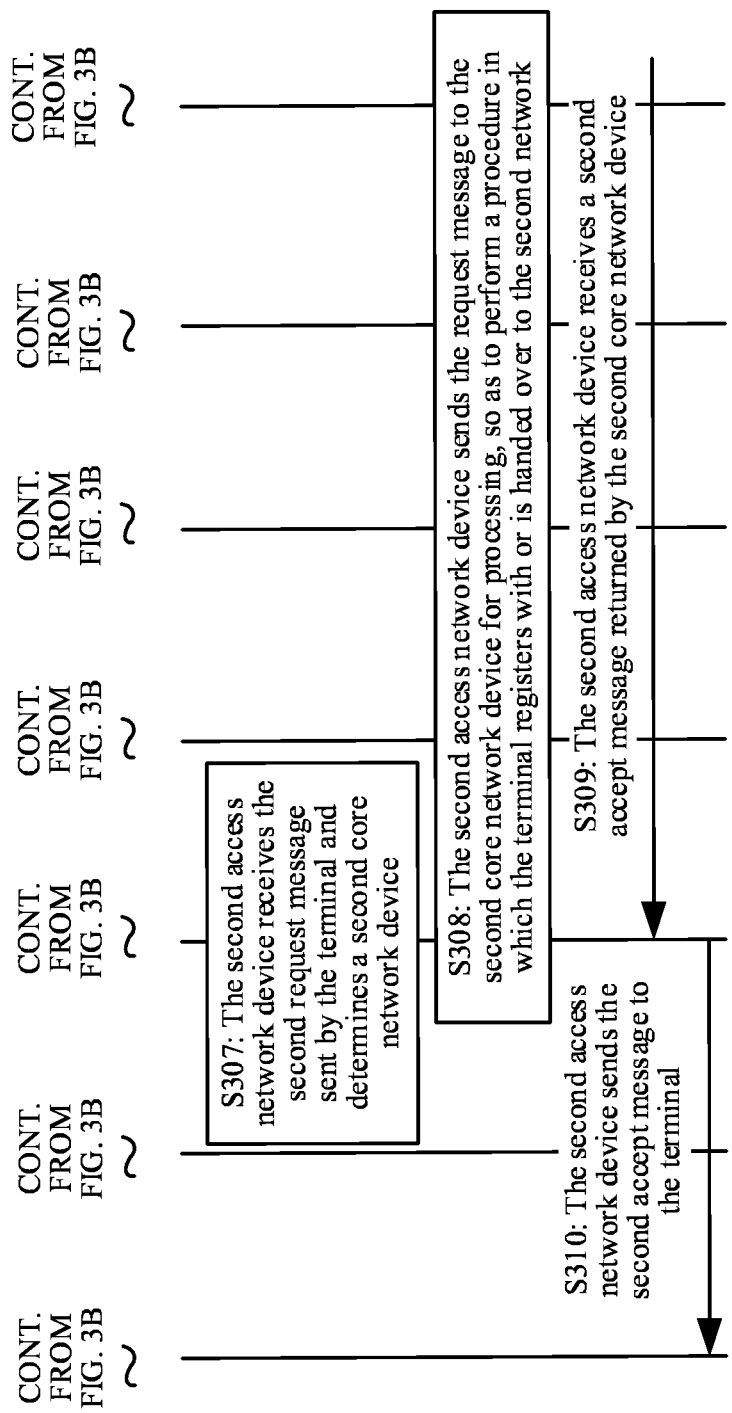

FIG. 3 (including FIG. 3A, FIG. 3B, and FIG. 3C) is a schematic flowchart of still another inter-network change method disclosed in an embodiment of the present disclosure. The inter-network change method shown in FIG. 3 is described from a manner of interaction among a terminal, a first network, and a second network. In the inter-network change method shown in FIG. 3, the first network includes a first access network device, a first network slice, accessed by the terminal, in the first network may include a first core network device, the second network includes a second access network device, and the second network slice, in the second network, to which the terminal requests to be handed over may include a second core network device. Optionally, the first network may further include a first default core network device, and the second network may further include a second default core network device. Further, the inter-network change method shown in FIG. 3 may include the following steps.

S301: The terminal sends a first request message to the first access network device.

In this embodiment of the present disclosure, the first request message may be a registration request message used by the terminal to register with the first network, and the first request message may carry a terminal identifier and first network slice information of the first network that the terminal requests to access. The terminal identifier may be an IMSI or a temporary identity of the terminal in the first network.

S302: The first access network device receives and processes the first request message sent by the terminal, and performs a registration procedure of the terminal in the first network.

The registration procedure includes: The first core network device and/or the first access network device may perform authentication on the terminal, negotiate a security/encryption parameter, and the like, and select, based on the first network slice information and subscription information of the terminal, the first network slice and the first core network device, and establish a session or a packet data network connection, and the like for the terminal.

For example, when the first network is a 5G network, an access network (AN) in the 5G network selects a core network service entity such as an S-CCNF entity that supports network slice information based on the network slice information carried in a request message. The S-CCNF entity selects a corresponding network slice for the terminal based on the network slice information and the subscription information of the terminal. Optionally, the S-CCNF entity may further establish a session with the terminal. A session identifier of the session may be carried in a request message for registering with or handing over to the second network. This way, the session established in the first network slice identified by the first network slice information of the first network can be re-established in the second network slice of the second network, or can be changed from the first network slice to the second network slice.

For another example, when the first network is a 4G network, an access network (e.g., RAN) or a default MME in the 4G network may select, based on network slice information carried in a request message and the subscription information of the terminal, a network slice DCN and an MME that supports the network slice information for the terminal. Optionally, the MME may establish a PDN connection to the terminal.

S303: The first access network device receives a first accept message from the first core network device, and sends the first accept message to the terminal.

Optionally, in this embodiment of the present disclosure, the first accept message carries network slice information accepted by the first network (in other words, the terminal is allowed to access, or selected for the terminal). The network slice information may include a part or all of the first network slice information in the first request message. This embodiment of the present disclosure is described using an example in which the network slice information accepted by the first network is the same as the first network slice information in the first request message. The information is not distinguished in the following description. The first accept message may be a registration accept message of the first network.

Optionally, the first accept message may further carry second network slice information to which the first network slice information is mapped, such that the terminal stores or updates a mapping relationship between the network slice information.

S304: The terminal discovers the second network by measuring a cell signal, and determines to move or be handed over to the second network.

S305: The terminal determines the second network slice information to which the first network slice information is mapped.

S306: The terminal sends a second request message to the second access network device, where the second request message carries the second network slice information and is used for the terminal to request to register with or be handed over to the second network.

Optionally, if the terminal is in connected mode, the second request message may further carry a handover indication, and the handover indication is used to instruct the second network to assign, to the terminal, a session address that is the same as a session address assigned by the first network to the terminal.

The second request message may be a registration request message of the second network, including an attach request message or a tracking area update request message.

S307: The second access network device receives the second request message sent by the terminal and determines the second core network device.

S308: The second access network device sends the request message to the second core network device for processing, in order to perform a procedure in which the terminal registers with or is handed over to the second network.

Optionally, if the second access network device cannot determine the second core network device, the second access network device may forward the second request message to the second default core network device. Additionally, the second default core network device determines the second core network device and forwards the second request message to the second core network device for processing, in order to perform the procedure in which the terminal registers with or is handed over to the second network.

S309: The second access network device receives a second accept message returned by the second core network device.

S310: The second access network device sends the second accept message to the terminal.

The second accept message may be a registration accept message of the second network, including an attach accept message or a tracking area update accept message.

Optionally, the second accept message further carries third network slice information to which the network slice information accepted by the second network is mapped, such that the terminal may update the locally configured or stored mapping relationship between the first network slice information and the second network slice information in time. The third network slice information is information about a third network slice, and the third network slice is a network slice in the first network.

It can be learned that in the inter-network change method shown in FIG. 3, the terminal may determine, based on the measurement of cell signal, to move or be handed over to the second network, and register with the second network based on the second network slice information to which the first network slice information is mapped. This implements a handover of the terminal between network slices of different networks.

Particularly, the methods shown in FIG. 1 to FIG. 3 may be applicable to a scenario in which the terminal is in idle mode, or the terminal is in connected mode and has a relatively low requirement for a handover delay (in other words, a session is allowed to be interrupted for a relatively long time).

Figure 4:
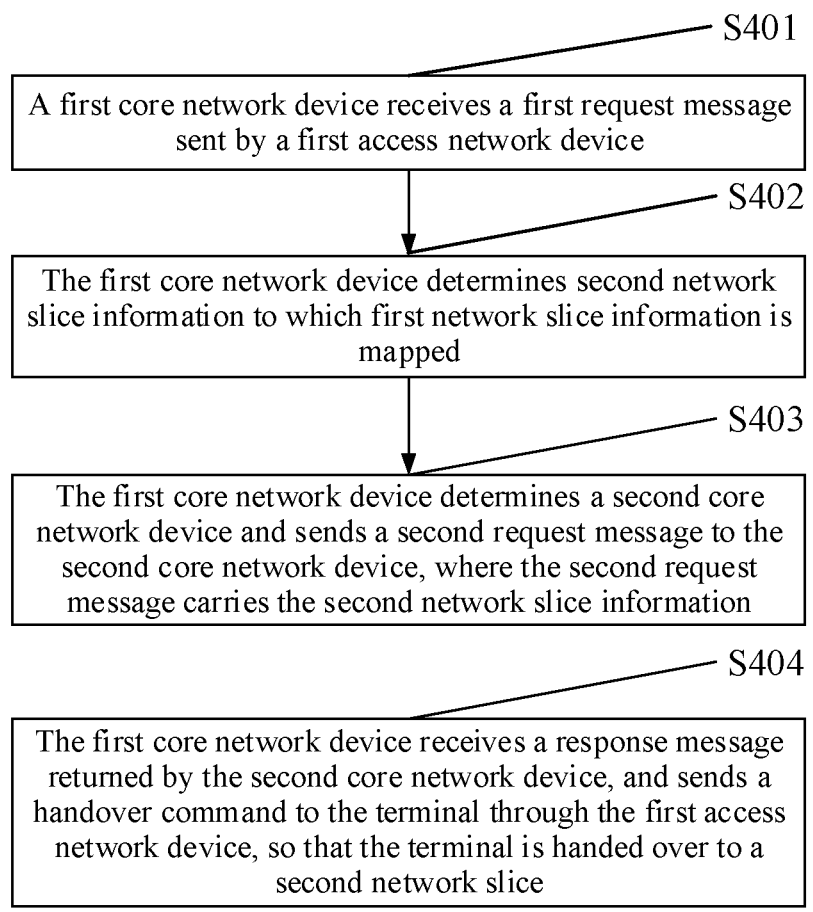
FIG. 4 is a schematic flowchart of still another inter-network change method according to an embodiment of the present disclosure.

FIG. 4 is a schematic flowchart of still another inter-network change method disclosed in an embodiment of the present disclosure. The inter-network change method shown in FIG. 4 may include the following steps.

S401: A first core network device receives a first request message sent by a first access network device.

The first request message is used for a terminal to request to be handed over to a second network.

S402: The first core network device determines second network slice information to which first network slice information is mapped.

S403: The first core network device determines a second core network device and sends a second request message to the second core network device, where the second request message carries the second network slice information.

In this embodiment of the present disclosure, the request message may be a handover request message or a forwarding relocation request message. The first core network device may select, based on the second network slice information, the second core network device that supports a second network slice.

The request message may carry a session identifier that is used to identify a session. The session is established in a first network slice and is re-established in the second network slice, or is changed from the first network slice to the second network slice.

For example, if the first network is a 5G network and the second network is a 4G network, a core network service entity such as an S-CCNF entity (or an AMF entity in an S-CCNF entity) in the 5G network may select, based on network slice information of the 4G network and subscription information of the terminal, an MME that supports a DCN identified by the network slice information of the 4G network. For another example, if the first network is a 4G network and the second network is a 5G network, an MME in the 4G network may select, based on network slice information of the 5G network, a core network service entity (e.g., S-CCNF entity) that supports a network slice identified by the network slice information. An existing MME needs to be modified to implement this implementation, and the modified MME may be referred to as an enhanced MME.

S404: The first core network device receives a response message returned by the second core network device, and sends a handover command to the terminal through the first access network device, such that the terminal is handed over to the second network slice.

In this embodiment of the present disclosure, when receiving the request message, the second core network device may select the second network slice based on the second network slice information carried in the request message, and send the request message to a Session Management Function (SMF) entity in the second network slice. Then, the SMF entity selects a User Plane Function (UPF) entity in the second network slice, for example, a gateway, to establish a packet data session. In addition, the second core network device sends a handover request message to the second access network device in the second network, where the handover request message carries a parameter such as the second network slice information, such that the second access network device may select a second network slice instance for the terminal and determine a radio resource. When receiving a handover request acknowledgment message sent by the SMF entity and the second access network device, the second core network device may send a response message to the first core network device. The response message may be a forwarding relocation response message. The response message carries parameters, such as a list of the established packet data sessions mentioned above and a transparent container that is sent by a target access network node to a source access network node.

It can be learned that in the inter-network change method shown in FIG. 4, the first core network device may determine the second network slice information to which the first network slice information is mapped. The first core network device determines the second core network device and sends the request message to the second core network device, where the request message carries the second network slice information. Further, the first core network device receives the response message returned by the second core network device and sends the handover command to the terminal, such that the terminal is handed over to the second network slice. This implements a handover of the terminal between network slices of different networks.

Figure 5:
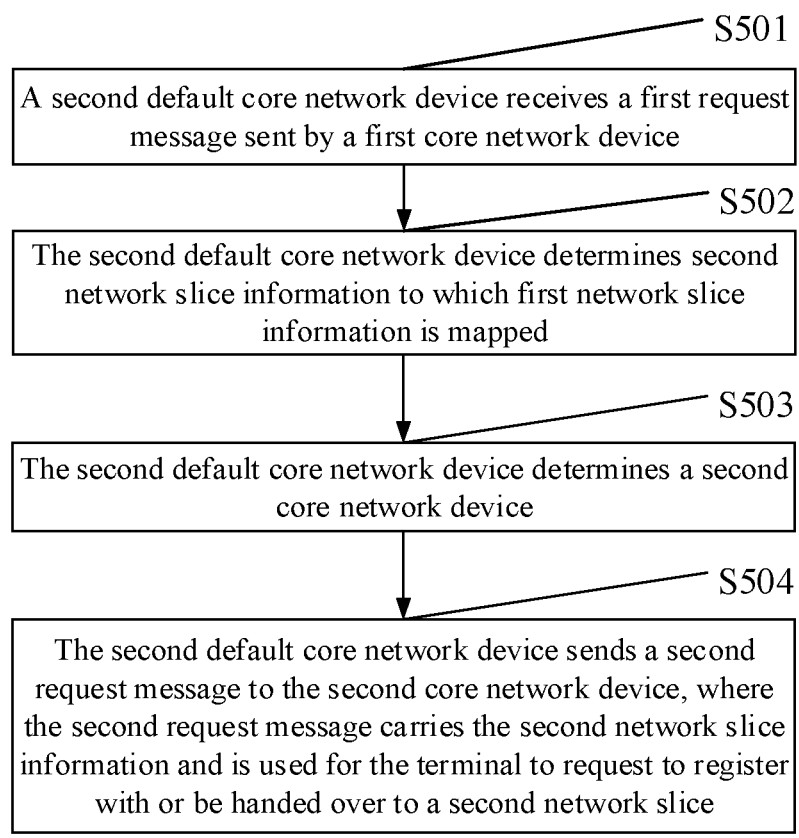
FIG. 5 is a schematic flowchart of still another inter-network change method according to an embodiment of the present disclosure.

FIG. 5 is a schematic flowchart of still another inter-network change method disclosed in an embodiment of the present disclosure. A difference from the inter-network change method shown in FIG. 4 lies in that, the inter-network change method shown in FIG. 5 may also be implemented without modifying an MME in a 4G network. In other words, a second network with which a terminal is to register with or to which a terminal is to be handed over determines second network slice information and a second core network service entity. The inter-network change method shown in FIG. 5 may include the following steps.

S501: A second default core network device receives a first request message sent by a first core network device.

The first request message is used for the terminal to request to register with or be handed over to the second network, and the first request message carries the first network slice information.

The first request message may carry a session identifier that is used to identify a session. The session is established in a first network slice and is re-established in a second network slice, or is changed from the first network slice to the second network slice.

S502: The second default core network device determines the second network slice information to which first network slice information is mapped.

The first network slice information is information about the first network slice accessed by the terminal, the second network slice information is information about the second network slice, the first network slice is a network slice in a first network, and the second network slice is a network slice in the second network.

S502: The second default core network device determines a second core network device.

S503: The second default core network device sends a second request message to the second core network device, where the second request message carries the second network slice information and is used for the terminal to request to register with or be handed over to the second network slice.

Optionally, the first request message may further carry a handover indication. The handover indication is used to instruct the second network to assign, to the terminal, a session address that is the same as a session address assigned by the first network to the terminal.

For example, when the first network is a 4G network, the second network is a 5G network, and an MME in the 4G network receives a handover request sent by an access network (AN) in the 4G network, the MME sends a request message to a default core network service entity such as a Default Common Control Network Function (CCNF) (or an NSSF entity or an AMF entity in a Default CCNF entity) in the 5G network. The request message carries network slice information of the 4G network accessed by the terminal, for example, a DCN ID. The Default CCNF entity determines network slice information, of the 5G network, to which the DCN ID is mapped in the 5G network, and selects a core network service entity such as an S-CCNF entity (or an AMF entity in an S-CCNF entity) that supports a network slice identified by the network slice information of the 5G network. The Default CCNF entity sends a forwarding redirection request message to the S-CCNF entity. The forwarding redirection request message carries the network slice information of the 5G network. The S-CCNF entity establishes a packet data session in the network slice of the 5G network and sends a handover request message to an access network (AN) in the 5G network. The AN in the 5G network returns a handover request acknowledgment message. The AN in the 5G network may select a 5G access network slice instance for the terminal and determine a radio resource.

When receiving the handover request acknowledgment message sent by the access network in the 5G network, the S-CCNF entity may send a response message to the MME. The response message may be a forwarding relocation response message. The response message carries parameters, such as a session list of the established packet data sessions and a transparent container that is sent by a target access network node to a source access network node. Then, the terminal performs a handover operation to access the 5G network.

It can be learned that the second default core network device may determine the second network slice information to which the first network slice information is mapped, determines the second core network device, and sends the second request message to the second core network device, where the second request message carries the second network slice information and is used for the terminal to register with the second network. In this implementation, when the terminal is handed over from the 4G network to the 5G network, the 5G network determines the corresponding network slice information in the 5G network, and may further determine the core network service entity supporting the network slice information. In this way, the MME in the 4G network does not need to be modified, such that a difficulty of implementing the inter-network change method is reduced.

Figure 6B:
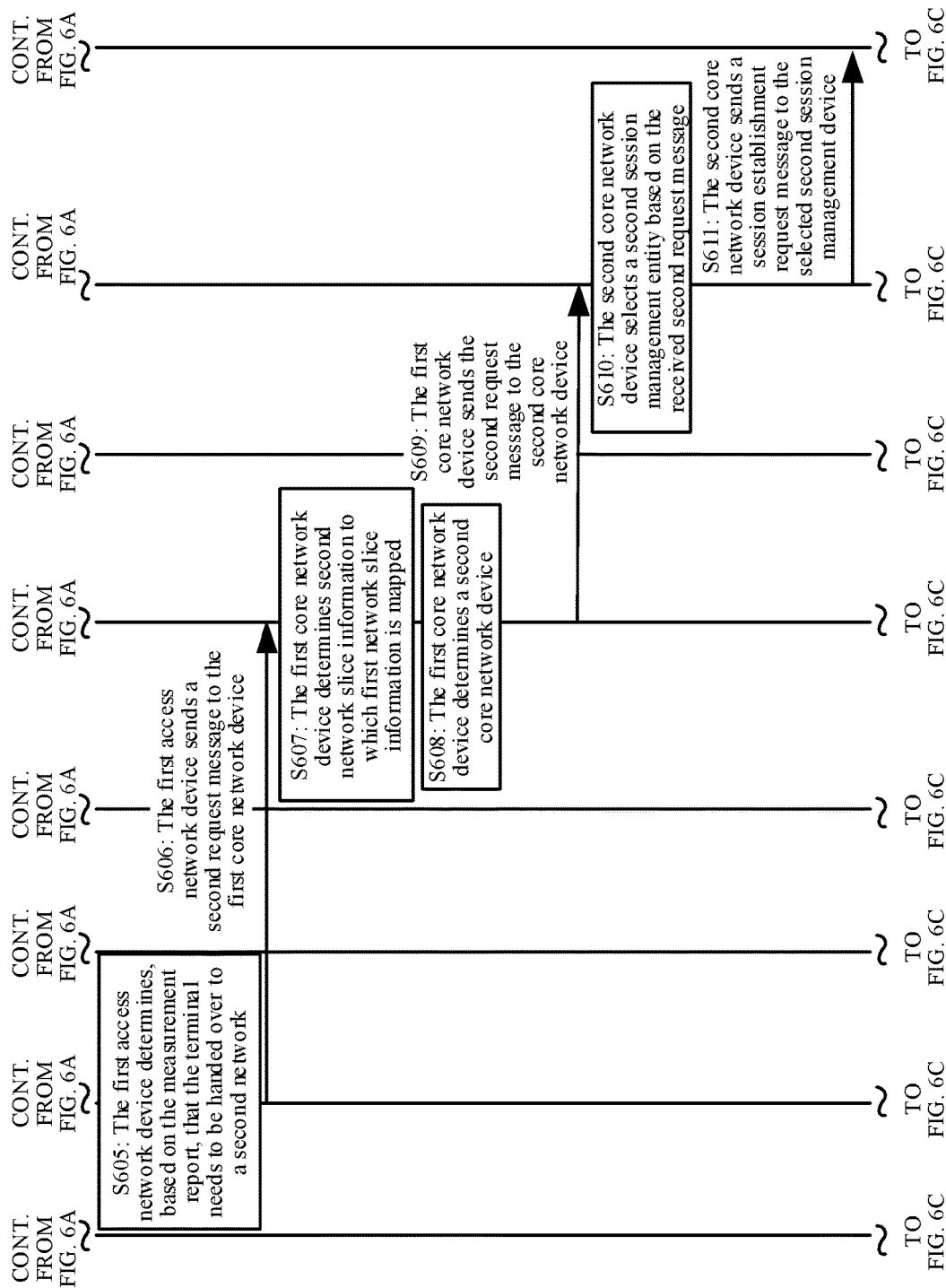
Figure 6C:
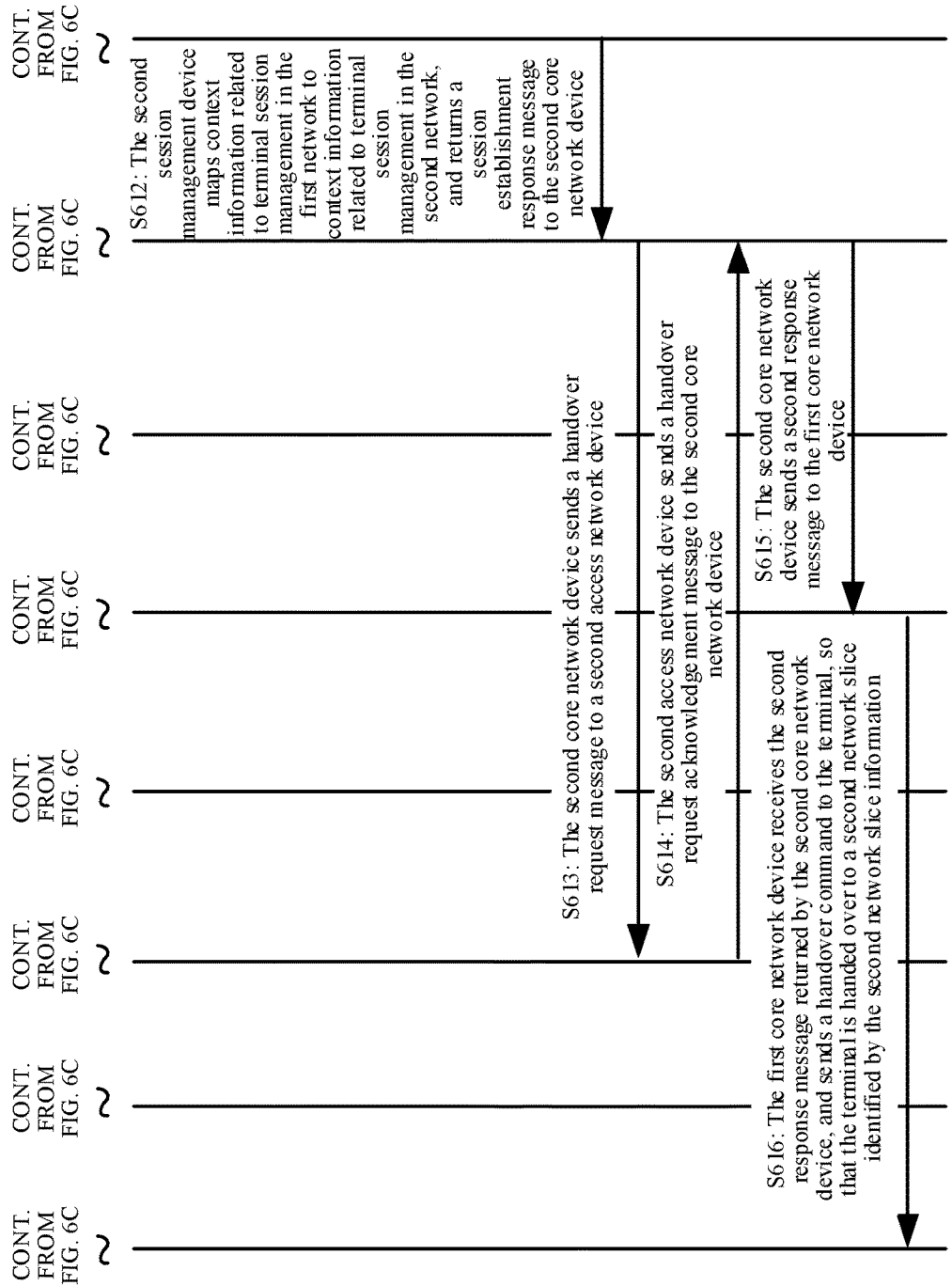

FIG. 6A, FIG. 6B, and FIG. 6C each depict a schematic flowchart of a still another inter-network change method disclosed in an embodiment of the present disclosure. The inter-network change method shown in FIG. 6 is described from a manner of interaction among a terminal, a first network, and a second network. In the inter-network change method shown in FIG. 6, the first network includes a first access network device, and a first network slice, accessed by the terminal, in the first network may include a first core network device and a first session management entity. The second network includes a second access network device, and a second network slice, in the second network, to which the terminal requests to be handed over may include a second core network device and a second session management device. When the first network is a 4G network and the second network is a 5G network, the first access network device is a 4G AN, the first core network device is an MME, the first session management device is a Serving Gateway (S-GW) and/or a PDN Gateway (P-GW), the second access network device is a 5G AN, the second core network device is an S-CCNF (or AMF) entity, and the second session management device is an SMF entity.

The inter-network change method shown in FIG. 6 may include the following steps.

S601: The terminal sends a first request message to the first access network device.

In this embodiment of the present disclosure, the first request message may be a registration request message. The first request message carries a terminal identifier and first network slice information of a network slice that the terminal requests to access. The terminal identifier may be an IMSI or a temporary identity of the terminal in the first network.

S602: The first access network device receives and processes the first request message, and performs a registration procedure of the terminal accessing the first network.

The registration procedure may include: The first network core network device may perform operations, for example, perform authentication on the terminal, negotiate a security/ encryption parameter, and select, for the terminal based on the first network slice information and subscription information of the terminal, the first network slice and the first core network device that supports the first network slice.

S603: The first access network device receives a first accept message from the first core network device, and sends the first accept message to the terminal.

In this embodiment of the present disclosure, the first accept message carries network slice information accepted by the first network (in other words, the terminal is allowed to access, or selected for the terminal). The network slice description information may be the same as the first network slice information in the first request message or a subset of the first network slice information. By way of example, they are the same in this embodiment of the present disclosure and are not differentiated in the following.

Optionally, the registration procedure may further include: establishing, by the terminal, a packet data session with the first network.

S604: The terminal reports a measurement report to the first access network device.

In this embodiment of the present disclosure, the measurement may include signal measurement information of a serving cell and/or a neighboring cell, and the like.

S605: The first access network device determines, based on the measurement report, that the terminal needs to be handed over to the second network.

S606: The first access network device sends a second request message to the first core network device.

In this embodiment of the present disclosure, the second request message may be a handover request message. The second request message carries the terminal identifier, a node identifier of the second access network device, a radio resource parameter allocated by the first access network device to the terminal, and the like. The radio resource parameter allocated by the first access network device to the terminal may also be referred to as a transparent container (Source to Target Transparent Container) sent by a source access network node to a target access network node.

S607: The first core network device determines second network slice information to which the first network slice information is mapped.

The first network slice information is information about the first network slice accessed by the terminal, the second network slice information comprises information about the second network slice, the first network slice is a network slice in the first network, and the second network slice is a network slice in the second network.

S608: The first core network device determines the second core network device.

The second core network device is a core network device in the second network slice and is determined by the first core network device based on the second network slice information.

S609: The first core network device sends the second request message to the second core network device.

For example, the second request message in this step may further carry the second network slice information. Alternatively, the second request message that carries the second network slice information may be a forwarding relocation request message.

S610: The second core network device selects a second session management entity based on the received second request message.

For example, when the second core network device is an MME, the MME selects the second session management device that supports a DCN ID of the second network slice information, namely, a Packet Data Network (PDN) Gateway (GW) and a Serving Gateway (S-GW). In addition, the MME may map a mobility management (MM) context (e.g., UE MM context) and a session management (SM) context (e.g., UE SM context) of the 5G network to a terminal context (e.g., UE context) in the 4G network. The UE context may include a PDN connection, information about a 4G evolved packet system (EPS) bearer, and the like.

For another example, when the second core network device is an S-CCNF (or AMF) entity, the S-CCNF (or AMF) entity selects a specific 5G NSI and selects an SMF entity in the NSI. In addition, the S-CCNF (or AMF) entity maps information related to UE Mobility Management (MM) in the 4G UE context to the 5G terminal mobility management context (e.g., UE MM context) and maps an authentication/security parameter in the 4G UE context to a 5G UE authentication/security parameter for storing.

S611: The second core network device sends a session establishment request message to the selected second session management device.

The session establishment request message carries the terminal identifier, context information related to terminal session management, and the like.

S612: The second session management device maps context information related to terminal session management in the first network to context information related to terminal session management in the second network, and returns a session establishment response message to the second core network device.

S613: The second core network device sends a handover request message to the second access network device.

S614: The second access network device sends a handover request acknowledgement message to the second core network device.

For example, if the second access network device is a 5G access network, the second access network device may select a 5G access network slice instance for the terminal and determine a radio resource.

S615: The second core network device sends a second response message to the first core network device.

Corresponding to step S609, the second response message may be a forwarding relocation response message, and the second response message may carry a packet data session address and the context information of terminal session management.

S616: The first core network device receives the second response message returned by the second core network device, and sends a handover command to the terminal, such that the terminal is handed over to the second network slice identified by the second network slice information.

For example, that the first core network device sends a handover command to the terminal, such that the terminal is handed over to the second network slice may include the following operations: The first core network device sends the handover command to the first access network device; the first access network device forwards the handover command to the terminal, where the handover command carries a bearer list of to-be-released radio access bearers, a radio resource parameter, or the like; the terminal accesses the second access network device according to the handover command, and sends a handover complete message to the second access network device; the second access network device sends a handover notification message to the second core network device; the second core network device sends a forwarding redirection complete notification message to the first core network device; the second core network device sends a modify bearer request message to the second session management entity; the second session management device returns a modify bearer response message to the second core network device; the terminal initiates a Tracking Area Update (TAU) procedure to the second core network device; the first core network device sends a session deletion request message to the first session management device; and the first session management device releases a packet data session resource of the terminal in the first network and returns a session deletion response message to the first core network device.

It should be noted that, the core network device and the session management device may be combined in the 5G network. If the core network device and the session management device are combined, operations between the two devices may not be performed. Correspondingly, the operations between the two devices may be all performed by the core network device.

In addition, it should be noted that, when the first network is the 4G network and the second network is the 5G network, steps S608 and S609 may be performed by the second network, namely, a default core network service entity in the 5G network. For example, steps S608 and S609 may be replaced with the following operations: receiving, by a second default core network device, a request message sent by the core network device in the first network, where the request message carries information about the first network slice accessed by the terminal; determining, by the second default core network device in the second network, the second network slice information to which the first network slice information is mapped; determining, by the second default core network device, the second core network device; and sending, by the second default core network device, a request message to the second core network device, where the request message carries the second network slice information, and the request message is used for the terminal to request to register with or be handed over to the second network slice in the second network.

In this implementation, the core network device in the 4G network does not need to be modified, such that a difficulty of implementing the inter-network change method is reduced.

Particularly, the inter-network change methods shown in FIG. 4 to FIG. 6 are applicable to a scenario in which the terminal is in connected mode or a to-be-changed session has a relatively high requirement on a handover delay (in other words, a session is allowed to be interrupted or changed for a relatively short time).

Figure 7A:
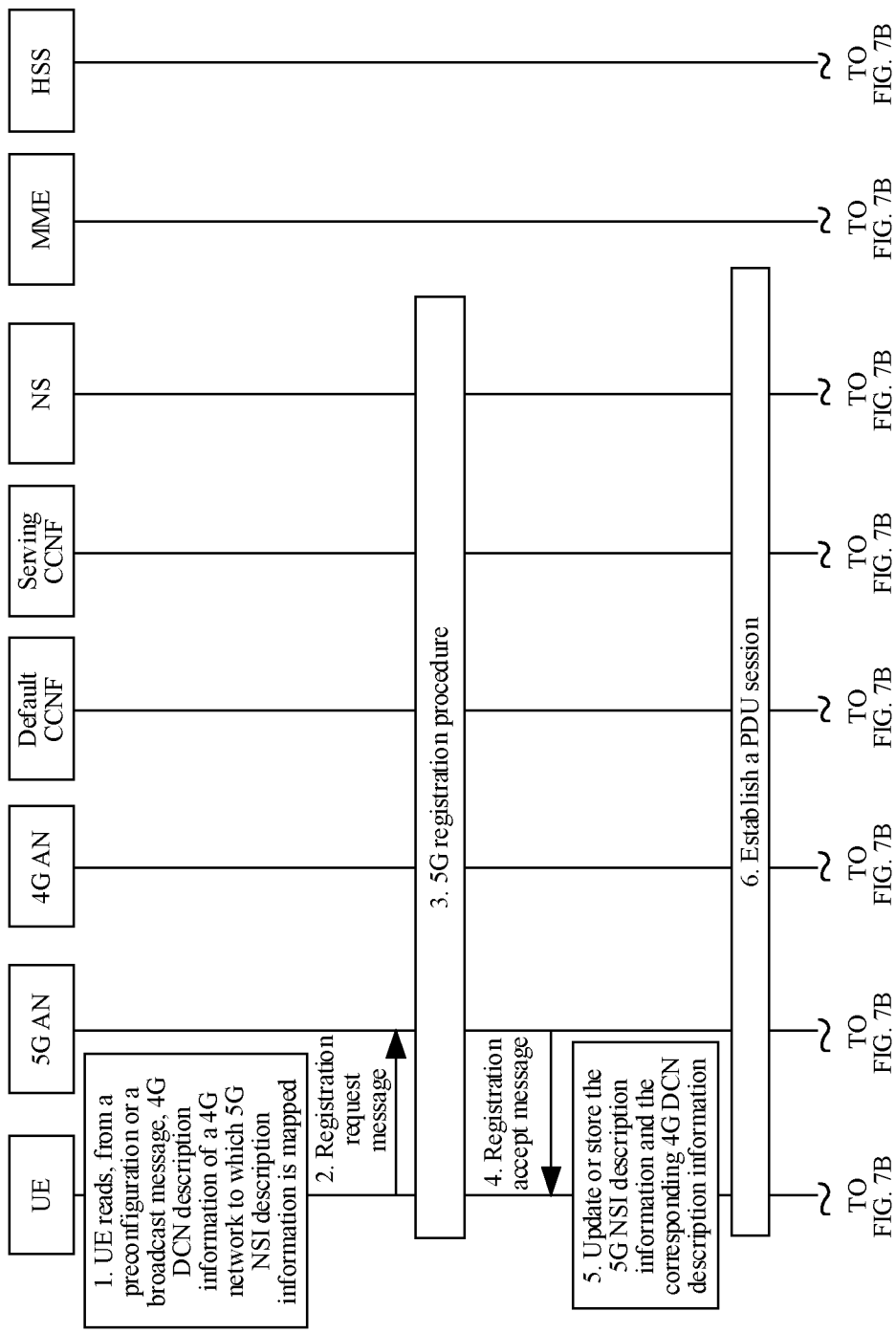
FIG. 7A and FIG. 7B are schematic flowcharts of handing over UE from a 5G network to a 4G network according to an embodiment of the present disclosure.
Figure 7B:
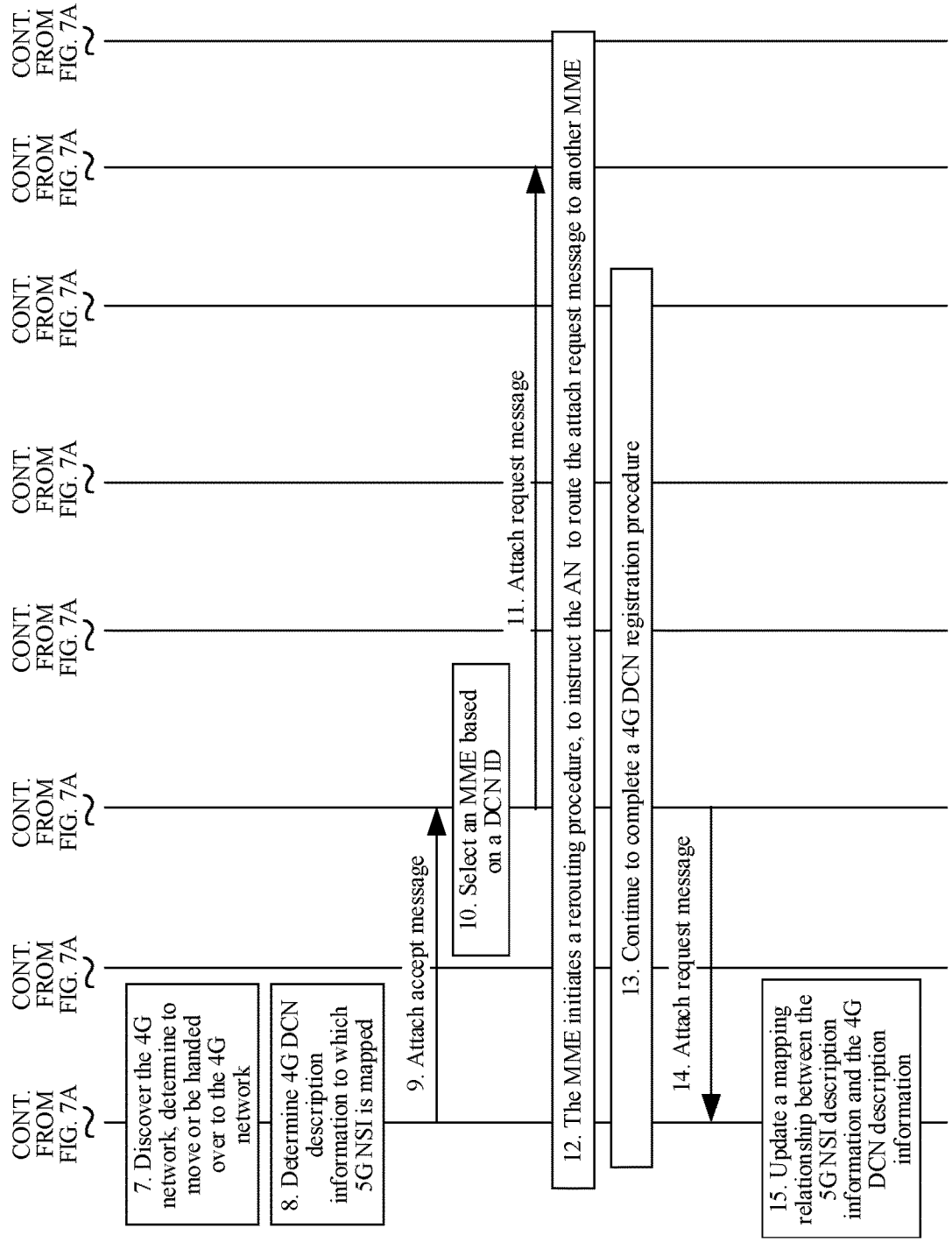

FIG. 7A and FIG. 7B each depict a schematic flowchart of handing over a terminal from a 5G network to a 4G network according to an embodiment of the present disclosure. In the embodiments shown in FIG. 7 to FIG. 12, the terminal may be a user equipment (UE), while an access network device in the 5G network is a 5G Access Network (AN) node, a core network device in the 5G network is a Serving Common Control Network Function (S-CCNF) entity in the 5G network, a default core network device in the 5G network is a Default Serving Common Control Network Function (Default S-CCNF) entity in the 5G network, and a network slice of the 5G network is an NS. An access network device in the 4G network is a 4G AN node, a core network device in the 4G network is a mobility management entity (MME) in the 4G network, a default core network device in the 4G network is a default mobility management entity (Default MME) in the 4G network, and a network slice of the 4G network is a dedicated core network (DCN). Optionally, the network slice of the 5G network may further include a Session Management Function (SMF) entity or an Access and Mobility Management Function (AMF) entity. The network slice of the 4G network may further include a Serving Gateway (S-GW) and/or a PDN Gateway (P-GW). Handing over the terminal from the 5G network to the 4G network may include the following steps.

1. The terminal reads, from a pre-configuration or a broadcast message, 4G DCN description information of the 4G network to which 5G NSI description information is mapped.

For example, a mapping relationship between the 5G NSI description information and the 4G DCN description information is pre-configured on the UE.

For another example, the UE reads, from system information broadcast by the 5G network, the 5G NSI description information and the corresponding 4G DCN description information.

2. The UE sends a registration request message such as a Registration Request to the 5G access network.

The Registration Request is a 5G registration/attach request message and may include a 5G Initial Registration/Attach Request message or a 5G Tracking Area Update Request message. The Registration Request carries parameters, such as a first identifier (for example, an IMSI or a temporary identity of the 5G UE) of the UE, and description information of a 5G NSI to which the UE requests to access.

3. Perform a 5G registration procedure.

The 5G registration procedure includes: A 5G core network function entity preforms steps, such as performing authentication on the UE, negotiating a security/encryption parameter, and selecting the NSI for the UE based on the description information of the 5G NSI and subscription information of the UE that are provided by the UE. Optionally, the procedure further includes a step, such as establishing a PDU session (namely, a packet data session between the UE and a core network user plane function entity, for example, a gateway).

4. The 5G AN sends, to the UE, a registration accept message such as a Registration Accept received from the 5G core network function entity.

The Registration Accept may be a 5G registration accept message. Corresponding to step 2, the Registration Accept may include a 5G Initial Registration/Attach Accept message or a 5G Tracking Area Update Accept message. The Registration Accept carries parameters, such as description information of a 5G NSI accepted (in other words, the terminal is allowed to access, or selected for the terminal) by the network. Optionally, the Registration Accept further carries 4G DCN description information corresponding to the 5G NSI description information.

5. The UE updates or stores the 5G NSI description information and the corresponding 4G DCN description information based on the 5G NSI description information and the corresponding 4G DCN description information that are carried in the registration accept message Registration Accept.

Optionally, if the Registration Accept carries the 5G NSI description information and the corresponding 4G DCN description information, the UE updates the locally configured/stored mapping relationship between the 5G NSI description information and the 4G DCN description information based on the 5G NSI description information and the corresponding 4G DCN description information that are carried in the Registration Accept.

6. Establish a PDU session between the UE and the 5G network.

For example, the UE sends a session establishment request message such as a PDU session establishment request to the 5G network. The PDU session establishment request message carries parameters, such as the first identifier (for example, the IMSI or the temporary identity of the 5G UE) of the UE, and the description information of the 5G NSI with which the UE requests to establish the session. Herein, "the description information of the 5G NSI with which the UE requests to establish the session" indicates that the session is established in the 5G NSI identified/described by the 5G NSI description information. The 5G core network function entity selects, based on the session establishment request message, the 5G NSI for establishing the session for the terminal, allocates a user plane function entity in the 5G NSI, and sends a session establishment accept (e.g., a PDU session establishment accept) message to the terminal through the 5G access network. The session establishment accept message may carry the corresponding 4G DCN description information, of the 4G network, to which the 5G NSI description information is mapped.

Optionally, step 6 may be performed in step 3, in other words, the UE simultaneously establishes the PDU session in the registration procedure. In this case, the session establishment request message may be sent by the UE to the 5G network together with the registration request message. The session establishment accept message may also be sent to the UE by the network together with the registration accept message.

7. The UE discovers the 4G network by measuring a cell signal, and determines to move or be handed over to the 4G network.

8. The UE determines, based on description information of a currently registered 5G NSI and the configured/stored mapping relationship between the 5G NSI description information and the 4G DCN description information, 4G DCN description information used when the UE moves or is handed over to the 4G network.

9. The UE sends an Attach Request message to the 4G network.

The Attach Request may be a 4G registration/attach request message or a Tracking Area Update Request message. The Attach Request may further carry parameters, such as a second identifier of the UE (the second identifier may be the same as the first identifier in step 2, for example, may also be an IMSI, or may be different, for example, may be an old global unique temporary identity (old GUTI) of the UE in the 4G network), and the 4G DCN description information (for example, a DCN ID or a UE Usage Type) corresponding to the 5G NSI. If the UE is in connected mode (in other words, currently there is an active PDU session), the Attach Request further carries a handover indication handover indication, in order to instruct the PDN GW in the 4G network to assign, to the UE, an IP address that is the same as an IP address of the PDU session activated in the 5G network.

Correspondingly, if the UE is in connected mode (in other words, if currently there is an active PDU session), the Attach Request may further carry a session identifier of the session, and carries the 4G DCN description information corresponding to the description information of the 5G NSI with which the UE establishes the session, such that the session is changed to a corresponding DCN of the 4G network, or the session is re-established in a DCN of the 4G network.

10-13. If a 4G RAN (e.g., a Node B or an evolved NodeB (eNB)) supports an enhanced dedicated core network (eDecor) or a dedicated core network (Decor) and identifies the 4G DCN description information, for example, a DCN ID, in the Attach Request (or a Tracking Area Update Request), the 4G RAN (for example, the Node B or the eNB) determines a DCN identified by the DCN ID, sends the Attach Request (or the Tracking Area Update Request) to an MME that supports the DCN, and the MME continues to process the Attach Request of the UE.

If the 4G RAN supports the eDecor/Decor but does not identify the 4G DCN description information, for example, the DCN ID or the UE Usage Type, in the Attach Request (or the Tracking Area Update Request), the 4G RAN ignores the DCN ID or the UE Usage Type, and sends the Attach Request (or the Tracking Area Update Request) to a default MME. The MME determines, based on the 4G DCN description information and the subscription information of the UE, whether the MME is capable of serving the UE. If the MME is capable of serving the UE, the MME continues to process the Attach Request of the UE (for example, sends a create session request such as a Create Session Request to the S-GW). If the MME is incapable of serving the UE, the MME performs a rerouting procedure (step 12), i.e., the MME sends information (for example, a new MME Group ID (MMEGI)) about a DCN that serves the UE to the 4G RAN, and the RAN selects a new MME based on at least the MMEGI and sends the Attach Request to the MME to continue the registration procedure of the UE in the DCN.

If the 4G network (for example, the RAN and/or the MME) does not support the eDecor, the 4G network ignores the eDecor and continues to perform the registration procedure of the UE in the 4G network.

14. The 4G RAN sends, to the UE, the Attach Accept or the Tracking Area Update Accept received from the MME.

If the 4G RAN (for example, the Node B or the eNB) supports the eDecor (that is, supports an enhanced dedicated core network selection procedure), and the Attach Accept or the Tracking Area Update Accept carries parameters, such as the description information (for example, the DCN ID) of the 4G DCN that is accepted by the 4G network (in other words, the terminal is allowed to access, or selected for the terminal). Optionally, the Attach Accept or the Tracking Area Update Accept further carries the 5G NSI description information corresponding to the 4G DCN description information. Optionally, the Attach Request or the Tracking Area Update Request carries the handover indication, and the MME may not provide, according to the handover indication, the 5G NSI description information corresponding to the 4G DCN description information, in other words, the MME may not perform step 14.

Optionally, step 15 may be further performed.

15. If the Attach Accept (or the Tracking Area Update Accept) carries the 4G DCN description information and the corresponding 5G NSI description information, optionally the UE updates the locally configured or stored 4G DCN description information and the corresponding 5G NSI description information based on the 4G DCN description information and the corresponding 5G NSI description information that are carried in the Attach Accept (or the Tracking Area Update Accept).

Figure 8A:
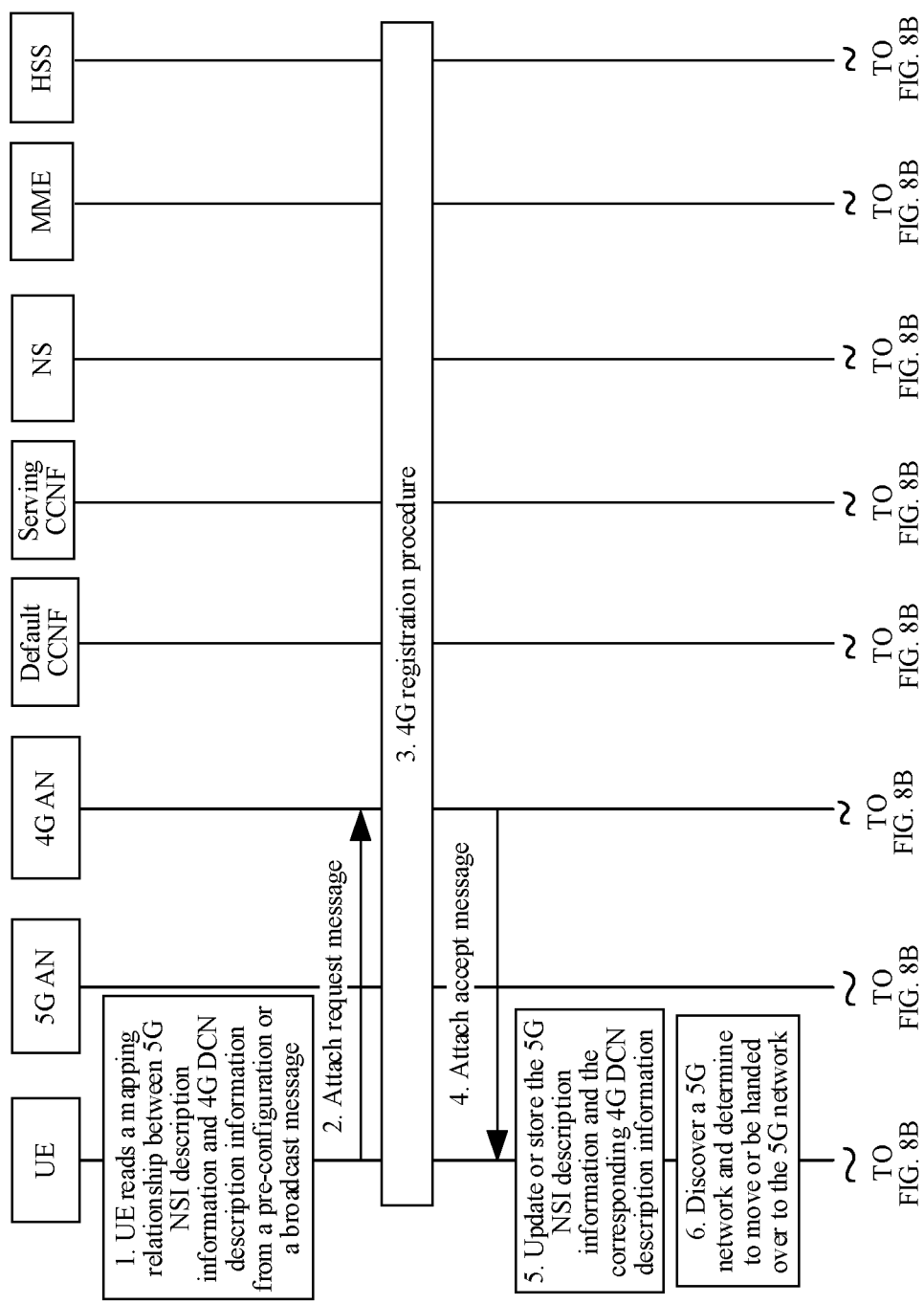
FIG. 8A and FIG. 8B are schematic flowcharts of handing over UE from a 4G network to a 5G network according to an embodiment of the present disclosure.
Figure 8B:
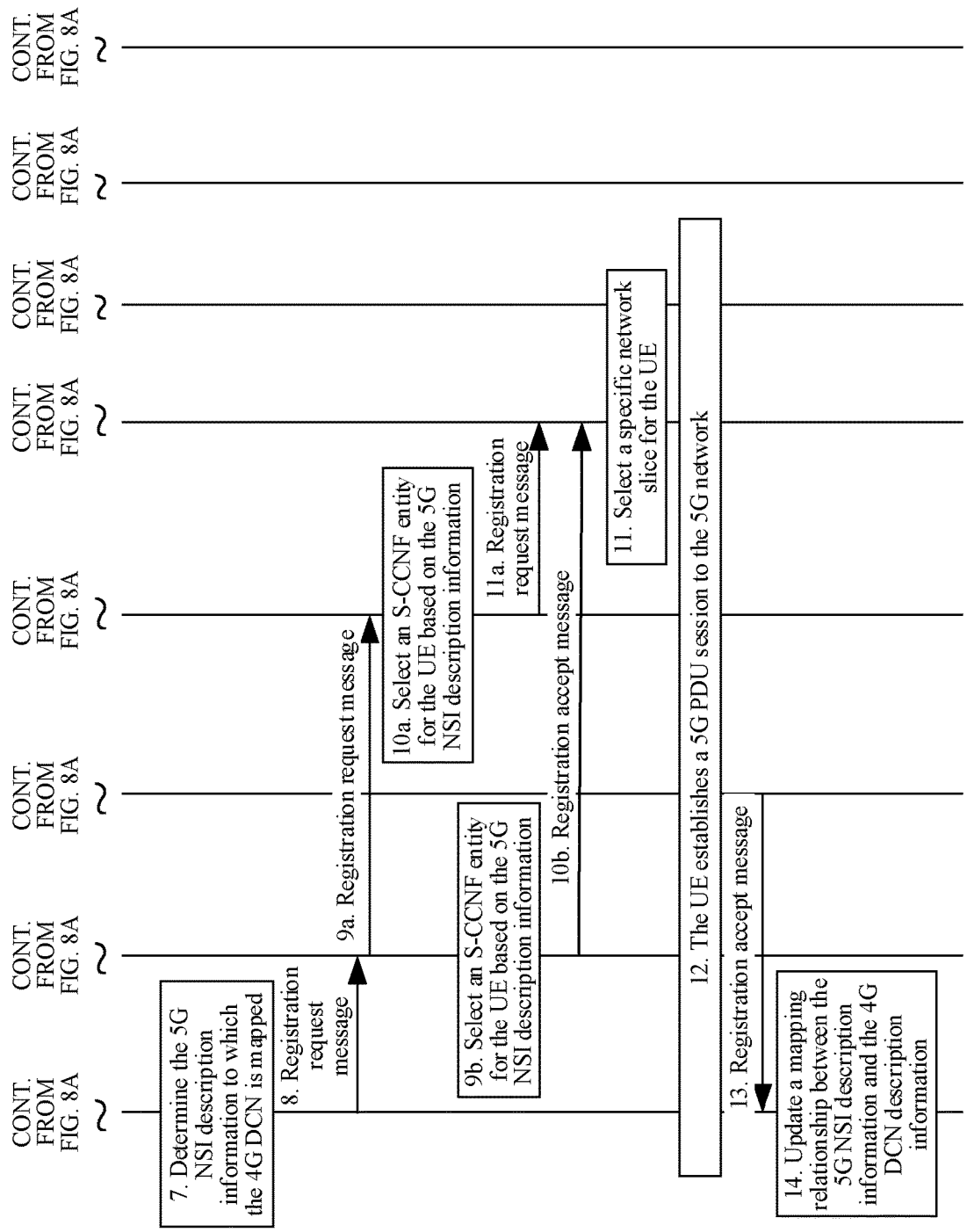

FIG. 8A and FIG. 8B each depict a schematic flowchart of handing over UE from a 4G network to a 5G network according to an embodiment of the present disclosure. As shown in FIG. 8, registering or handing over the UE from the 4G network to the 5G network may include the following steps.

1. The UE reads a mapping relationship between 5G NSI description information and 4G DCN description information from a pre-configuration or a broadcast message.

For example, the pre-configuration includes the mapping relationship between the 5G NSI description information and the 4G DCN description information. Alternatively, the UE may read the mapping relationship between the 5G NSI description information and the 4G DCN description information from system information broadcast by the 4G network.

2. The UE sends an Attach Request to the 4G network.

The Attach Request may be a registration/attach request message. The Attach Request may carry parameters, such as a third identifier (for example, an IMSI, or an old GUTI of the UE in the 4G network, or a packet-temporary mobile subscriber identity (P-TMSI)) of the UE, and description information (for example, a DCN ID or a UE Usage Type) of a 4G DCN that the UE requests to access.

3. Perform a 4G registration procedure.

The 4G registration procedure includes: A 4G network function entity (for example, an MME and/or a 4G RAN) performs steps, such as performing authentication on the UE, negotiating a security/encryption parameter, selecting a DCN and an MME for the UE based on the 4G DCN description information and subscription information of the UE that are provided by the UE, and establishing a PDN connection and a default bearer of the PDN connection.

The step of establishing the PDN connection and the default bearer of the PDN connection in the registration procedure includes: The UE sends a PDN connection establishment request message (e.g., PDN Connectivity Request) to the 4G network, where the message carries parameters, such as the third identifier of the UE and the description information of the 4G DCN with which the UE requests to establish the PDN connection. Herein, "the description information of the 4G DCN with which the UE requests to establish the PDN connection" indicates that the PDN connection is established in the 4G DCN identified/described by the 4G DCN description information. A 4G core network function entity selects, for the terminal based on the PDN connection establishment request message, the DCN and the MME for establishing a session, and sends a PDN connection establishment accept message (e.g., PDN Connectivity Accept) to the terminal through a 4G access network. The PDN connection establishment accept message may carry the corresponding 5G NSI description information, of the 5G network, to which the 4G DCN description information is mapped. Herein, the PDN connection establishment request message is sent by the UE to the 4G network together with a registration request message. The PDN connection establishment accept message may also be sent to the UE by the 4G network together with a registration accept message.

After the registration is completed, the UE may initiate an independent PDN connection establishment procedure to the 4G network. The procedure is the same as above.

4. The 4G RAN (that is, a Node B or an eNB) sends, to the UE, Attach Accept (e.g., a registration accept message) received from the NE.

The Attach Accept carries parameters, such as the description information (for example, the DCN ID) of the 4G DCN accepted (in other words, the terminal is allowed to access, or selected for the terminal) by the 4G network. Optionally, the Attach Accept further carries the 5G NSI description information (for example, a Slice/Service Type, an NSI ID, or a corresponding S-NSSAI or NSSAI) corresponding to the 4G DCN description information. If step 1 is performed, this parameter is optional.

5. The UE stores the 4G DCN description information and the corresponding 5G NSI description information based on the 4G DCN description information and the corresponding 5G NSI description information that are carried in the Attach Accept.

Optionally, if the Attach Accept carries the 4G DCN description information and the corresponding 5G NSI description information, the UE updates the locally configured/stored 4G DCN description information and the 5G NSI description information based on the 4G DCN description information and the corresponding 5G NSI description information that are carried in the Attach Accept.

6. The UE discovers the 5G network by measuring a cell signal, and determines to move or be handed over to the 5G network.

7. The UE determines, based on description information of a currently registered 4G DCN and the configured/stored 4G DCN description information and the corresponding 5G NSI description information, corresponding 5G NSI description information used when the UE moves or is handed over to the 5G network.

8. The UE sends a Registration Request to the 5G network.

The Registration Request may be a 5G Initial Registration/Attach Request message or a 5G Tracking Area Update Request message. The Registration Request carries parameters, such as a fourth identifier (for example, an IMSI or a temporary identity of the 5G UE) of the UE, and the 5G NSI description information corresponding to the 4G DCN description information. If the UE is in connected mode (in other words, if currently there is an active PDN connection), the Registration Request further carries a handover indication handover indication, in order to instruct a user plane function entity (for example, a gateway) in the 5G network to assign, to the UE, an IP address that is the same as an IP address of the PDN connection activated in the 4G network.

If the UE is in connected mode (in other words, if currently there is an active PDN connection), the Registration Request may further carry an identifier of the PDN connection, and carries the 5G NSI description information corresponding to the description information of the 4G DCN with which the UE establishes the PDN connection. This way, the PDN connection is changed to a corresponding NSI of the 5G network, or the PDN connection is re-established in an NSI of the 5G network. The identifier of the PDN connection may be represented using an identifier (e.g., a default bearer ID) of a default bearer of the PDN connection.

9-12. Perform a 5G registration procedure.

The 5G registration procedure includes: A 5G core network function entity performs steps, such as performing authentication on the UE, negotiating a security/encryption parameter, and selecting the NSI for the UE based on description information of the 5G NSI and the subscription information of the UE that are provided by the UE. Optionally, the procedure further includes a step, such as establishing a PDU session (namely, a packet data session between the UE and a core network user plane function entity, for example, a gateway).

For example, if a 5G AN cannot select, based on the 5G NSI description information provided by the UE, an S-CCNF entity that serves the UE, the following steps 9a-12 are performed; otherwise, steps 9b-12 are performed.

9a. The 5G AN forwards the Registration Request to a default CCNF entity.

Optionally, the 5G AN may forward the Registration Request to the default CCNF entity (or a default AMF or NSSF entity, and the default AMF or NSSF entity is also used hereinafter, in other words, the default CCNF entity in the following steps may also be an AMF or NSSF entity in the default CCNF entity (when the S-CCNF entity is selected).

Herein, the default CCNF entity is a CCNF entity used by default. When the 5G AN cannot select, based on the 5G NSI description information provided by the UE, the S-CCNF entity (that is, a serving CCNF entity) that serves the UE, the 5G AN sends the Registration Request to the default CCNF entity.

10a. The default CCNF entity selects the S-CCNF entity for the UE based on the 5G NSI description information in the Registration Request and the subscription information of the UE.

11a. The default CCNF entity forwards the Registration Request to the S-CCNF entity.

Optionally, the default CCNF entity forwards the Registration Request to a serving AMF entity. The serving AMF entity is also used hereinafter. In other words, the S-CCNF entity in the following steps may be the AMF entity in the S-CCNF entity.

Optionally, the default CCNF entity sends S-CCNF information (for example, an S-CCNF identifier or an S-CCNF group identifier) to the 5G AN, and the 5G AN selects the S-CCNF entity based on the S-CCNF information and forwards the Registration Request to the S-CCNF entity.

9b. The 5G AN selects the S-CCNF entity based on the 5G NSI description information (for example, an S-NSSAI) in the Registration Request.

10b. The 5G AN forwards the Registration Request to the S-CCNF entity.

11. The S-CCNF entity selects a specific network slice for the UE based on the 5G NSI description information in the Registration Request and the subscription information of the UE.

12. The UE establishes a 5G PDU session with the 5G network.

For example, when the UE in connected mode is handed over, the 4G PDN connection established between the UE and the 5G network is changed to the corresponding 5G PDU session after the UE is handed over to the 5G network. An IP address of the PDU session is the same as an IP address of the 4G PDN connection before the handover.

13. The 5G AN sends, to the UE, Registration Accept received from the 5G core network function entity.

The Registration Accept carries parameters, such as the description information of the 5G NSI accepted (in other words, the terminal is allowed to access, or selected for the terminal) by the network. Optionally, the Registration Accept further carries the 4G DCN description information corresponding to the 5G NSI description information. Optionally, the Registration Request carries the handover indication, and the 5G core network function entity may not provide, according to the handover indication, the 4G DCN description information corresponding to the 5G NSI description information.

14. The UE updates the locally configured/stored 5G NSI description information and the corresponding 4G DCN description information based on the 5G NSI description information and the corresponding 4G DCN description information that are carried in the Registration Accept.

Step 14 may be performed when the Registration Accept carries the 5G NSI description information and the corresponding 4G DCN description information.

Figure 9A:
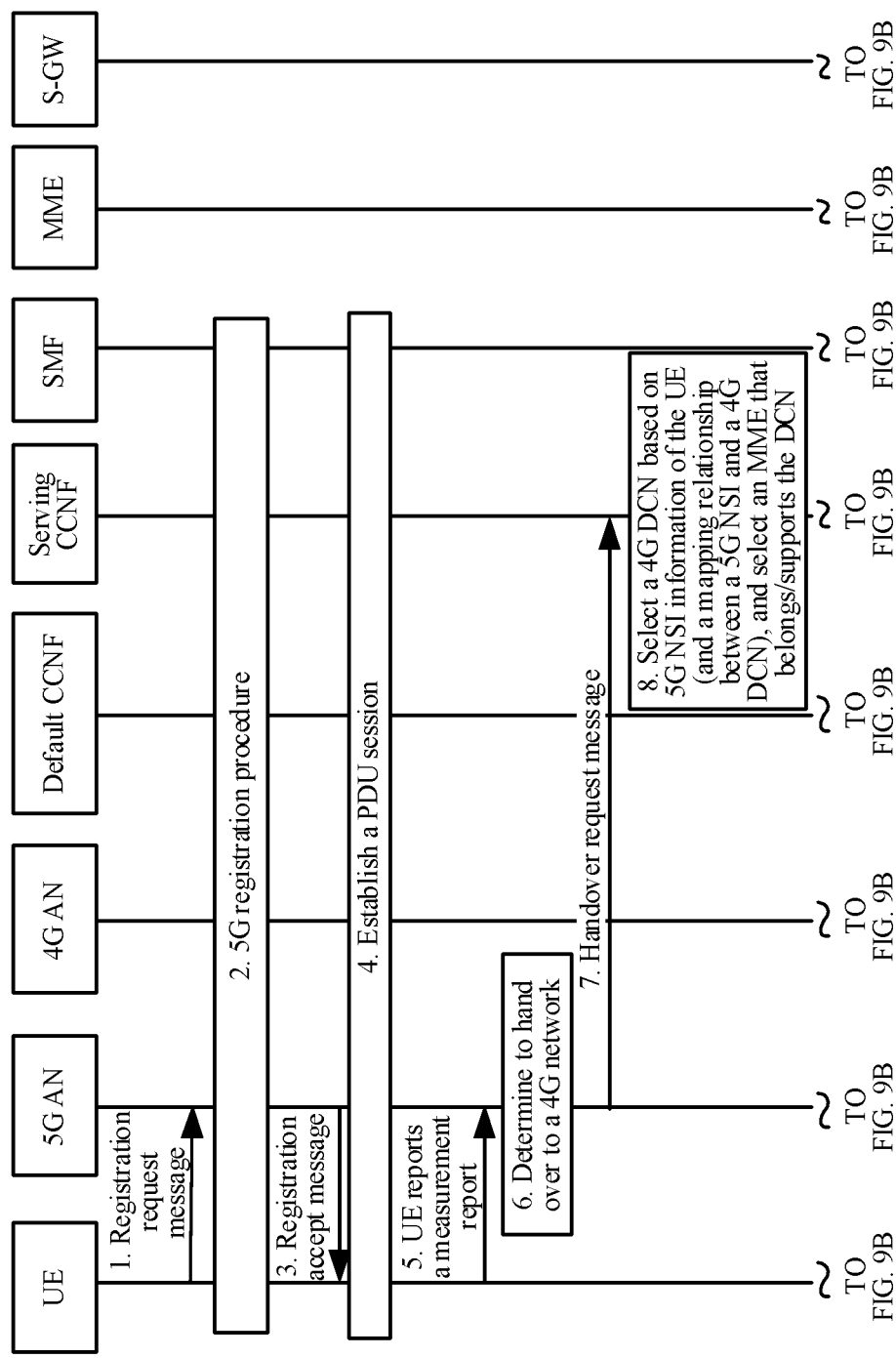
FIG. 9A and FIG. 9B are schematic flowcharts of handover preparations for handing over UE from a 5G network to a 4G network according to an embodiment of the present disclosure.
Figure 9B:
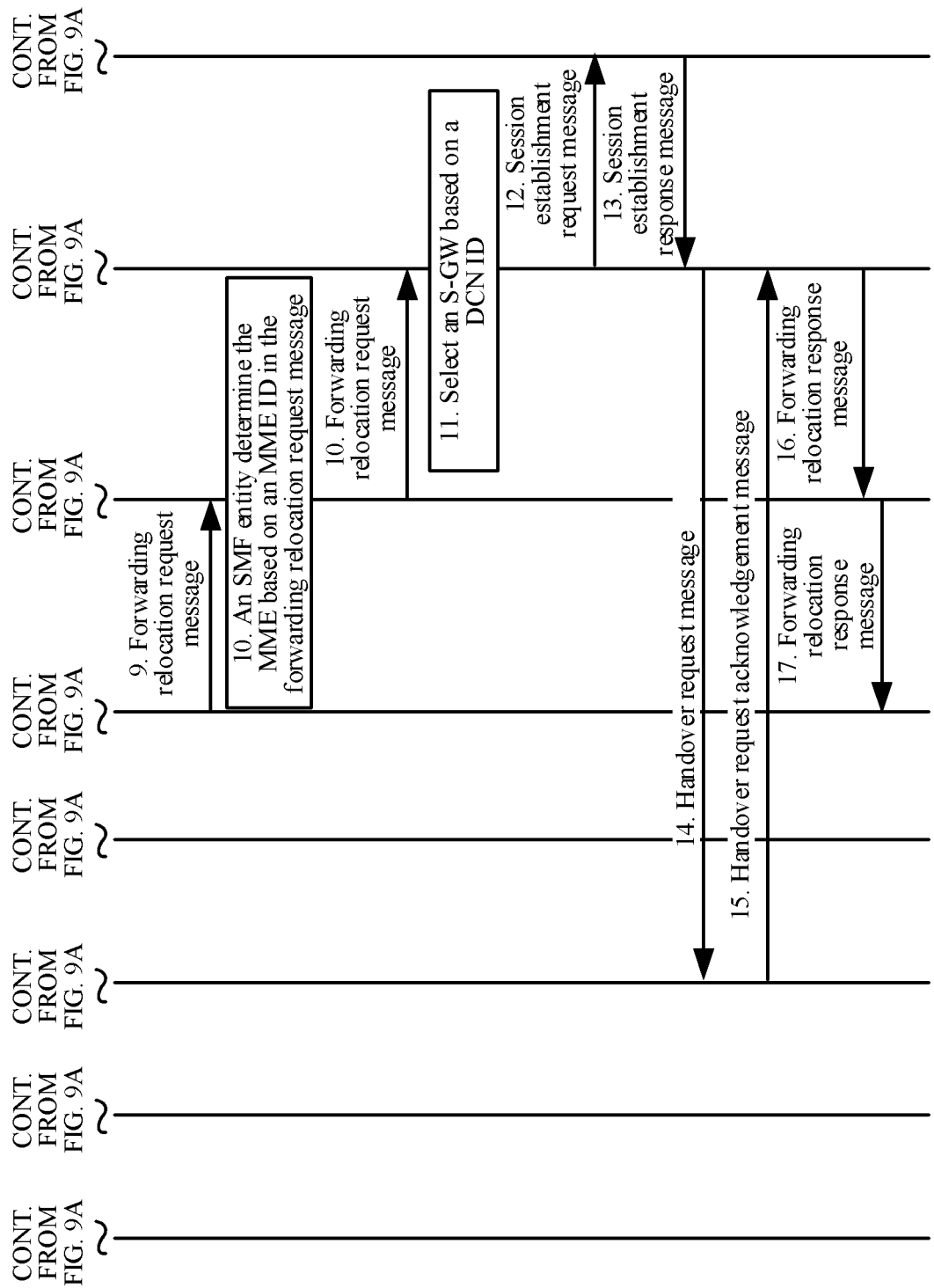

FIG. 9, including FIG. 9A and FIG. 9B is a schematic flowchart of handover preparations for handing over UE from a 5G network to a 4G network according to an embodiment of the present disclosure. In a handover preparation procedure shown in FIG. 9, the 5G network provides NSI/DCN description information for the 4G network, such that the 4G network selects a correct DCN.

A (default/serving) CCNF entity may be co-located or combined with an MME (co-located or combined, in other words, one physical entity has functions of two or more logical function entities). A Session Management Function (SMF) entity in a network slice instance (NSI) may be co-located or combined with an S-GW control plane function (SGW-c) entity or a P-GW control plane function (PGW-c) entity. A UP may be co-located or combined with an S-GW user plane function entity or a P-GW user plane function entity. The default CCNF entity may also be an AMF or NSSF entity in the default CCNF entity (when an S-CCNF entity is selected). The S-CCNF entity may also be an AMF entity in the S-CCNF entity.

In some implementations, when the UE is handed over from the 5G network to the 4G network, the Handover preparation phase (starting from step 6) may include the following steps.

1. The UE sends a Registration Request to the 5G network.

The Registration Request may be a 5G registration request message and may include a 5G initial registration/attach request message Initial Registration/Attach Request or a 5G Tracking Area Update Request message. The Registration Request carries parameters, such as a first identifier (for example, an IMSI or a temporary identity of the 5G UE) of the UE, and description information of a 5G NSI to which the UE requests to access.

2. Perform a 5G registration procedure.

The 5G registration procedure includes: A 5G core network function entity reforms steps, such as performing authentication on the UE, negotiating a security/encryption parameter, and selecting the NSI for the UE based on the description information of the 5G NSI and subscription information of the UE that are provided by the UE. Optionally, the procedure further includes a step, such as establishing a PDU session (e.g., a packet data session between the UE and a core network user plane function entity, for example, a gateway).

3. A 5G AN sends, to the UE, Registration Accept received from the 5G core network function entity S-CCNF.

The 5G AN may be a 5G Access Network Node or an Access Node. Corresponding to step 1, the Registration Accept may include the 5G Initial Registration/Attach Accept message or the 5G Tracking Area Update Accept message. The Attach Accept carries parameters, such as description information of a 5G NSI accepted (in other words, the terminal is allowed to access, or selected for the terminal) by the network.

The core network function entity is a Serving-Common Control Network Function (S-CCNF) entity that is currently serving the UE. The CCNF entity may include an Access and Mobility Management Function (AMF) entity, an Authentication Server Function (AUSF) entity, and the like.

4. Establish a PDU session between the UE and the 5G network.

In some implementations, the UE sends a session establishment request such as a PDU session establishment request message to the 5G network. The PDU session establishment request message carries parameters, such as the first identifier (for example, the IMSI or the temporary identity of the 5G UE) of the UE, and the description information of the 5G NSI with which the UE requests to establish the session. Herein, "the description information of the 5G NSI with which the UE requests to establish the session" indicates that the session is established in the 5G NSI identified/described by the 5G NSI description information. The 5G core network function entity selects, for the terminal based on the session establishment request message, the 5G NSI for establishing the session, allocates a user plane function entity in the 5G NSI, and sends a session establishment accept (e.g., PDU session establishment accept) message to the terminal through the 5G access network. The session establishment accept message may carry corresponding 4G DCN description information, of the 4G network, to which the 5G NSI description information is mapped.

Optionally, this step may be performed in step 2, in other words, the UE simultaneously establishes the PDU session in the registration procedure. In this case, the session establishment request message may be sent by the UE to the 5G network together with the registration request message. The session establishment accept message may also be sent to the UE by the network together with the registration accept message.

5. The UE reports a measurement report to the 5G AN.

The measurement report may include signal measurement information of a serving cell and/or a neighboring cell, or the like.

6. The 5G AN determines, based on the measurement report sent by the UE, to initiate a procedure of handing over the UE to the 4G network.

7. The 5G AN sends a handover request message (Handover Required) to the serving CCNF entity.

The handover request message carries parameters, such as a UE identifier, e.g., UE NG2 ID of an NG2 interface (the UE NG2 ID is used to uniquely identify the UE by the 5G AN and a core network control plane function entity), a target 4G access network node identifier (Target 4G AN ID), a transparent container Source to Target Transparent Container sent by a source access network node to a target access network node (the Source to Target Transparent Container carries a radio resource parameter allocated by the source access network node to the UE, and the like).

8. The S-CCNF entity selects a 4G DCN based on the 5G NSI description information of the UE and mapping information between (locally configured) 5G NSI description information and 4G DCN description information, and selects an MME that supports the DCN.

9. The S-CCNF entity sends a forwarding relocation request message such as a Forward Relocation Request to a Session Management Function (SMF) entity of a network slice (NS) that serves the terminal.

The Forward Relocation Request carries parameters, such as a DCN ID (an identifier of the DCN selected by the S-CCNF entity), an MME ID (an identifier of the MME supporting the DCN), a UE MM context (a context related to UE Mobility Management), the UE identifier (for example, the IMSI), a Target 4G AN ID, and a Source to Target Transparent Container, and the like.

The forwarding relocation request message may further carry a session identifier of the PDU session that the UE has established or activated (active) in the 5G network, and carries the 4G DCN description information (namely, the foregoing DCN ID) corresponding to the 5G NSI description information for establishing the PDU session. This way, the PDU session is changed to the corresponding DCN of the 4G network, or the PDU session (corresponding to a PDN connection) is re-established in the 4G DCN.

10. The SMF entity determines the MME based on the MME ID in the Forward Relocation Request and sends the Forward Relocation Request to the MME. The Forward Relocation Request carries parameters, such as the DCN ID (the identifier of the DCN selected by the S-CCNF entity), the UE MM context (the context related to UE Mobility Management), and a UE SM context (a context related to UE Session Management), for example, information about the PDU session that the UE establishes in the 5G network, the UE identifier (for example, the IMSI), the Target 4G AN ID, and the Source to Target Transparent Container.

The forwarding relocation request message may further carry the session identifier of the PDU session that the UE has established or activated (active) in the 5G network, and carries the 4G DCN description information (namely, the foregoing DCN ID) corresponding to the 5G NSI description information for establishing the PDU session. This way, the PDU session is changed to the corresponding DCN of the 4G network, or the PDU session (corresponding to the PDN connection) is re-established in the 4G DCN.

If the S-CCNF entity has stored the UE SM context, steps 9 and 10 may be combined into the following step: The S-CCNF entity directly sends the Forward Relocation Request to the MME. The Forward Relocation Request carries parameters, such as the DCN ID (the identifier of the DCN selected by the S-CCNF entity), the UE MM context (the context related to UE Mobility Management), the UE SM context (the context related to UE Session Management), for example, the information about the PDU session that the UE establishes in the 5G network, the UE identifier (for example, the IMSI), the Target 4G AN ID, and the Source to Target Transparent Container. The forwarding relocation request message may further carry the session identifier of the PDU session that the UE has established or activated (active) in the 5G network, and carries the 4G DCN description information (namely, the foregoing DCN ID) corresponding to the 5G NSI description information for establishing the PDU session. This way, the PDU session is changed to the corresponding DCN of the 4G network, or the PDU session (corresponding to the PDN connection) is re-established in the 4G DCN.

11. The MME determines the DCN based on the DCN ID in the received Forward Relocation Request, and selects a Packet Data Network Gateway (PDN GW) and a 4G Serving Gateway (S-GW) that support the DCN. In addition, the MME maps the 5G UE MM context and the UE SM context to a 4G UE context (including a PDN connection, 4G EPS bearer information, and the like).

12. The MME sends a Create Session Request to the S-GW, where the Create Session Request carries parameters, such as the UE identifier (for example, the IMSI), an MME address, a tunnel endpoint identifier (TEID), and a PDN GW address.

13. The S-GW allocates, based on the Create Session Request, a local resource (for example, an S-GW address of the 4G PDN connection/EPS bearer (that is established to the PDN GW and that corresponds to the 5G PDU session after the 5G PDU session is changed to the 4G network) and a TEID of the S-GW), and sends a Create Session Response to the MME, where the Create Session Response carries parameters, such as the S-GW address and the TEID.

14. The MME sends a Handover Request to a 4G AN, where the Handover Request carries parameters, such as an MME UE S1AP ID (an identifier of an S1-AP interface allocated by the MME to the UE, where the S1-AP interface is an interface between the MME and a Node B/eNB), the Source to Target Transparent Container, and the DCN ID.

15. The 4G AN returns a handover request acknowledgment message Handover Request acknowledgment (ACK) to the MME, where the handover request acknowledgment message carries parameters, such as the MME UE S1AP ID, an eNB UE S1AP ID (an S1-AP interface identifier allocated by the Node B/eNB to the UE), and a Target to Source Transparent Container.

16. The MME sends a forwarding relocation response message such as a Forward Relocation Response to the SMF entity, where the forwarding relocation response message carries parameters, such as a list of established 4G EPS bearers, a list of established Radio Access Bearers (RABs), an MME TEID, and the Target to Source Transparent Container.

17. The SMF entity forwards the Forward Relocation Response to the S-CCNF entity.

Herein, if the S-CCNF entity has stored the UE SM context, steps 16 and 17 may be combined into the following step: The MME directly sends the Forward Relocation Response to the S-CCNF entity, where the Forward Relocation Response carries parameters, such as the list of established 4G EPS bearers, the list of established RABs, the MME TEID, and the Target to Source Transparent Container.

Figure 10A:
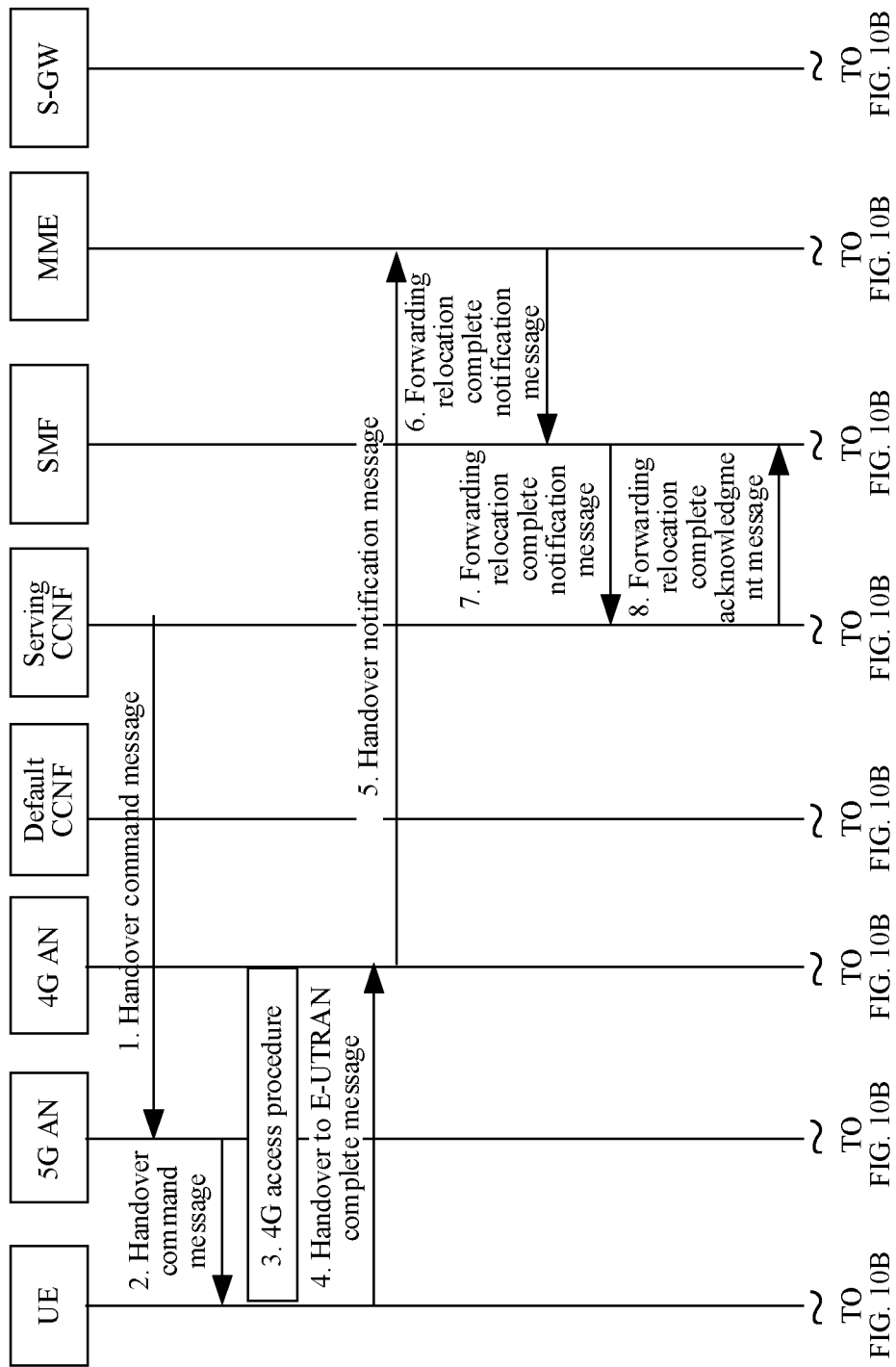
FIG. 10A and FIG. 10B are schematic flowcharts of a handover execution phase for handing over UE from a 5G network to a 4G network based on the handover preparations shown in FIG. 9 according to an embodiment of the present disclosure.
Figure 10B:
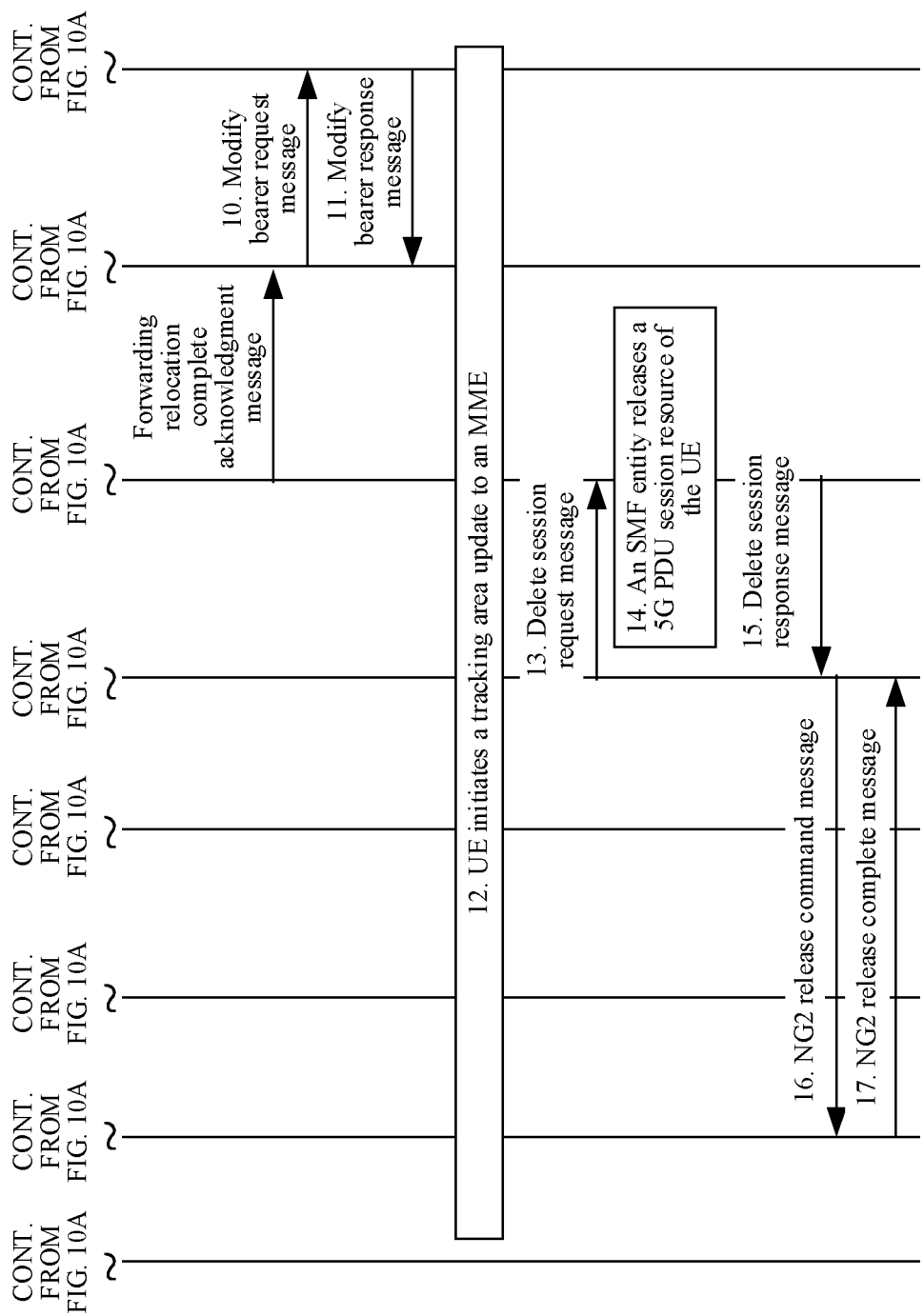

FIG. 10, including FIG. 10A and FIG. 10B are a schematic flowchart of a Handover execution phase for handing over UE from a 5G network to a 4G network based on the handover preparations shown in FIG. 9 according to an embodiment of the present disclosure. The handover execution phase includes the following steps.

1. An S-CCNF entity (or AMF entity, and the AMF entity is also used hereinafter) entity sends a handover command message such as a Handover Command to a 5G AN.

The Handover Command carries parameters, such as a Target to Source Transparent Container and a list of to-be-released RABs.

2. The 5G AN sends the Handover Command to the UE.

The Handover Command carries parameters, such as a radio resource allocated by a target access network node (that is, a 4G AN) to the UE.

3. The UE performs a 4G access procedure according to the Handover Command.

4. The UE sends a Handover to Evolved Terrestrial Radio Access Network (E-UTRAN) Complete message to the 4G AN.

5. The 4G AN sends a handover notification message such as a Handover Notify to an MME.

6. The MME sends a forwarding relocation complete notification message such as a Forward Relocation Complete Notification to a 5G SMF entity.

7. The SMF entity sends the Forward Relocation Complete Notification to the S-CCNF entity.

If steps 9 and 10 are combined and steps 16 and 17 are combined in the handover preparation procedure in FIG. 9, steps 6 and 7 in the handover execution procedure herein are combined into the following step: The MME directly sends the forwarding relocation complete notification message (e.g., Forward Relocation Complete Notification) to the 5G S-CCNF entity.

8. The S-CCNF entity returns a Forward Relocation Complete ACK (i.e., a forwarding relocation complete acknowledgment message) to the SMF entity.

9. The SMF entity returns the Forward Relocation Complete ACK to the MME.

If steps 6 and 7 are combined, steps 8 and 9 herein are combined into the following step: The S-CCNF entity returns the Forward Relocation Complete ACK to the MME.

10. The MME sends a modify bearer request message such as a Modify Bearer Request message to an S-GW.

11. The S-GW returns a modify bearer response message such as a Modify Bearer Response message to the MME.

12. The UE initiates a Tracking Area Update (TAU) procedure to the MME.

13. The S-CCNF entity sends a delete session request message such as a Delete Session Request to the SMF entity.

14. The SMF entity releases a 5G PDU session resource of the UE.

15. The SMF entity returns a delete session response message such as a Delete Session Response to the S-CCNF entity.

If step 6 is performed (that is, steps 6 and 7 are not combined), steps 13 and 15 herein may not be performed, and step 14 may be performed after step 6.

16. The S-CCNF entity sends an NG2 release command message (e.g., Release Command) to the 5G AN.

17. The 5G AN sends an NG2 release complete message (e.g., Release Completion) to the S-CCNF entity.

Figure 11A:
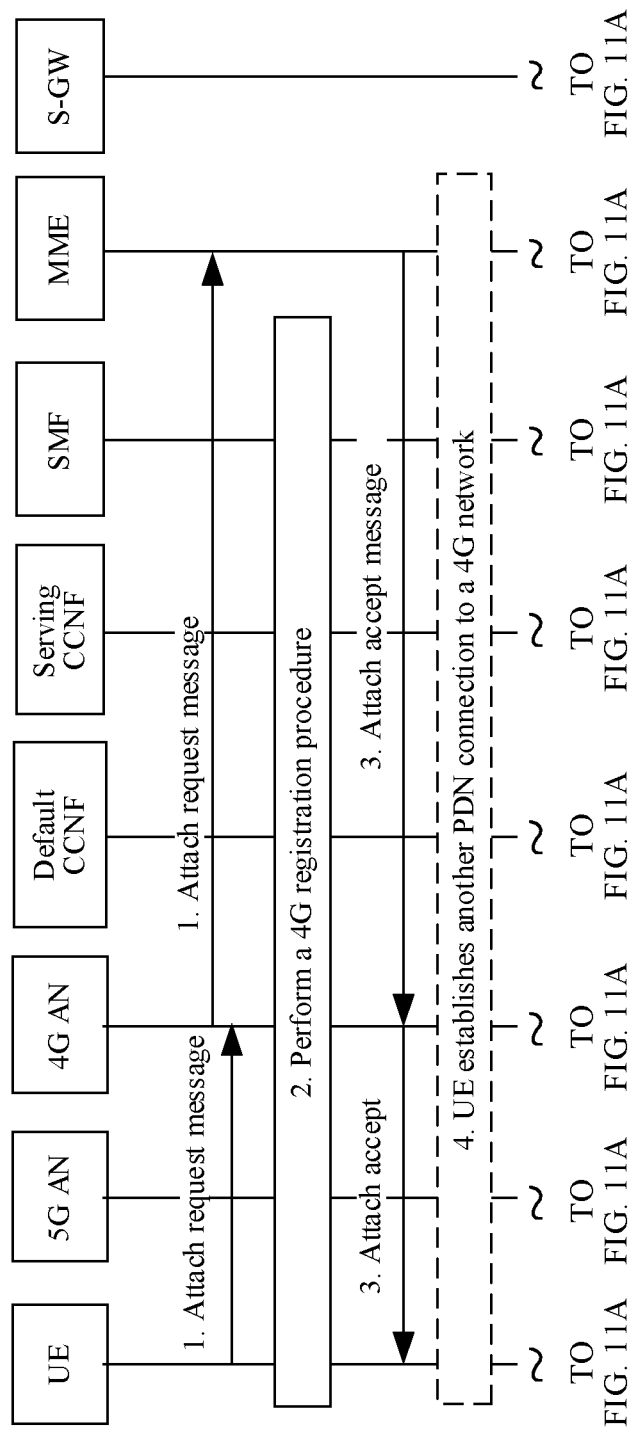
FIG. 11A, FIG. 11B, and FIG. 11C are schematic flowcharts of handover preparations for handing over UE from a 4G network to a 5G network according to an embodiment of the present disclosure.
Figure 11B:
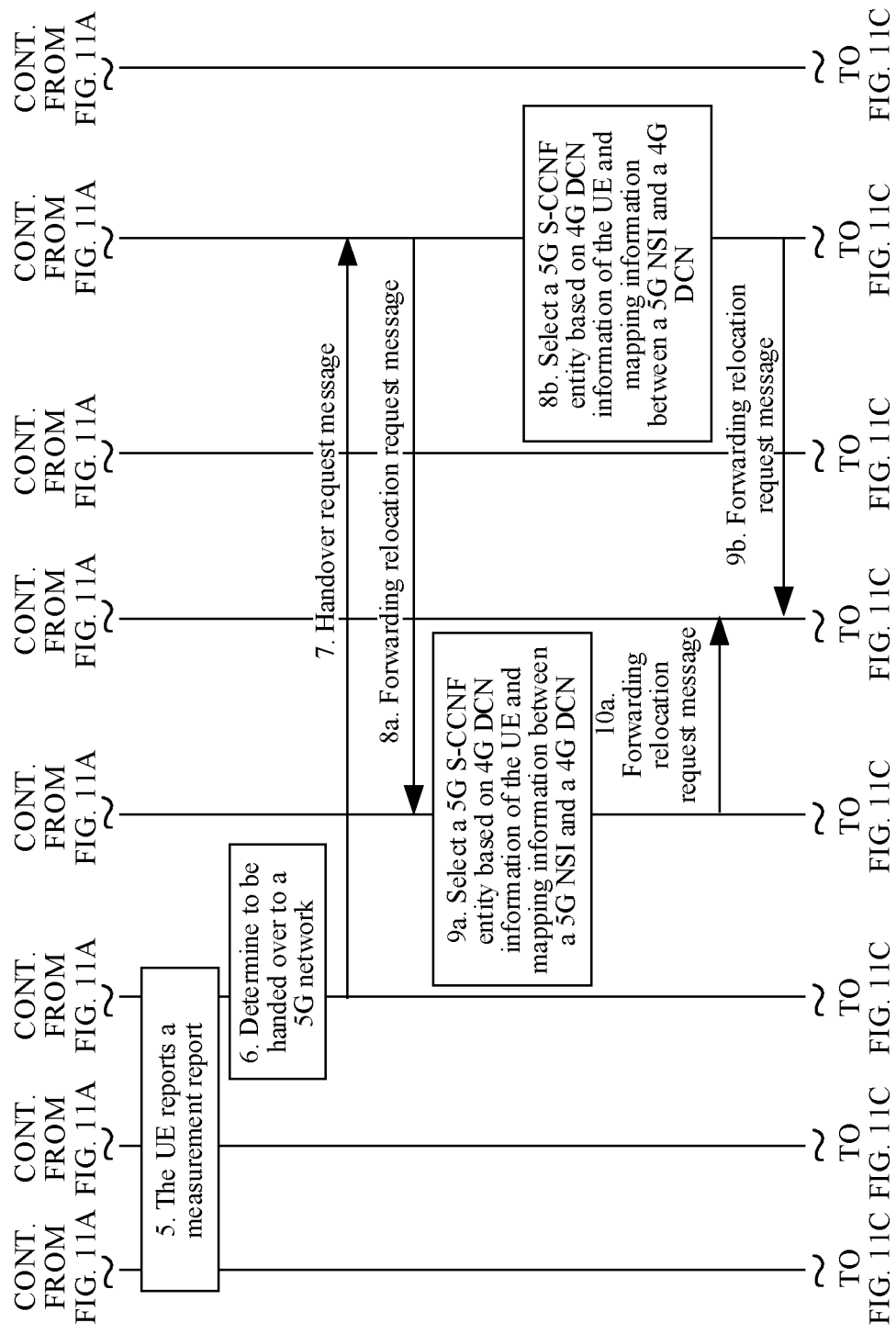
Figure 11C:
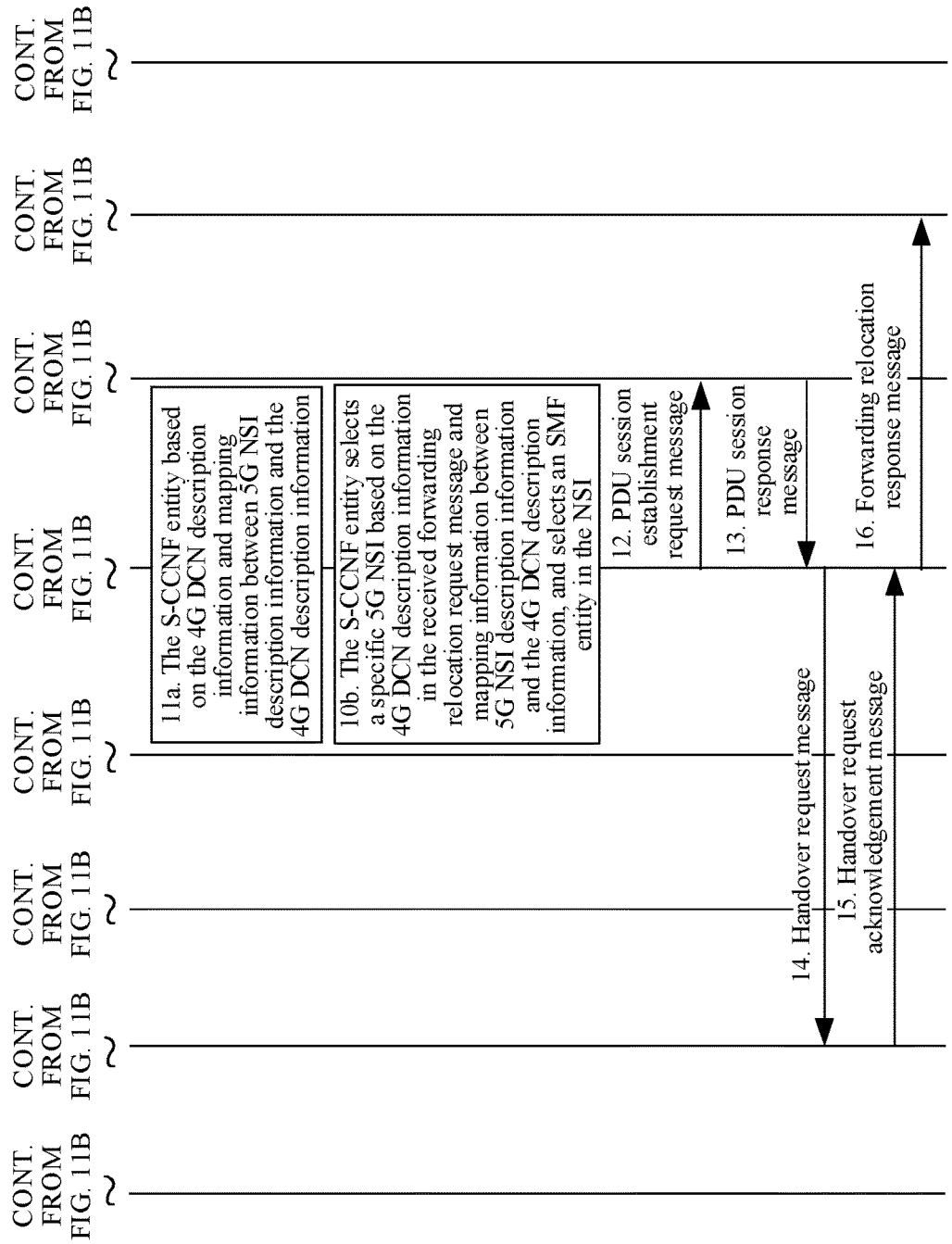

FIG. 11A, FIG. 11B, and FIG. 11C each depict a schematic flowchart of handover preparations for handing over UE from a 4G network to a 5G network according to embodiments of the present disclosure. In a handover preparation procedure shown in FIG. 11, the 4G network provides NSI description information for the 5G network, such that the 5G network selects a correct NSI. A default CCNF entity described below may also be an AMF or NSSF entity in the default CCNF entity (e.g., when an S-CCNF entity is selected). The S-CCNF entity may also be an AMF entity in the S-CCNF entity. The handover preparation phase (starting from step 6) includes the following steps.

1. The UE sends an attach request message such as a Attach Request to the 4G network.

The Attach Request carries parameters, such as a third identifier (for example, an IMSI or a temporary identity old GUTI or P-TMSI of the UE) of the UE, and description information (for example, a DCN ID or a UE Usage Type) of a 4G DCN that the UE requests to access.

That the UE sends the Attach Request to the 4G network may be such that the UE sends the Attach Request to a 4G AN and then the 4G AN sends the Attach Request to an MME.

2. Perform a 4G registration procedure.

The 4G registration procedure includes: A 4G network function entity (for example, an MME and/or a 4G RAN) performs steps, such as performing authentication on the UE, negotiating a security/encryption parameter, selecting the DCN and the MME for the UE based on the 4G DCN description information and subscription information of the UE that are provided by the UE, and establishing a PDN connection and a default bearer of the PDN connection.

The step of establishing the PDN connection and the default bearer of the PDN connection in the registration procedure includes: The UE sends a PDN connection establishment request message (e.g., PDN Connectivity Request) to the 4G network, where the PDN connection establishment request message carries parameters, such as the third identifier of the UE and the description information of the 4G DCN with which the UE requests to establish the PDN connection. Herein, "the description information of the 4G DCN with which the UE requests to establish the PDN connection" indicates that the PDN connection is established in the 4G DCN identified/described by the 4G DCN description information. A 4G core network function entity selects, for the terminal based on the PDN connection establishment request message, the DCN and the MME for establishing a session, and sends a PDN connection establishment accept message (e.g., PDN Connectivity Accept) to the terminal through a 4G access network. The PDN connection establishment accept message may carry corresponding 5G NSI description information of the 5G network to which the 4G DCN description information is mapped. Herein, the PDN connection establishment request message is sent by the UE to the 4G network together with a registration request message. The PDN connection establishment accept message may also be sent to the UE by the 4G network together with a registration accept message.

After the registration is completed, the UE may initiate an independent PDN connection establishment procedure to the 4G network. The procedure is the same as above.

3. The 4G AN (that is, a Node B or an eNB) sends, to the UE, Attach Accept (e.g., a registration accept message) received from the MME.

The Attach Accept carries parameters, such as the description information (for example, the DCN ID) of the 4G DCN accepted (in other words, the terminal is allowed to access, or selected for the terminal) by the 4G network.

4. Optionally, the UE establishes another PDN connection to the 4G network.

5. The UE reports a measurement report to the 4G AN. The measurement report includes signal measurement information of a serving cell and/or a neighboring cell, or the like.

6. The 4G AN determines, based on the measurement report sent by the UE, to initiate a procedure of handing over the UE to the 5G network.

7. The 4G AN sends a handover request message (e.g., Handover Required) to the MME, where the handover request message carries parameters, such as an MME UE S1AP ID, an eNB UE S1AP ID, a target 5G access network node identifier (Target 5G AN ID), and a Source to Target Transparent Container.

If the MME cannot determine the S-CCNF entity of the UE in the 5G network, the MME performs the following steps 8a to 10a; otherwise, the MME performs the following steps 8b to 10b.

8a. The MME sends a Forward Relocation Request to a default 5G CCNF entity, where the Forward Relocation Request carries the description information (for example, the DCN ID or the UE Usage Type) of the 4G DCN, the UE identifier (for example, the IMSI), the target 5G AN ID, a UE context (the UE context includes information about the PDN Connection and an EPS bearer, and the like), and the Source to Target Transparent Container. Herein, the default CCNF entity is a CCNF entity used by default. When the MME cannot determine that the S-CCNF entity of the UE in the 5G network, the MME sends the Forward Relocation Request to the default CCNF entity.

The Forward Relocation Request may further carry an identifier of the PDN connection that the UE has established or activated (active) in the 4G network, and carries the 4G DCN description information (namely, the foregoing DCN ID or UE Usage Type) for establishing the PDN connection, in order to instruct the S-CCNF entity to change the PDN connection to the corresponding NSI of the 5G network, or the PDN connection (a corresponding PDU Session) is re-established in the 5G NSI.

9a. The default CCNF entity selects the 5G S-CCNF entity based on the 4G DCN description information of the UE in the Forward Relocation Request and mapping information between the 5G NSI and the 4G DCN.

10a. The default CCNF entity sends the Forward Relocation Request to the S-CCNF entity, where the Forward Relocation Request carries parameters, such as the 4G DCN description information (for example, the DCN ID or the UE Usage Type), the corresponding 5G NSI description information, an MME ID, the UE identifier (for example, the IMSI), the Target 5G AN ID, the UE context, and the Source to Target Transparent Container.

The Forward Relocation Request may further carry the identifier of the PDN connection that the UE has established or activated (active) in the 4G network, and carries the 4G DCN description information (namely, the foregoing DCN ID or UE Usage Type) for establishing the PDN connection, in order to instruct the S-CCNF entity to change the PDN connection to the corresponding NSI of the 5G network, or the PDN connection (the corresponding PDU Session) is re-established in the 5G NSI.

11a. If the received Forward Relocation Request carries the 4G DCN description information, the S-CCNF entity selects a specific 5G NSI based on the 4G DCN description information and mapping information between the 5G NSI description information and the 4G DCN description information, and selects an SMF entity in the NSI. Alternatively, if the received Forward Relocation Request carries the 5G NSI description information, the S-CCNF entity selects a specific 5G NSI based on the 5G NSI description information, and selects an SMF entity in the NSI. In addition, the S-CCNF entity maps information related to UE mobility management MM in the 4G UE context to a 5G UE MM context and maps an authentication/security parameter in the 4G UE context to a 5G UE authentication/security parameter for storing.

8b. The MME selects the 5G S-CCNF entity based on the 4G DCN information of the UE and the mapping information between the 5G NSI description information and the 4G DCN description information.

9b. The MME sends the Forward Relocation Request to the S-CCNF entity, where the Forward Relocation Request carries parameters, such as the 4G DCN description information (for example, the DCN ID or the UE Usage Type), the UE identifier (for example, the IMSI), the Target 5G AN ID, the UE context, and the Source to Target Transparent Container.

The Forward Relocation Request may further carry the identifier of the PDN connection that the UE has established or activated (active) in the 4G network, and carries the 4G DCN description information (namely, the foregoing DCN ID or UE Usage Type) for establishing the PDN connection, in order to instruct the S-CCNF entity to change the PDN connection to the corresponding NSI of the 5G network, or the PDN connection (the corresponding PDU Session) is re-established in the 5G NSI.

10b. The S-CCNF entity selects the specific 5G NSI based on the 4G DCN description information (for example, the DCN ID or the UE Usage Type) in the received Forward Relocation Request and the mapping information between the 5G NSI description information and the 4G DCN description information, and selects the SMF entity in the NSI. In addition, the S-CCNF entity maps the information related to UE mobility management MM in the 4G UE context to the 5G UE MM context and maps the authentication/security parameter in the 4G UE context to the 5G UE authentication/security parameter for storing.

12. The S-CCNF entity sends a create session request message Create Session Request to the SMF entity in the selected NSI, where the create session request message carries parameters, such as the UE identifier (for example, the IMSI) and the 4G UE context (or information related to UE session management SM in the UE context).

13. The SMF entity maps information (for example, the information about the PDN Connection and the EPS bearer) related to UE session management SM in the 4G UE context to a 5G UE SM context, and requests a 5G core network user plane function entity (for example, a gateway) to allocate a resource for establishing a 5G PDU session. The SMF entity sends a Create Session Response to the S-CCNF entity.

14. The S-CCNF entity sends a Handover Request (i.e., a handover request message) to a 5G AN, where the Handover Request carries parameters, such as a UE NG2 ID, the Source to Target Transparent Container, and the 5G NSI description information.

15. The 5G AN returns a Handover Request ACK (i.e., a handover request acknowledge message) to the S-CCNF entity, where the Handover Request ACK carries parameters, such as the UE NG2 ID and a Target to Source Transparent Container.

The 5G AN may select a 5G access network slice instance for the UE based on the 5G NSI description information and the Source to Target Transparent Container, and determine a radio resource.

16. The S-CCNF entity sends a Forward Relocation Response (i.e., a forwarding relocation response message) to the MME, where the Forward Relocation Response carries parameters, such as a list of established PDU sessions and the Target to Source Transparent Container.

Figure 12A:
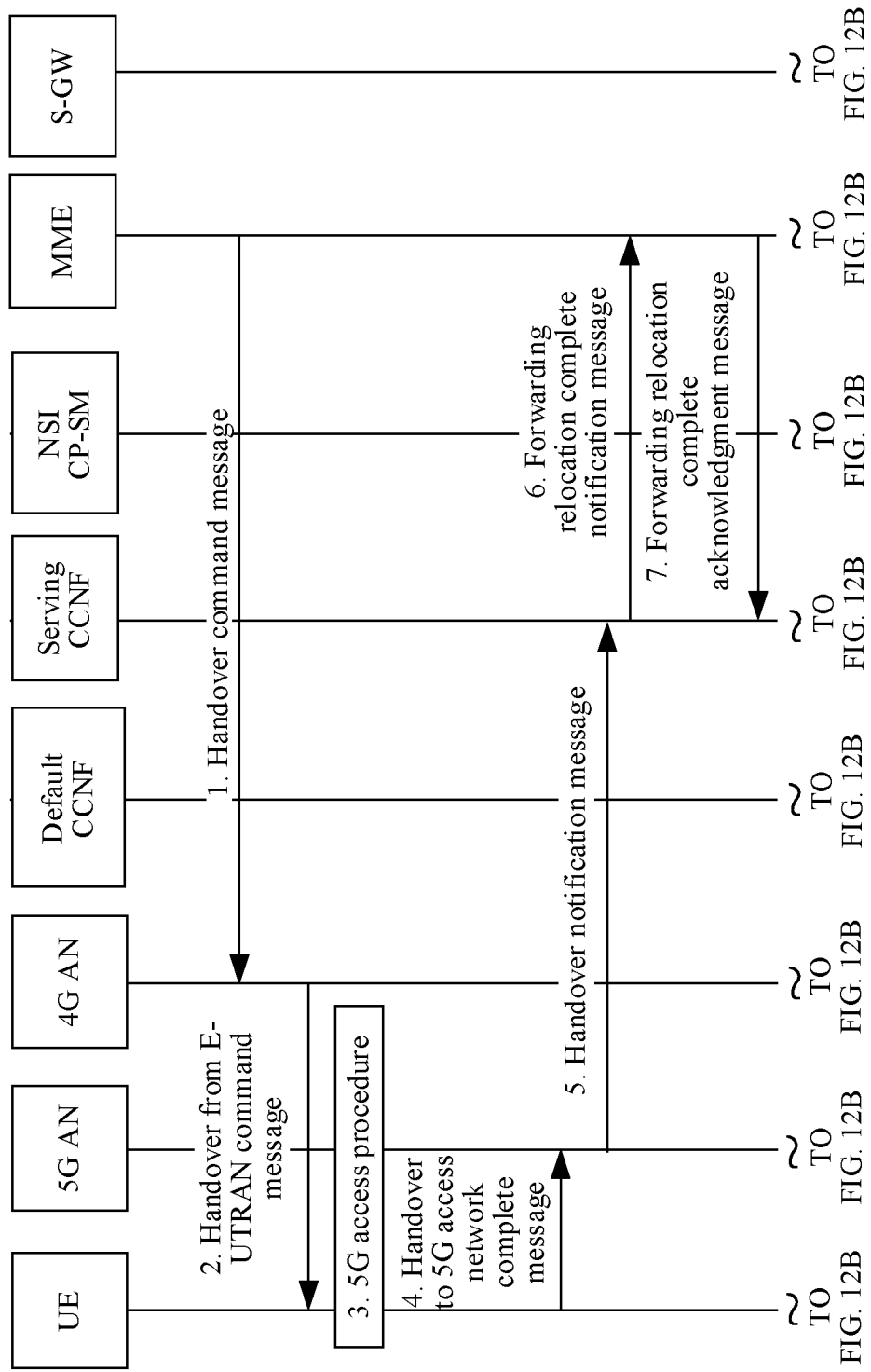
FIG. 12A and FIG. 12B are schematic flowcharts of a handover execution phase for handing over UE from a 4G network to a 5G network based on the handover preparations shown in FIG. 11 according to an embodiment of the present disclosure.
Figure 12B:
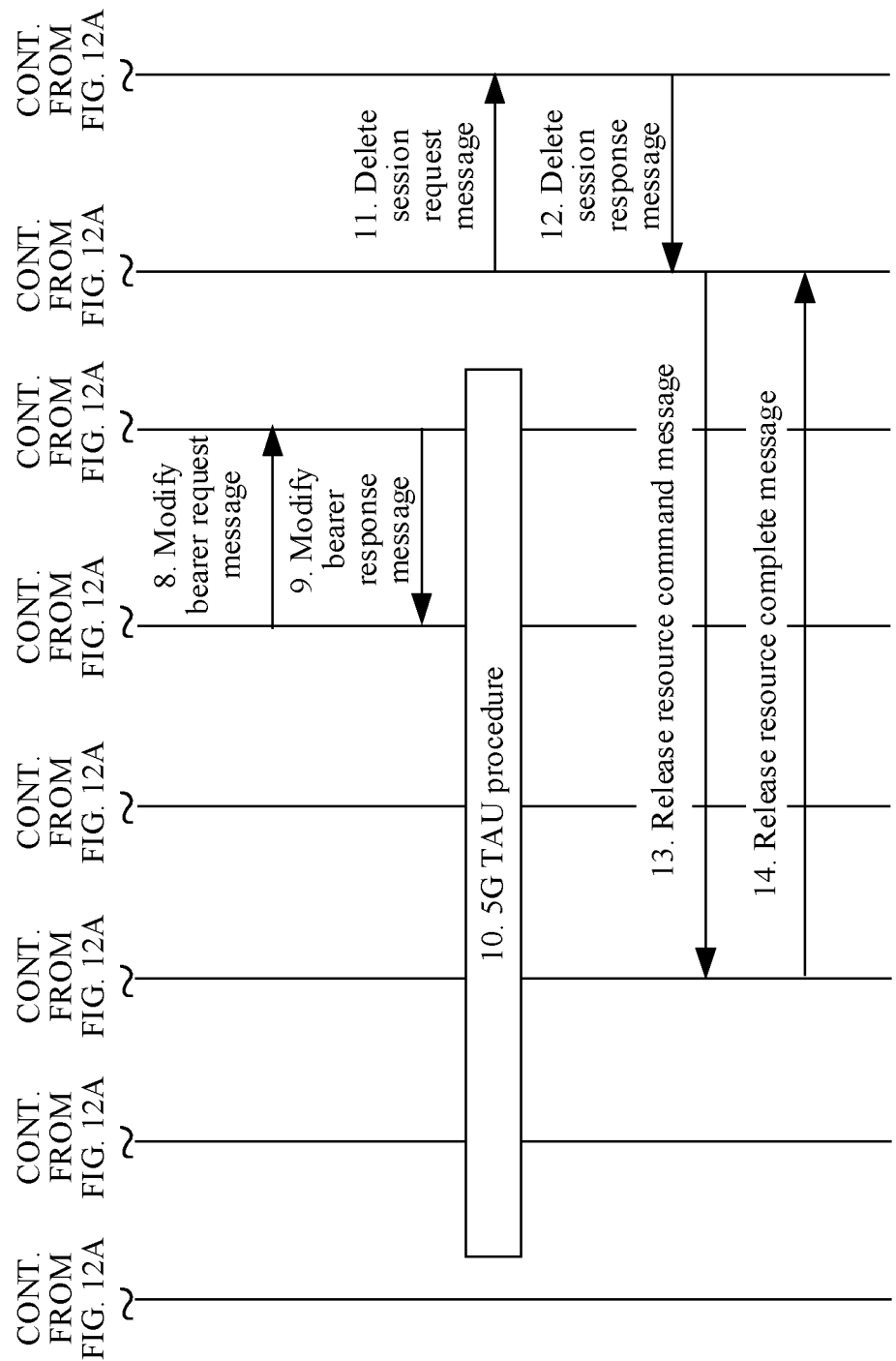

FIG. 12A and FIG. 12B each depict a schematic flowchart of a handover execution phase for handing over UE from a 4G network to a 5G network based on the handover preparations shown in FIG. 11 according to an embodiment of the present disclosure. The handover execution phase includes the following steps.

1. An MME sends a handover command message such as a Handover Command to a 4G AN.

The Handover Command carries parameters, such as a Target to Source Transparent Container and a list of to-be-released RABs.

2. The 4G AN sends a handover from E-UTRAN command message such as a Handover from E-UTRAN Command to the UE.

The Handover from E-UTRAN Command carries parameters, such as a radio resource allocated by a target access network node (that is, a 5G AN) to the UE.

3. The UE accesses the target 5G AN according to the Handover from E-UTRAN Command.

4. The UE sends a Handover Complete (i.e., handover to 5G access network complete message) to the 5G AN.

5. The 5G AN sends a handover notification message such as a Handover Notify to an S-CCNF entity (or an AMF entity, and the AMF entity is also used hereinafter).

6. The S-CCNF entity sends a forwarding relocation complete notification message such as a Forward Relocation Complete Notification to the MME.

7. The MME returns a forwarding relocation complete acknowledgment message Forward Relocation Complete ACK to the S-CCNF entity.

8. The S-CCNF entity sends a modify bearer request message such as a Modify PDU Session Request to an SMF entity in a network slice that serves the UE.

9. The SMF entity returns a modify bearer response message such as a Modify Bearer Response to the S-CCNF entity.

10. The UE initiates a 5G Tracking Area Update procedure to the MME.

11. The MME sends a delete session request message such as a Delete Session Request to an S-GW.

12. The S-GW releases a 4G PDN Connection resource of the UE. The S-GW returns a delete session response message such as a Delete Session Response to the MME.

13. The MME sends a release resource command message such as a Release Resources Command to the 4G AN, to request to release a radio resource allocated to the UE by the 4G AN.

14. The 4G AN sends a release resource complete message such as a Release Resources Complete to the MME.

Figure 13:
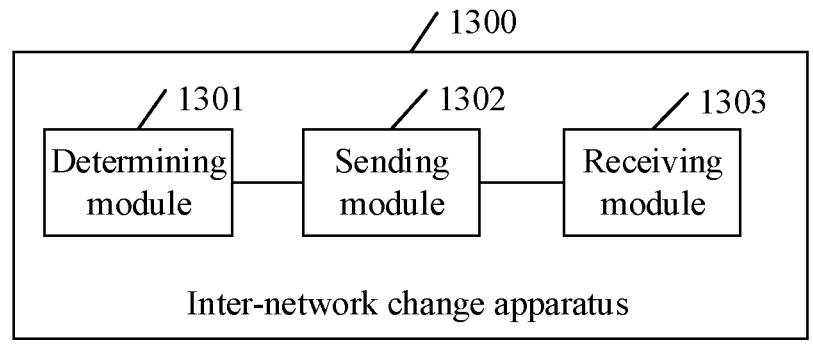
FIG. 13 is a schematic diagram of a structure of an inter-network change apparatus according to an embodiment of the present disclosure.

FIG. 13 is a schematic diagram of a structure of an inter-network change apparatus 1300 according to an embodiment of the present disclosure. In some implementations, the inter-network change apparatus 1300 may comprise a chip. As shown in FIG. 13, the inter-network change apparatus 1300 may include the following modules: a determining module 1301 configured to determine second network slice information to which first network slice information is mapped, where the first network slice information is information about a first network slice accessed by the terminal, the second network slice information is information about a second network slice, the first network slice is a network slice in a first network, and the second network slice is a network slice in a second network; a sending module 1302 configured to send a request message to the second network, where the request message carries the second network slice information, and the request message is used for the terminal to request to register with or be handed over to the second network slice; and a receiving module 1303 configured to receive an accept message returned by the second network, where the accept message carries network slice information accepted by the second network, and the network slice information accepted by the second network includes a part or all of the second network slice information; where the first network and the second network have different access network devices and/or core network devices.

In an optional implementation, mapping information between the first network slice information and the second network slice information is pre-configured on the terminal.

In another optional implementation, the determining module 1301 is configured to obtain, in a procedure of registering or establishing a session with the first network, the second network slice information to which the first network slice information of the first network is mapped.

In still another optional implementation, the determining module 1301 is configured to obtain, from system information broadcast by the first network, the second network slice information to which the first network slice information is mapped.

The accept message further carries third network slice information to which the network slice information accepted by the second network is mapped, the third network slice information is information about a third network slice, and the third network slice is a network slice in the first network.

The first network slice is a network slice used by the terminal to establish a session in the first network, and the second network slice is a network slice used by the terminal to re-establish the session in the second network or a network slice used after the session is changed from the first network to the second network.

The request message further carries a session identifier that is used to identify a session, and the session is established in the first network slice and is re-established in the second network slice, or is changed from the first network slice to the second network slice.

The request message further carries a handover indication, and the handover indication is used to instruct the second network to assign, to the terminal, a session address that is the same as a session address assigned by the first network to the terminal.

It should be understood that the foregoing and other operations and/or functions of the modules in the inter-network change apparatus 1300 shown in FIG. 13 are used to implement corresponding procedures of any inter-network change method in FIG. 1 to FIG. 12. For brevity, details are not described herein again.

Figure 14:
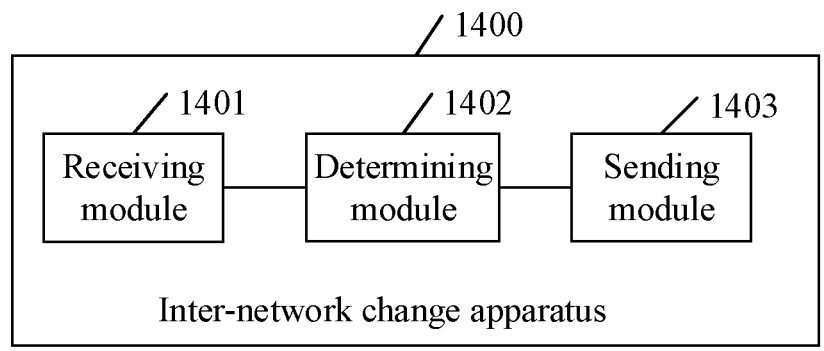
FIG. 14 is a schematic diagram of a structure of another inter-network change apparatus according to an embodiment of the present disclosure.

FIG. 14 is a schematic diagram of a structure of another inter-network change apparatus 1400 according to an embodiment of the present disclosure. In some implementations, the inter-network change apparatus 1400 may comprise a chip. As shown in FIG. 14, the inter-network change apparatus 1400 may include the following modules: a receiving module 1401 configured to receive a request message sent by a terminal, where the request message carries second network slice information to which the first network slice information is mapped, the first network slice information is information about a first network slice accessed by the terminal, the second network slice information is information about a second network slice, the first network slice is a network slice in a first network, and the second network slice is a network slice in a second network; a determining module 1402 configured to determine a second core network device, where the second core network device is a core network device in the second network slice; and a sending module 1403 configured to send the request message to the second core network device for processing, in order to perform a procedure in which the terminal registers with or is handed over to the second network. The receiving module 1401 is further configured to receive an accept message returned by the second core network device, and send the accept message to the terminal, where the accept message carries network slice information accepted by the second network, and the network slice information accepted by the second network includes a part or all of the second network slice information.

That the determining module 1402 is configured to determine a second core network device. The sending module is configured to send the request message to the second core network device for processing, in order to perform a procedure in which the terminal registers with or is handed over to the second network. The procedure may include: forwarding the request message to a second default core network device in the second network, such that the second default core network device selects the second core network device and sends the request message to the second core network device for processing, in order to perform the procedure in which the terminal registers with or is handed over to the second network.

The accept message further carries third network slice information to which the network slice information accepted by the second network is mapped, the third network slice information is information about a third network slice, and the third network slice is a network slice in the first network.

The first network slice is a network slice used by the terminal to establish a session in the first network, and the second network slice is a network slice used by the terminal to re-establish the session in the second network or a network slice used after the session is changed from the first network to the second network.

The request message further carries a session identifier that is used to identify a session, and the session is established in the first network slice and is re-established in the second network slice, or is changed from the first network slice to the second network slice.

The request message further carries a handover indication, and the handover indication is used to instruct the second network to assign, to the terminal, a session address that is the same as a session address assigned by the first network to the terminal.

It should be understood that the foregoing and other operations and/or functions of the modules in the inter-network change apparatus 1400 shown in FIG. 14 are used to implement corresponding procedures of any inter-network change method in FIG. 1 to FIG. 12. For brevity, details are not described herein again.

Figure 15:
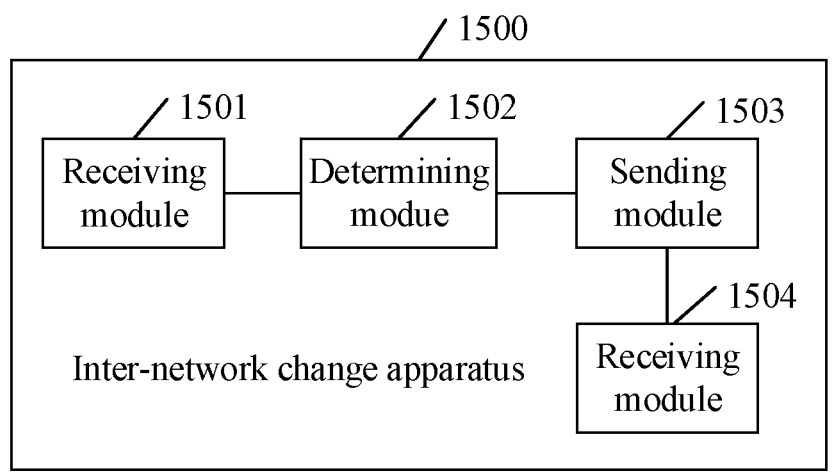
FIG. 15 is a schematic diagram of a structure of still another inter-network change apparatus according to an embodiment of the present disclosure.

FIG. 15 is a schematic diagram of a structure of still another inter-network change apparatus 1500 according to an embodiment of the present disclosure. In some implementations, the inter-network change apparatus 1500 may comprise a chip. The inter-network change apparatus 1500 may include the following modules: a receiving module 1501 configured to receive a first request message sent by a first access network device, where the first request message is used for a terminal to request to be handed over to a second network; a determining module 1502 configured to determine second network slice information to which first network slice information is mapped, where the first network slice information is information about a first network slice accessed by the terminal, the second network slice information is information about a second network slice, the first network slice is a network slice in a first network, and the second network slice is a network slice in the second network. The determining module 1502 is further configured to determine a second core network device, where the second core network device is a core network device in the second network slice. The inter-network change apparatus 1500 may further include a sending module 1503 configured to send a second request message to the second core network device, where the second request message carries the second network slice information; and a receiving module 1504 configured to receive a response message returned by the second core network device, and send a handover command to the terminal, such that the terminal is handed over to the second network slice.

The first network slice is a network slice used by the terminal to establish a session in the first network, and the second network slice is a network slice used by the terminal to re-establish the session in the second network or a network slice used after the session is changed from the first network to the second network.

The request message further carries a session identifier that is used to identify a session, and the session is established in the first network slice and is re-established in the second network slice, or is changed from the first network slice to the second network slice.

The request message further carries a handover indication, and the handover indication is used to instruct the second network to assign, to the terminal, a session address that is the same as a session address assigned by the first network to the terminal.

It should be understood that the foregoing and other operations and/or functions of the modules in the inter-network change apparatus 1500 shown in FIG. 15 are used to implement corresponding procedures of any inter-network change method in FIG. 1 to FIG. 12. For brevity, details are not described herein again.

Figure 16:
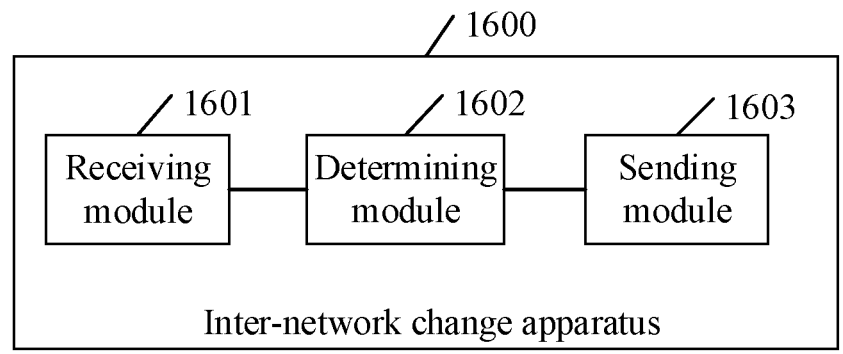
FIG. 16 is a schematic diagram of a structure of still another inter-network change apparatus according to an embodiment of the present disclosure.

FIG. 16 is a schematic diagram of a structure of still another inter-network change apparatus 1600 according to an embodiment of the present disclosure. In some implementations, the inter-network change apparatus 1600 may comprise a chip. The inter-network change apparatus 1600 may include the following modules: a receiving module 1601 configured to receive a first request message sent by a first core network device in a first network, where the first request message is used for a terminal to request to register with or be handed over to a second network, and the second default core network device is a core network device in the second network; a determining module 1602 configured to determine second network slice information to which first network slice information is mapped, where the first network slice information is information about a first network slice accessed by the terminal, the second network slice information is information about a second network slice, the first network slice is a network slice in the first network, and the second network slice is a network slice in the second network. The determining module 1602 is further configured to determine a second core network device, where the second core network device is a core network device in the second network slice. The inter-network change apparatus 1600 may further include a sending module 1603 configured to send a second request message to the second core network device, where the second request message carries the second network slice information, and the request message is used for the terminal to request to register with or be handed over to the second network slice.

The first request message carries the first network slice information.

The first network slice is a network slice used by the terminal to establish a session in the first network, and the second network slice is a network slice used by the terminal to re-establish the session in the second network or a network slice used after the session is changed from the first network to the second network.

The second request message further carries a session identifier that is used to identify a session, and the session is established in the first network slice and is re-established in the second network slice, or is changed from the first network slice to the second network slice.

The second request message further carries a handover indication, and the handover indication is used to instruct the second network to assign, to the terminal, a session address that is the same as a session address assigned by the first network to the terminal.

It should be understood that the foregoing and other operations and/or functions of the modules in the inter-network change apparatus 1600 shown in FIG. 16 are used to implement corresponding procedures of any inter-network change method in FIG. 1 to FIG. 12. For brevity, details are not described herein again.

Figure 17:
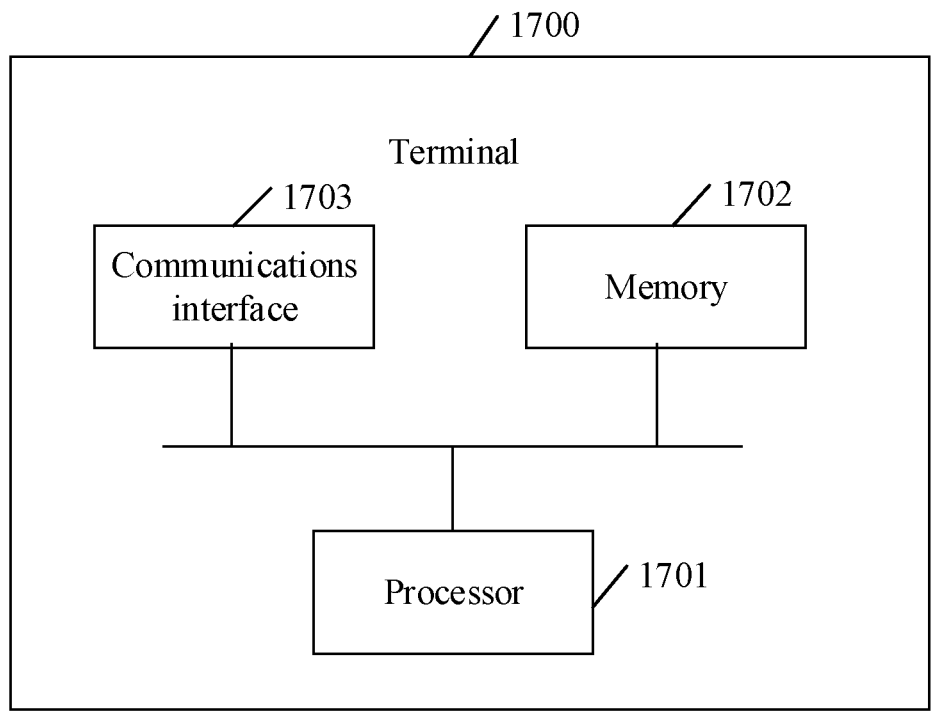
FIG. 17 is a schematic diagram of a structure of a terminal according to an embodiment of the present disclosure.

FIG. 17 is a schematic diagram of a structure of a terminal 1700 according to an embodiment of the present disclosure. The terminal may comprise any suitable communication device such as an apparatus (e.g., a chip). As shown in FIG. 17, the terminal 1700 may include a processor 1701, a memory 1702, and a communications interface 1703. The communications interface 1703 is configured to implement communication connections between these components, and communication connections between machines. The memory 1702 may be a high-speed random-access memory (RAM), or may be a non-volatile memory, for example, at least one magnetic disk memory. The processor 1701 may be combined with the inter-network change apparatus shown in FIG. 13. The memory 1702 stores a group of program code, and the processor 1701 invokes the program code stored in the memory 1702 to perform the following operations: determining second network slice information to which first network slice information is mapped, where the first network slice information is information about a first network slice accessed by the terminal, the second network slice information is information about a second network slice, the first network slice is a network slice in a first network, and the second network slice is a network slice in a second network; sending a request message to the second network, where the request message carries the second network slice information, and the request message is used for the terminal to request to register with or be handed over to the second network slice; and receiving an accept message returned by the second network, where the accept message carries network slice information accepted by the second network, and the network slice information accepted by the second network includes a part or all of the second network slice information; where the first network and the second network have different access network devices and/or core network devices.

Mapping information between the first network slice information and the second network slice information is pre-configured on the terminal.

In this embodiment of the present disclosure, the processor 1701 invokes the program code stored in the memory 1702 to determine second network slice information to which first network slice information is mapped, and the processor 1701 may perform the following operations: obtaining, by the terminal in a procedure of registering or establishing a session with the first network, the second network slice information to which the first network slice information of the first network is mapped.

In this embodiment of the present disclosure, the processor 1701 invokes the program code stored in the memory 1702 to determine second network slice information to which first network slice information is mapped, and the processor 1701 may perform the following operations: obtaining, by the terminal from system information broadcast by the first network, the second network slice information to which the first network slice information is mapped.

The accept message further carries third network slice information to which the network slice information accepted by the second network is mapped, the third network slice information is information about a third network slice, and the third network slice is a network slice in the first network.

The first network slice is a network slice used by the terminal to establish a session in the first network, and the second network slice is a network slice used by the terminal to re-establish the session in the second network or a network slice used after the session is changed from the first network to the second network.

The request message further carries a session identifier that is used to identify a session, and the session is established in the first network slice and is re-established in the second network slice, or is changed from the first network slice to the second network slice.

The request message further carries a handover indication, and the handover indication is used to instruct the second network to assign, to the terminal, a session address that is the same as a session address assigned by the first network to the terminal.

It should be understood that the foregoing and other operations and/or functions of the modules in the terminal 1700 shown in FIG. 17 are used to implement corresponding procedures of any inter-network change method in FIG. 1 to FIG. 12. For brevity, details are not described herein again.

Figure 18:
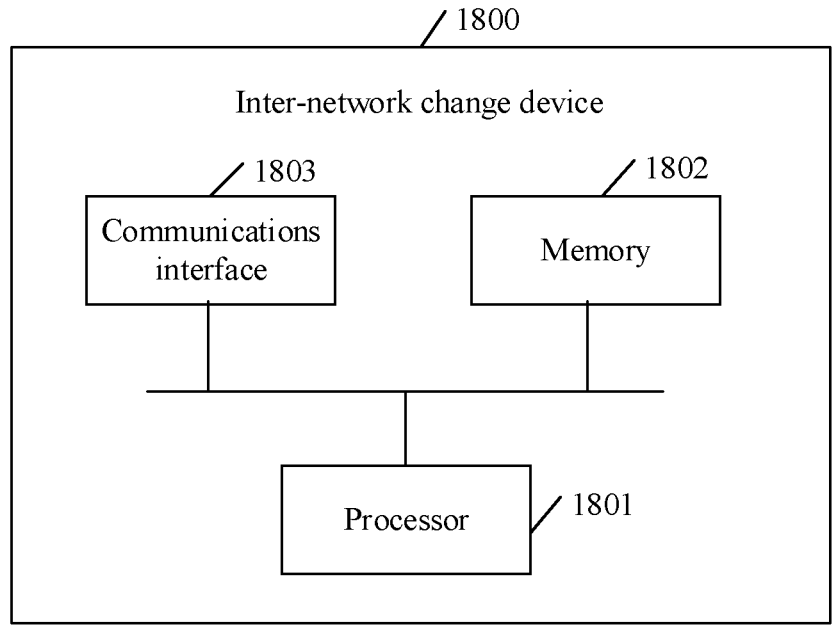
FIG. 18 is a schematic diagram of a structure of an inter-network change device according to an embodiment of the present disclosure.

FIG. 18 is a schematic diagram of a structure of an inter-network change device according to an embodiment of the present disclosure. As shown in FIG. 18, the inter-network change device 1800 may include a processor 1801, a memory 1802, and a communications interface 1803. The inter-network change device 1800 is an access network device in a second network, and therefore may also be referred to as a second access network device 1800 below. The communications interface 1803 is configured to implement communication connections between these components, and communication connections between machines. The memory 1802 may be a high-speed RAM memory, or may be a non-volatile memory, for example, at least one magnetic disk memory. The processor 1801 may be combined with the inter-network change apparatus shown in FIG. 14. The memory 1802 stores a group of program code, and the processor 1801 invokes the program code stored in the memory 1802 to perform the following operations: receiving a request message sent by a terminal, where the second access network device 1800 is an access network device in a second network, the request message carries second network slice information to which the first network slice information is mapped, the first network slice information is information about a first network slice accessed by the terminal, the second network slice information is information about a second network slice, the first network slice is a network slice in a first network, and the second network slice is a network slice in the second network; determining a second core network device, where the second core network device is a core network device in the second network slice; sending the request message to the second core network device for processing, in order to perform a procedure in which the terminal registers with or is handed over to the second network; and receiving an accept message returned by the second core network device, and sending the accept message to the terminal, where the accept message carries network slice information accepted by the second network, and the network slice information accepted by the second network includes a part or all of the second network slice information.

In this embodiment of the present disclosure, that the processor 1801 invokes the program code stored in the memory 1802 to determine the second core network device and send the request message to the second core network device for processing, in order to perform the procedure in which the terminal registers with or is handed over to the second network may be: forwarding the request message to a second default core network device in the second network, such that the second default core network device selects the second core network device and sends the request message to the second core network device for processing, in order to perform the procedure in which the terminal registers with or is handed over to the second network.

The accept message further carries third network slice information to which the network slice information accepted by the second network is mapped, the third network slice information is information about a third network slice, and the third network slice is a network slice in the first network.

The first network slice is a network slice used by the terminal to establish a session in the first network, and the second network slice is a network slice used by the terminal to re-establish the session in the second network or a network slice used after the session is changed from the first network to the second network.

The request message further carries a session identifier that is used to identify a session, and the session is established in the first network slice and is re-established in the second network slice, or is changed from the first network slice to the second network slice.

The request message further carries a handover indication, and the handover indication is used to instruct the second network to assign, to the terminal, a session address that is the same as a session address assigned by the first network to the terminal.

It should be understood that the foregoing and other operations and/or functions of the modules in the inter-network change device 1800 shown in FIG. 18 are used to implement corresponding procedures of any inter-network change method in FIG. 1 to FIG. 12. For brevity, details are not described herein again.

Figure 19:
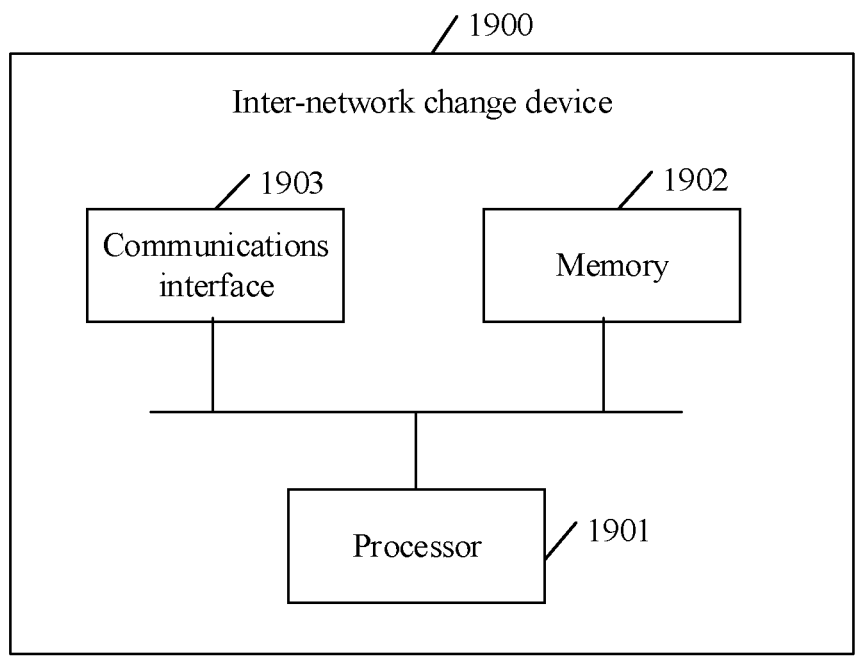
FIG. 19 is a schematic diagram of a structure of another inter-network change device according to an embodiment of the present disclosure.

FIG. 19 is a schematic diagram of a structure of an inter-network change device according to an embodiment of the present disclosure. As shown in FIG. 19, the inter-network change device 1900 may include a processor 1901, a memory 1902, and a communications interface 1903. The inter-network change device 1900 is a core network device in a first network slice, and therefore may also be referred to as a first core network device 1900 below. The communications interface 1903 is configured to implement communication connections between these components, and communication connections between machines. The memory 1902 may be a high-speed RAM memory, or may be a non-volatile memory, for example, at least one magnetic disk memory. The processor 1901 may be combined with the inter-network change apparatus shown in FIG. 15. The memory 1902 stores a group of program code, and the processor 1901 invokes the program code stored in the memory 1902 to perform the following operations: receiving a first request message sent by a first access network device, where the first request message is used for a terminal to request to be handed over to a second network; determining second network slice information to which first network slice information is mapped, where the first network slice information is information about the first network slice accessed by the terminal, the second network slice information is information about a second network slice, the first network slice is a network slice in a first network, and the second network slice is a network slice in the second network; determining a second core network device, where the second core network device is a core network device in the second network slice; sending a second request message to the second core network device, where the second request message carries the second network slice information; and receiving a response message returned by the second core network device, and sending a handover command to the terminal, such that the terminal is handed over to the second network slice.

The first network slice is a network slice used by the terminal to establish a session in the first network, and the second network slice is a network slice used by the terminal to re-establish the session in the second network or a network slice used after the session is changed from the first network to the second network.

The request message further carries a session identifier that is used to identify a session, and the session is established in the first network slice and is re-established in the second network slice, or is changed from the first network slice to the second network slice.

The request message further carries a handover indication, and the handover indication is used to instruct the second network to assign, to the terminal, a session address that is the same as a session address assigned by the first network to the terminal.

It should be understood that the foregoing and other operations and/or functions of the modules in the inter-network change device 1900 shown in FIG. 19 are used to implement corresponding procedures of any inter-network change method in FIG. 1 to FIG. 12. For brevity, details are not described herein again.

Figure 20:
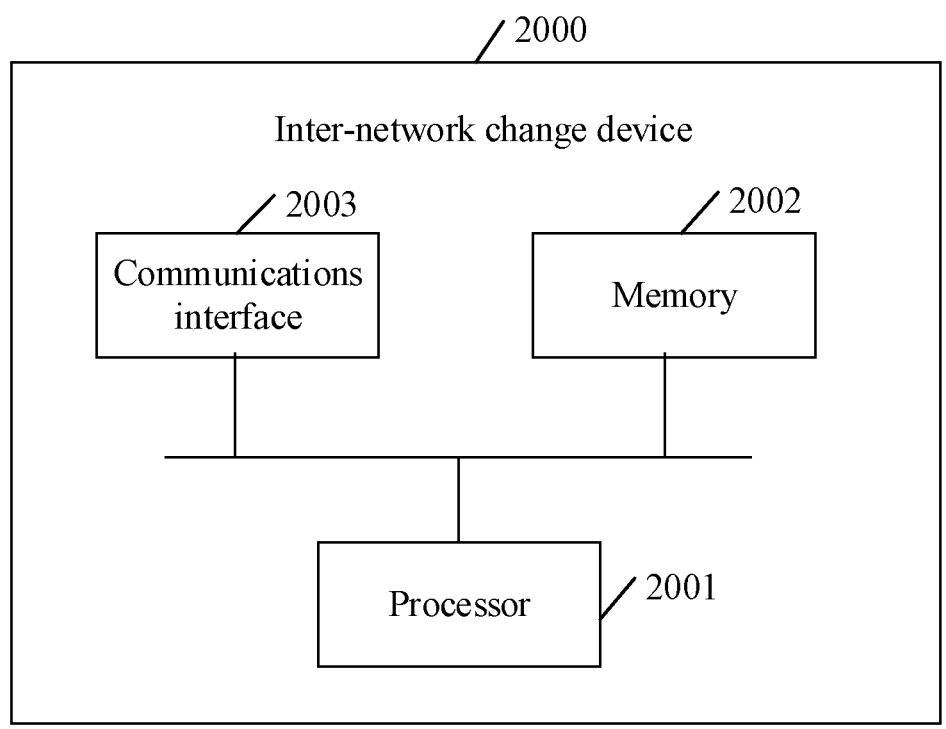
FIG. 20 is a schematic diagram of a structure of still another inter-network change device according to an embodiment of the present disclosure.

FIG. 20 is a schematic diagram of a structure of an inter-network change device 2000 according to an embodiment of the present disclosure. As shown in FIG. 20, the inter-network change device 2000 may include a processor 2001, a memory 2002, and a communications interface 2003. The inter-network change device 2000 is a default core network device in a second network, and therefore may also be referred to as a second default core network device 2000 below. The communications interface 2003 is configured to implement communication connections between these components, and communication connections between machines. The memory 2002 may be a high-speed RAM memory, or may be a non-volatile memory, for example, at least one magnetic disk memory. The processor 2001 may be combined with the inter-network change apparatus shown in FIG. 16. The memory 2002 stores a group of program code, and the processor 2001 invokes the program code stored in the memory 2002 to perform the following operations: receiving a first request message sent by a first core network device in a first network, where the first request message is used for a terminal to request to register with or be handed over to a second network, and the second default core network device is a core network device in the second network; determining second network slice information to which first network slice information is mapped, where the first network slice information is information about a first network slice accessed by the terminal, the second network slice information is information about a second network slice, the first network slice is a network slice in the first network, and the second network slice is a network slice in the second network; determining a second core network device, where the second core network device is a core network device in the second network slice; and sending a second request message to the second core network device, where the second request message carries the second network slice information, and the request message is used for the terminal to request to register with or be handed over to the second network slice.

The first request message carries the first network slice information.

The first network slice is a network slice used by the terminal to establish a session in the first network, and the second network slice is a network slice used by the terminal to re-establish the session in the second network or a network slice used after the session is changed from the first network to the second network.

The second request message further carries a session identifier that is used to identify a session, and the session is established in the first network slice and is re-established in the second network slice, or is changed from the first network slice to the second network slice. The second request message further carries a handover indication, and the handover indication is used to instruct the second network to assign, to the terminal, a session address that is the same as a session address assigned by the first network to the terminal.

It should be understood that the foregoing and other operations and/or functions of the modules in the inter-network change device 2000 shown in FIG. 20 are used to implement corresponding procedures of any inter-network change method in FIG. 1 to FIG. 12. For brevity, details are not described herein again.

An embodiment of this application further provides a computer storage medium, configured to store a computer software instruction used by any terminal in FIG. 1 to FIG. 3. The computer software instruction includes a program designed to perform steps performed by the terminal in any inter-network change method in FIG. 1 to FIG. 12.

An embodiment of this application further provides a computer storage medium, configured to store a computer software instruction used by any access network device in FIG. 1 to FIG. 3. The computer software instruction includes a program designed to perform steps performed by the first access network device in any inter-network change method in FIG. 1 to FIG. 12.

An embodiment of this application further provides a computer storage medium configured to store a computer software instruction used by any first core network device in FIG. 4 to FIG. 6. The computer software instruction includes a program designed to perform steps performed by the first core network device in any inter-network change method in FIG. 1 to FIG. 12.

An embodiment of this application further provides a computer storage medium configured to store a computer software instruction used by any default core network device in FIG. 4 to FIG. 6. The computer software instruction includes a program designed to perform steps performed by the first core network device in any inter-network change method in FIG. 1 to FIG. 12.

A person of ordinary skill in the art may understand that all or some of the procedures of the methods in the embodiments may be implemented by a computer program instructing relevant hardware. The program may be stored in a computer readable storage medium. When the program runs, the procedures of the methods in the embodiments are performed.

What is claimed is:

1. A method, comprising:
   sending, to a first network, a packet data network (PDN) connection request message during a registration procedure with the first network or after completing the registration procedure, wherein the PDN connection request message requests a PDN connection in the first network, and wherein the first network is a 4th generation (4G) mobile communications system;
   receiving, from the first network, a PDN connection response message, wherein the PDN connection response message comprises first network slice information identifying a first network slice in a second network, wherein the first network slice in the second network corresponds to the PDN connection in the first network, wherein the second network is a 5th generation (5G) mobile communications system, and wherein the first network and the second network have different core network devices;
   sending, to the second network, a request message, wherein the request message carries the first network slice information for a terminal to register with or be handed over to the second network; and
   receiving, from the second network, an accept message, wherein the accept message carries accepted network slice information from the second network, and wherein the accepted network slice information comprises a part or all of the first network slice information.

2. The method of claim 1, wherein the first network slice information comprises one or more pieces of single-network slice selection assistance information (S-NSSAI).

3. The method of claim 2, wherein the one or more pieces of S-NSSAI include a slice/service type and slice differentiation information.

4. The method of claim 1, wherein the 4G mobile communications system comprises an Evolved Packet Core (EPC) system or an Evolved Universal Mobile Telecommunications System (UMTS) Terrestrial Radio Access Network (E-UTRAN).

5. The method of claim 1, wherein the accept message further carries second network slice information that maps to the first network slice information, wherein the second network slice information is about a second third network slice, and wherein the second network slice is in the first network.

6. The method of claim 5, wherein the request message further carries a handover indication, and wherein the handover indication instructs the second network to assign, to the terminal, a first session address that is the same as a second session address assigned by the first network to the terminal.

7. An apparatus, comprising:
   one or more processors; and
   a memory configured to store a program instruction executable by the one or more processors to:
      send, to a first network, a packet data network (PDN) connection request message during a registration procedure with the first network or after completing the registration procedure, wherein the PDN connection request message requests a PDN connection in the first network, and wherein the first network is a 4th generation (4G) mobile communications system;
      receive, from the first network, a PDN connection response message, wherein the PDN connection response message comprises first network slice information identifying a first network slice in a second network, wherein the first network slice in the second network corresponds to the PDN connection in the first network, wherein the second network is a 5th generation (5G) mobile communications system, and wherein the first network and the second network have different core network devices;
      send, to the second network, a request message, wherein the request message carries the first network slice information for a terminal to register with or be handed over to the second network; and
      receive, from the second network, an accept message, wherein the accept message carries accepted network slice information from the second network, and wherein the accepted network slice information comprises a part or all of the first network slice information.

8. The apparatus of claim 7, wherein the first network slice information comprises one or more pieces of single-network slice selection assistance information (S-NSSAI).

9. The apparatus of claim 8, wherein the one or more pieces of S-NSSAI include a slice/service type and slice differentiation information.

10. The apparatus of claim 7, wherein the 4G mobile communications system comprises an Evolved Packet Core (EPC) system or an Evolved Universal Mobile Telecommunications System (UMTS) Terrestrial Radio Access Network (E-UTRAN).

11. The apparatus of claim 7, wherein the accept message further carries second network slice information that maps to the first network slice information, wherein the second network slice information is about a second network slice, and wherein the second network slice is in the first network.

12. The apparatus of claim 7, wherein the apparatus comprises the terminal or a chip.

13. A computer program product comprising computer-executable instructions stored on a non-transitory computer-readable storage medium that, when executed by one or more processors, cause an apparatus to:
   receive, from a first network, a packet data network (PDN) connection response message, wherein the PDN connection response message comprises first network slice information identifying a first network slice in a second network, wherein the first network slice in the second network corresponds to a PDN connection in the first network, wherein the PDN connection is requested by a PDN connection request message, wherein the first network is a 4th generation (4G) mobile communication system, wherein the second network is a 5th generation (5G) mobile communication system, and wherein the first network and the second network have different core network devices;

send, to the second network, a request message, wherein the request message carries the first network slice information for a terminal to register with or be handed over to the second network; and receive, from the second network, an accept message, wherein the accept message carries accepted network slice information from the second network, and wherein the accepted network slice information comprises a part or all of the first network slice information.

14. The computer program product of claim 13, wherein the first network slice information comprises one or more pieces of Single-Network Slice Selection Assistance Information (S-NSSAI).

15. The computer program product of claim 14, wherein the one or more pieces of S-NSSAI include a slice/service type and slice differentiation information.

16. The computer program product of claim 13, wherein the 4G mobile communications system comprises an Evolved Packet Core (EPC) system or an Evolved Universal Mobile Telecommunications System (UMTS) Terrestrial Radio Access Network (E-UTRAN).

17. The computer program product of claim 13, wherein the apparatus comprises the terminal or a chip.

18. An apparatus, comprising:
one or more processors; and
a memory configured to store a program instruction executable by the one or more processors to:
receive, from a first network, a packet data network (PDN) connection response message, wherein the PDN connection response message comprises first network slice information about a first network slice in a second network, wherein the first network slice corresponds to a PDN connection, wherein the PDN connection is requested by a PDN connection request message, wherein the first network is a 4th generation (4G) mobile communication system, wherein the second network is a 5th generation (5G) mobile communication system, and wherein the first network and the second network have different core network devices;
send, to the second network, a request message, wherein the request message carries the first network slice information for a terminal to register with or be handed over to the second network; and
receive, from the second network, an accept message, wherein the accept message carries accepted network slice information from the second network, and
wherein the accepted network slice information comprises a part or all of the first network slice information.

19. The apparatus of claim 18, wherein the first network slice information comprises one or more pieces of single-network slice selection assistance information (S-NSSAI).

20. The apparatus of claim 19, wherein the one or more pieces of S-NSSAI include a slice/service type and slice differentiation information.

* * * * *

UNITED STATES PATENT AND TRADEMARK OFFICE
CERTIFICATE OF CORRECTION

| | | |
|---|---|---|
| PATENT NO. | : 12,395,902 B2 | Page 1 of 1 |
| APPLICATION NO. | : 18/486491 | |
| DATED | : August 19, 2025 | |
| INVENTOR(S) | : Xiaoyan Duan and Hui Jin | |

It is certified that error appears in the above-identified patent and that said Letters Patent is hereby corrected as shown below:

In the Claims

Claim 5, Column 48, Line 4: "a second third network" should read "a second network"

Signed and Sealed this
Thirtieth Day of September, 2025

John A. Squires
*Director of the United States Patent and Trademark Office*